United States Patent [19]
Ohkura et al.

[11] Patent Number: 6,128,009
[45] Date of Patent: *Oct. 3, 2000

[54] PROGRAM GUIDE CONTROLLER

[75] Inventors: Yukiko Ohkura, Tokyo; Tetsuya Kohno, Kanagawa; Keiji Yuzawa; Yuriko Kishitaka, both of Saitama; Kazuhiro Akaike, Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/011,256

[22] PCT Filed: May 29, 1997

[86] PCT No.: PCT/JP97/01834

§ 371 Date: May 4, 1998

§ 102(e) Date: May 4, 1998

[87] PCT Pub. No.: WO97/46006

PCT Pub. Date: Dec. 4, 1997

[30] Foreign Application Priority Data

| May 29, 1996 | [JP] | Japan | P8-156348 |
| Jun. 14, 1996 | [JP] | Japan | P8-174390 |
| Jul. 23, 1996 | [JP] | Japan | P8-210496 |
| Sep. 27, 1996 | [JP] | Japan | P8-275290 |

[51] Int. Cl.[7] .................................................. H04N 5/445
[52] U.S. Cl. ........................ 345/327; 345/352; 348/563; 348/906
[58] Field of Search ........................... 348/906, 503, 348/7, 12, 473, 6, 10, 13; 455/5.1; 345/327, 352

[56] References Cited

U.S. PATENT DOCUMENTS

| 5,353,121 | 10/1994 | Young et al. | 348/563 |
| 5,444,499 | 8/1995 | Saitoh | 348/734 |
| 5,479,266 | 12/1995 | Young et al. | 348/906 |
| 5,585,838 | 12/1996 | Lawler et al. | 348/13 |
| 5,585,865 | 12/1996 | Amano et al. | 348/731 |
| 5,623,613 | 4/1997 | Rowe et al. | 395/353 |
| 5,635,989 | 6/1997 | Rothmuller | 348/563 |
| 5,671,411 | 9/1997 | Watts et al. | 348/906 |
| 5,686,954 | 11/1997 | Yoshinobu et al. | 348/569 |
| 5,731,844 | 3/1998 | Rauch et al. | 348/563 |
| 5,793,438 | 8/1998 | Bedard | 348/906 |

FOREIGN PATENT DOCUMENTS

| 3-284077 | 12/1991 | Japan . |
| 5-56405 | 3/1993 | Japan . |
| 5-284476 | 10/1993 | Japan . |
| 5-284480 | 10/1993 | Japan . |
| 5-284481 | 10/1993 | Japan . |
| 6-245161 | 9/1994 | Japan . |
| 7-143463 | 6/1995 | Japan . |
| 7-147657 | 6/1995 | Japan . |
| 7-184136 | 7/1995 | Japan . |
| 7-193760 | 7/1995 | Japan . |
| 7-193762 | 7/1995 | Japan . |
| 7-284035 | 10/1995 | Japan . |
| 8-223547 | 8/1996 | Japan . |
| 8-317353 | 11/1996 | Japan . |
| 9-37151 | 2/1997 | Japan . |
| 9-63443 | 3/1997 | Japan . |
| 9-70027 | 3/1997 | Japan . |
| 9-83891 | 3/1997 | Japan . |

*Primary Examiner*—Andrew I. Faile
*Assistant Examiner*—Reuben M. Brown
*Attorney, Agent, or Firm*—Frommer Lawrence & Haug, LLP.; William S. Frommer; Glenn F. Savit

[57] ABSTRACT

A program table guide control apparatus according to this invention generates program table picture including date and hour information, program title information and genre information to display only title of the program relating to broadcasting channel being received in connection with the title information, and to permit user to arbitrarily register genre information displayed. In addition, programs of high viewing frequency of user are automatically registered, thus permitting registered programs to be included in genre information. Thus, Electronic Program Guide (EPG) extremely easy for user to use can be provided.

6 Claims, 36 Drawing Sheets

FIG.1A
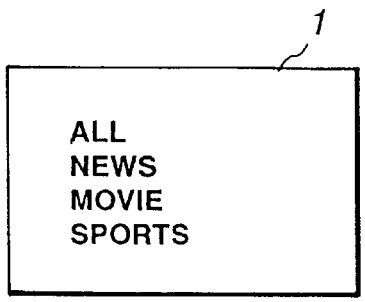
FIG.1B
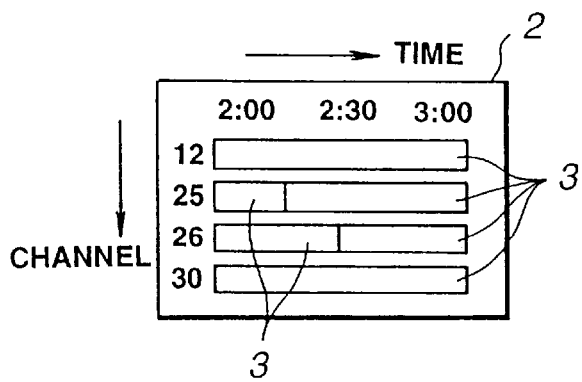
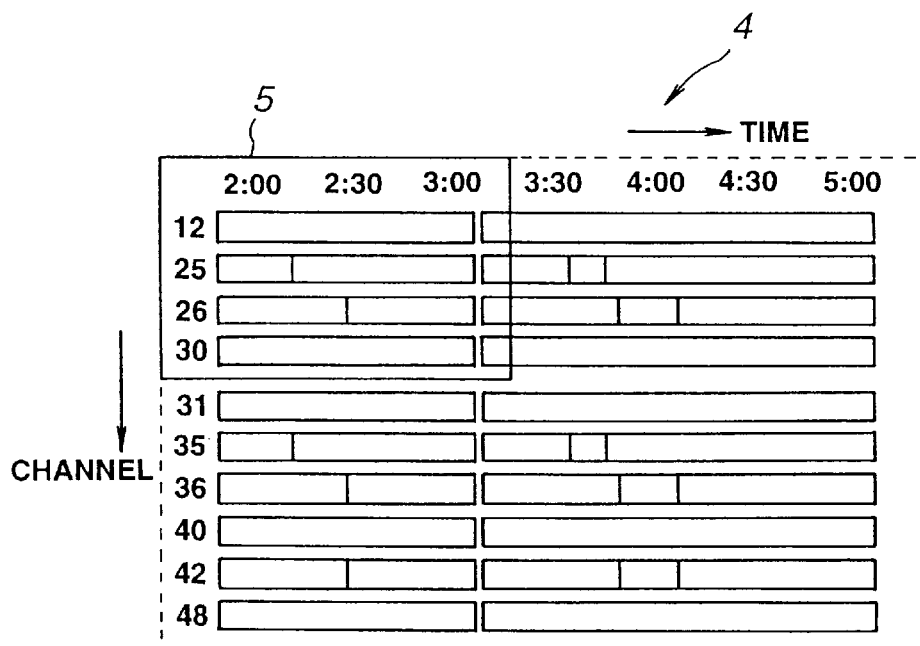
FIG.2

| | | | |
|---|---|---|---|
| 3 SUN. | 1 | PROGRAM BEING BROADCASTED | ALL |
| | 2 | | |
| 4 MON. | 3 | TODAY'S PROGRAM | MOVIE |
| | 4 | 2-ND DAY | SPORTS |
| 5 TUES. | 5 | | |
| | 6 | 3-RD DAY | NEWS |
| 6 WED. | 7 | 4-TH DAY | MUSIC |
| | 8 | | |
| 7 THUR. | . | 5-TH DAY | SELECT CHANNEL |
| | . | 6-TH DAY | FAVORITE CHANNEL |
| 8 FRI. | . | . | FAVORITE PROGRAM |
| | | . | . |
| 9 SAT. | | . | . |

| DATE | HOUR | PROGRAM | GENRE |
|---|---|---|---|
| 3 SUN. | 3 | [10] BCD PROGRAM Q 8:00 ~ 9:00 | 155CH |
| 4 MON. | 6 | [11] ⌀ PROGRAM R 8:00 ~ 9:00 | ALL |
| 5 TUES. | 9 | [12] ♨ PROGRAM S 8:00 ~ 9:30 | |
| 6 WED. | 12 | [13] 13 PROGRAM T 8:05 ~ 11:00 | MOVIE |
| 7 THUR. | 3 | [14] ◇ PROGRAM U 8:10 ~ 8:20 | |
| 8 FRI. | 6 | [17] Ψ PROGRAM V 8:30 ~ 9:00 | NEWS |
| 9 SAT. | 9 | [18] xyz PROGRAM W 8:30 ~ 9:00 | |
|  | 12 | [21] c PROGRAM X 9:00 ~ 10:00 | BOOK MARK |

FIG.7D

| DATE | HOUR | PROGRAM | GENRE |
|---|---|---|---|
| 3 SUN. | 1 | [10] BCD PROGRAM a 1:00 ~ 1:30 | 155CH |
| 4 MON. | 6 | [11] ⌀ PROGRAM b 1:00 ~ 1:50 | ALL |
| 5 TUES. | 9 | [12] ♨ PROGRAM c 1:04 ~ 1:30 | |
| 6 WED. | 12 | [13] 13 PROGRAM d 1:05 ~ 1:00 | MOVIE |
| 7 THUR. | 3 | [14] ◇ PROGRAM e 1:10 ~ 1:20 | |
| 8 FRI. | 6 | [17] Ψ PROGRAM f 1:30 ~ 2:00 | NEWS |
| 9 SAT. | 9 | [18] xyz PROGRAM g 1:30 ~ 2:00 | |
|  | 12 | [21] c PROGRAM h 2:00 ~ 3:00 | BOOK MARK |

PROGRAM GUIDE CONTROLLER

TECHNICAL FIELD

This invention relates to a program guide control apparatus. Specifically, this invention relates to a program guide control apparatus capable of quickly and precisely obtaining information relating to many programs.

BACKGROUND ART

In recent years, there are being popularized systems of broadcasting television signals caused to be in digital form by satellites such as broadcasting satellites or communication satellites, etc. to receive broadcasting signals, e.g., at respective homes to carry out viewing (Viewing/listening) thereof. In such broadcasting systems, it is possible to carry out transmission of channels nearly equal to 150. Thus, very many programs can be broadcasted as compared to broadcasts by ground wave.

In such broadcasting systems, in order to permit user to easily select a desired program from many programs, there has been proposed a program selection system such that the transmitting side such as broadcasting station, etc. transmits Electronic Program Guide (EPG) as information of programs scheduled to be broadcasted, and to receive and display this electronic program guide at the receiving side to allow user to select a desired program or programs by this electronic program guide.

An example of display of a conventional electronic program guide will now be described with reference to FIGS. 1A and 1B. At genre select picture 1 shown in FIG. 1A, there are displayed plural genres relating to the programs such as "ALL (all genres)" "NEWS", "MOVIE", "SPORTS". User operates, e.g., remote controller, etc. to thereby move cursor (not shown) displayed within the picture, thus making it possible to select a desired genre from the plural genres displayed. When desired genre is selected at the genre select picture 1 shown in FIG. 1A, display is switched into program table picture 2 shown in FIG. 1B in correspondence with the selected genre.

At the program table picture 2 shown in FIG. 1B, channel Nos. of broadcasting stations are displayed in the ordinate direction, and times are displayed in the abscissa direction. Further, at positions prescribed by these two axes, respective titles 3 of programs at preselected times by selected channels are displayed. In this case, length in the lateral direction of each program title 3 corresponds to time of the abscissa, and is dependent upon length of broadcasting time of the program.

In more practical sense, in the case where "ALL" in the genre select picture 1 shown in FIG. 1A is selected, display of picture is switched, on monitor, e.g., television image receiver, from the genre select picture 1 into the program table picture 2 shown in FIG. 1B. At the program table picture provided after undergone switching, program titles of all genres every respective channels are displayed.

In this case, at the program table picture 2 shown in FIG. 1B, only a portion of actual program table 4 shown in FIG. 2 is displayed. In the case where there is a desire or necessity to display program title except for the arias being displayed, it is necessary to move picture display area 5 shown in FIG. 2 in upper and lower directions and in left and right directions by operating predetermined switch buttons at remote controller, etc.

Then, user moves cursor (not shown) to display position of a desired program title from program titles displayed within the program table picture 2 thereafter to carry out operation of determination by using the remote controller, thereby making it possible to conduct viewing (viewing/listening) of the selected program, or to conduct viewing (viewing/listening) of information relating to this program.

As described above, the actual program table 4 as shown in FIG. 2 indicates the program broadcasting schedule of all channels in order of time and thus includes a large quantity of information. For this reason, only a portion of the program table 4 can be displayed on the screen of monitor, etc. Namely, only an extremely few titles of programs can be displayed on the screen of monitor. In this case, if attempt is made to display many titles, characters displayed necessarily become small. As a result, this is difficult for user to see.

Moreover, in order to allow user to select a desired program, it is also necessary to scroll the picture display area 5 shown in FIG. 2 in two directions of upper and lower directions and left and right directions. Such operation by user is very troublesome.

Further, in the case of such electronic program guide, since the genre select picture 1 shown in FIG. 1A and the program table picture 2 shown in FIG. 1B are in the form where they are respectively constituted by independent pictures, e.g., user is faced with, when either one of pictures of FIGS. 1A and 1B is being displayed, inability to see other picture. Accordingly, in order to see other picture, an operation for switching the picture being displayed into the other picture is always required. Also in this respect, user must carry out troublesome operation.

Thus, this invention has been made in view of such circumstances, and an object of this invention is to provide an electronic program guide control apparatus which permits user to easily see picture displayed, which is capable of selecting desired program or information of program more quickly, and which is excellent in operation.

DISCLOSURE OF THE INVENTION

A program guide control apparatus according to this invention is directed to a program guide control apparatus adapted for controlling display state of program table displayed on a display unit and indicating respective programs of plural broadcasting channels, the apparatus comprising: program table picture generating means for generating program table picture including date and hour information indicating broadcasting dates and hours of the respective programs, title information indicating titles of the respective programs and genre information in which the respective programs are classified into plural genres; output means for outputting the program table picture to the display unit; command receiving means adapted to receive a cursor control signal for moving display position of cursor displayed in a manner superimposed (overlaid) upon the program table picture in order to designate at least one of the date and hour information, the title information and the genre information, and a determination control signal; and control means for controlling the program table picture on the basis of the cursor control signal and the determination control signal. The program table picture generating means generates broadcasting channel information including information relating broadcasting channels as one of genre information, and the control means controls the program table picture generating means so that when the receiving means receives the determination control signal in the state where cursor designates picture relating to the broadcasting channel information, only the title of the program relating to broadcasting channel is displayed in connection with the title information.

Moreover, a program guide control apparatus according to this invention is directed to a program guide control apparatus adapted for controlling display state of program table displayed on a display unit and indicating respective programs of plural broadcasting channels, the apparatus comprising: program table picture generating means for generating program table picture including date and hour information indicating broadcasting dates and hours of respective programs, title information indicating titles of the respective programs and genre information in which the respective programs are classified into plural genres; command receiving means adapted to receive a cursor control signal for moving display position of cursor displayed in a manner superimposed (overlaid) upon program table picture in order to designate at least one of the date and hour information, the title information and the genre information, and a determination control signal; genre setting means for setting the genre information; and control means for controlling the program table picture on the basis of the cursor control signal and the determination control signal. The control means controls the program table picture generating means so that when the receiving means receives the determination control signal in the state where cursor designates one of pictures relating to plural genre information, only the title of the program relating to the genre where cursor is positioned is displayed in connection with the title information.

BRIEF DESCRIPTION OF THE DRAWINGS

FIGS. 1A and 1B are views showing a conventional electronic program guide.

FIG. 2 is a view showing the entirety of program table of the conventional electronic program guide.

FIGS. 7A to 7D are views showing examples of display of program table.

FIGS. 9A to 9C are views for explaining changes of display picture at the time of program determination.

FIGS. 17A to 17D are views showing program table in the case where favorite program is designated and change of picture by its operation.

BEST MODE FOR CARRYING OUT THE INVENTION

Preferred embodiments of this invention will now be described in detail with reference to the attached drawings.

Figure 3:
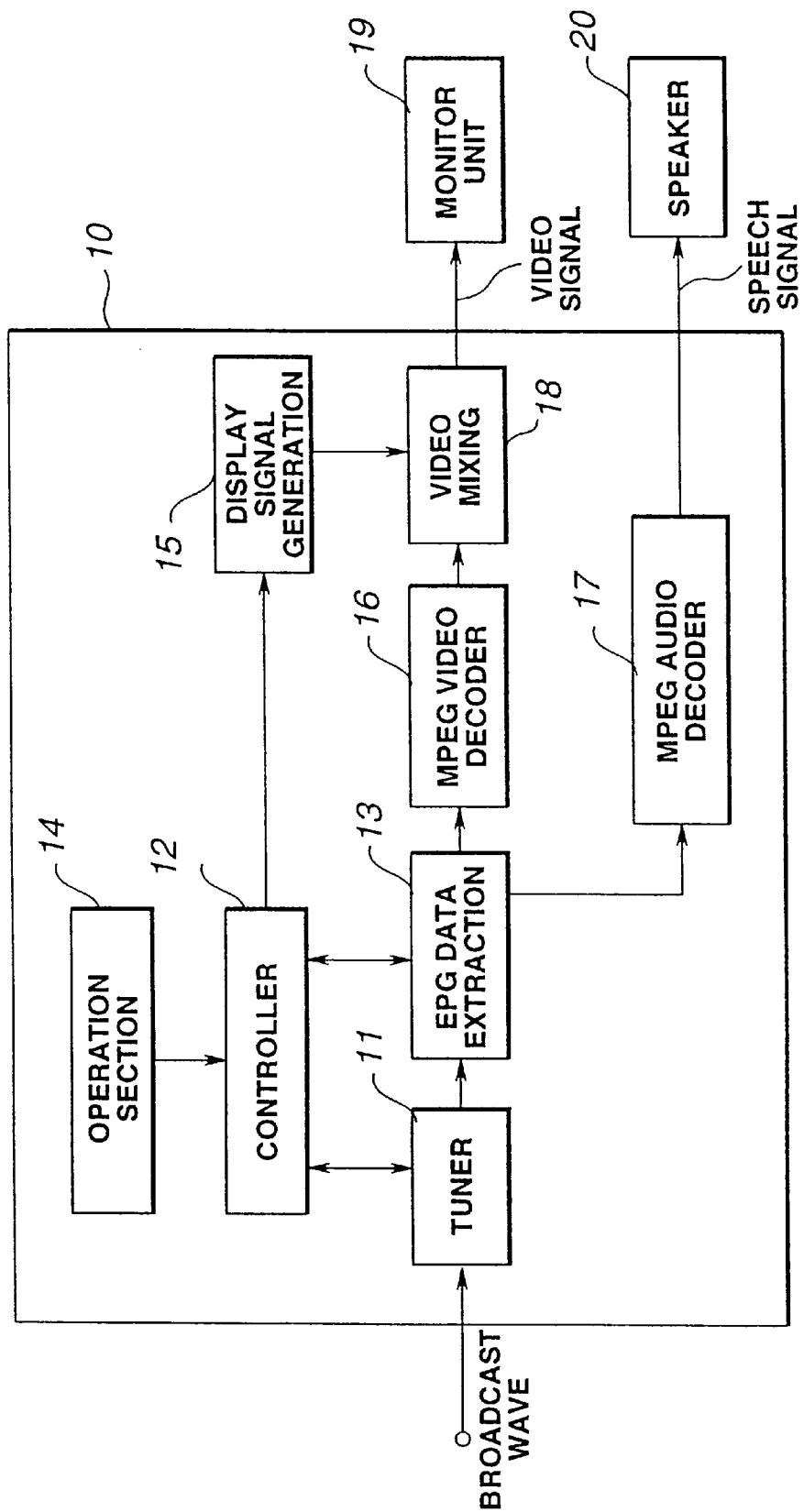
FIG. 3 is a block diagram showing the configuration of an electronic program guide control apparatus to which this invention is applied.

The following explanation will be given in order as below.
1. Configuration of electronic program guide control apparatus
2. Configuration of remote controller
3. Display form of electronic program guide
4. Processing operation for realizing electronic program guide display
5. Favorite channel
6. Favorite program
7. Genre registration
8. Other display form of electronic program guide 1. Configuration of electronic program guide control apparatus FIG. 3 shows the fundamental configuration of an electronic program guide control apparatus (integrated receiver/decoder: IRD) to which this invention is applied. In this electronic program guide control apparatus (unit) 10 which is an embodiment of this invention, a signal of broadcasting wave (labeled broadcast wave in the figure) received by, e.g., antenna, etc. is delivered to a tuner 11 through input terminal. On this signal of broadcasting wave, data (hereinafter referred to as EPG data) of electronic program guide (hereinafter referred to as EPG) is superimposed in accordance with a predetermined format.

This EPG data includes, e.g., data indicating titles of programs scheduled to be broadcasted in future at respective channels, data indicating broadcasting scheduled date, and broadcasting start and end times of respective programs, data indicating genres of programs, and data indicating outline or the casts (performers), etc. of programs, etc.

In this embodiment, it is assumed that the transmitting side such as broadcasting station, etc. transmits the above-described EPG data relating to programs of one week in the state superimposed on signal of broadcasting wave at a rate of one per several seconds.

It is to be noted that this signal of broadcasting wave may be signal of wire broadcast or signal of ground wave, etc. in addition to signal of satellite broadcast wave. In addition, the configuration of the tuner 11 may be suitably changed in dependency upon whether broadcast wave to be received is analog signal or digital signal.

The tuner 11 carries out tuning processing in accordance with control of a controller 12 which controls the entirety of this apparatus (unit). In addition, the tuner 11 delivers a signal of selected channel to a EPG data extracting circuit 13. In this example, the above-described EPG data is also included in signal outputted from the tuner 11 in addition to video/speech signals.

The controller 12 controls the tuner 11, the EPG data extracting circuit 13 and display signal generating circuit 15 which will be described later in correspondence with various operation commands from, e.g., operation switch provided at the body, or an operation section 14 which is remote controller, etc. shown in FIG. 6 which will be described later. This controller 12 will be described later in detail with reference to FIG. 4.

The EPG data extracting circuit 13 extracts EPG data included in output signal of the tuner 11 in accordance with control of the controller 12 to deliver it to the controller 12. This EPG data is converted, by the controller 12, into video data for display (hereinafter referred to as picture display data) in order to allow, e.g., a monitor unit 19 to display broadcasting date and hour, program title or genre, etc. as described later, and such picture display data is delivered to the display signal generating circuit 15.

Moreover, MPEG video data and MPEG audio data included in output signal of the tuner 11 inputted to the EPG data extracting circuit 13 are respectively delivered to a MPEG video decoder 16 and a MPEG audio decoder 17.

The display signal generating circuit 15 generates a video signal on the basis of picture display data delivered from the controller 12 to deliver that video signal to a video signal mixing circuit 18.

The MPEG video decoder 16 decodes MPEG video data delivered from the EPG data extracting circuit 13 to reproduce the video signal to deliver that video signal to the video signal mixing circuit 18.

The video signal mixing circuit 18 mixes the video signal delivered from the MPEG video decoder 16 and video signal of program information delivered from the display signal generating circuit 15 to output the mixed video signal to, e.g., monitor unit 19 as a video output signal.

Similarly, the MPEG audio decoder 17 decodes the MPEG audio data delivered from the EPG extraction circuit 13 to reproduce speech signal to deliver that speech signal to a speaker 20.

The more practical configuration of the controller 12 shown in FIG. 3 will now be described with reference to FIG. 4.

The central processing unit (hereinafter referred to as CPU) 21 is supplied, through an input/output (I/O) interface 22, with operation command from the operation section 14 shown in FIG. 3, and channel data and EPG data from the tuner 11 and the EPG data extraction circuit 13.

The CPU 21 executes processing corresponding to data or operation command inputted from the input/output (I/O) interface 22 on the basis of various programs stored in advance in a control program memory 23 comprised of, e.g., ROM (Read Only Memory).

In more practical sense, programs as indicated below are stored in advance in this control program memory 23. Namely, operation input control program 23A, tuning control program 23B, EPG data extraction control program 23C, picture display data preparation program 23D, and display signal generation control program 23E, etc. are stored in the control program memory 23.

The operation input control program 23A is program for carrying out processing corresponding to operation command inputted from the operation section 4. The tuning control program 23B is program used for control of tuning processing and/or judgment of result of tuning, etc. of the tuner 11. The EPG data extraction control program 23C is program for controlling extraction processing of EPG data of the EPG data extraction circuit 13. The picture display data preparation program 23D is program for preparing picture display data on the basis of EPG data delivered from the EPG data extracting circuit 13. The display signal generation control program 23E is program for controlling processing of the display signal generating circuit 15.

Moreover, a data memory 24 composed of, e.g., RAM (Random Access Memory) and VRAM (Video Random Access Memory), etc. is divided into plural storage areas for storing various (kind of) data. In these areas, there are stored cylinder EPG data base 24A, picture display data 24B, book mark list data 24C, timer reservation list data 24D, channel select data 24E, favorite channel data 24F, favorite program data 24G, genre registration data 24H, and genre default data 24I, etc.

The cylinder EPG data base 24A is data base of cylinder EPG which will be described later with reference to FIGS. 5A and 5B, and the picture display data 24B is data for display of cylinder EPG prepared by the picture display data preparation program 23D and written into the VRAM of the data memory 24. The book mark list data 24C is list of book marks that user has attached desired programs for convenience of retrieval. The timer reservation list data 24D is data relating to program that user has timer-reserved. When time reaches broadcasting time of program registered as data, the CPU 21 controls the tuner 11 to allow it to receive channel where that program is broadcasted. The channel select data 24E is data relating to channel No. of channel to be selected (after undergone tuning and program broadcasted in future at that channel. The favorite channel data 24F is data relating to favorite channel that user has registered. This favorite channel will be described in detail at the chapter of "5. Favorite channel". The favorite program data 24G is data relating to favorite program in which viewing (viewing/listening) frequency of user is high. This favorite program will be described in detail at the chapter of "6. Favorite program". The genre registration data 24H is data of eight (8) genres that user has selected from plural genres, and the genre default data 24I is initial value of genre registration data that the maker side has set in advance. This genre registration will be described in detail at the chapter of "7. Genre registration".

The fundamental display concept of EPG displayed on the monitor unit 19 shown in FIG. 3 on the basis of cylinder EPG data base will now be described. In this connection, the not-yet laid open Application relating to the cylinder EPG which will be described below has been already filed by the applicant of this application (Japanese Patent Application No. 26446/1996).

Figures 5A, 5B:
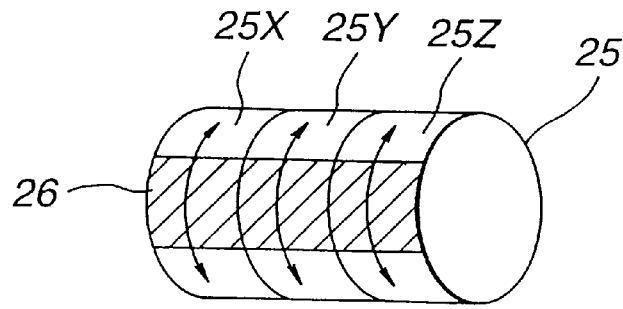
FIGS. 5A and 5B are views conceptually showing cylinder EPG.

FIG. 5A is a view conceptually showing EPG. In this EPG, cylinder 25 is partitioned into three areas of areas 25X, 25Y, 25Z in order from the left to the right of the drawing in the axial direction of cylinder. In addition, display area 26 which is a portion of the circular circumferential surface of the cylinder 25 corresponds to display screen of the monitor unit 19 shown in FIG. 3.

FIG. 5B is a view in which the areas 25X, 25Y, 25Z of this cylinder 25 are developed in flat surface form. In the area 25X disposed at the leftmost side of the three partitioned areas of the cylinder 25, date, days of the week and time (hour) are arranged from the upper direction to the lower direction of the drawing in ascending order of date and time (hour).

In the area 25Y disposed at the central portion of these three areas, title names, etc. of programs being broadcasted or programs broadcasted in future are arranged from the upper direction to the lower direction in ascending order of channel numbers and in ascending order of broadcast starting times.

In the area 25Z disposed at the rightmost side of these three areas, classification items by category of programs such as "All" "Movie", "Sports", "News" and "Music", etc., i.e., genre names are arranged from the upper direction to the lower direction. In this case, "All" includes all programs irrespective of the genres such as "Movie", "Sports", etc.

Particularly, in the embodiment of this invention, in the area 25Z corresponding to the genres of programs, items of "select (selective) channel" "favorite channel" and "favorite program" are provided in addition to the above-described genres. This "select channel" is information relating to channel displayed on the monitor unit 19, which has been selected after undergone tuning by the tuner 11.

The "favorite channel" and the "favorite program" will be described later in detail at the chapters of "5. Favorite channel" and "6. Favorite program".

Thus, user operates the operation section 14 (e.g., remote controller 14A shown in FIG. 6) to thereby allow desired information to be in correspondence with display area 26 shown in FIG. 5A in such a sense to respectively rotate the respective areas 25X, 25Y, 25Z, thereby permitting the monitor unit 19 to display that information thereon.

Namely, the cylinder 26 shown in FIG. 5A is formed by connecting respective ones of the uppermost rows and the lowermost rows of the areas 25X, 25Y, 25Z shown in FIG. 5B. When, e.g., in such a sense that user rotates the area 25X, he attempts to allow the monitor unit 19 to display the portion positioned further downward with respect to the ninth day, Saturday of the lowermost row of the area 25X, the third day, Sunday of the uppermost row of the area 25X is displayed on the monitor unit 19 in a manner succeeding to the ninth day, Saturday. In contrast, when, e.g., user attempts to allow the monitor unit 19 to display the portion positioned upward with respect to the third day, Sunday which is the uppermost row of the area 25X shown in FIG. 5B, the ninth day, Saturday is displayed at the portion positioned upward of the third day, Sunday on the monitor unit 19.

It is to be noted that there may be employed a configuration in which respective areas cannot be rotated in such a direction to continuously display the uppermost rows and the lowermost rows of the respective areas. Namely, there may be employed an approach in which in the case where user carries out such an operation to allow the monitor unit 19 to display information located upwardly of the uppermost rows of respective areas, or information located downwardly of the lowermost row, that operation is caused to be invalid.

As stated above, in the EPG to which this invention is applied, the cylinder is partitioned into plural areas to respectively assign date and hour, program, and genre to those respective areas to allow the respective areas to be rotatable. In this specification, such EPG is called "cylinder EPG" as occasion may demand.

2. Configuration of the remote controller

A more practical configuration of the operation section 14 shown in FIG. 3 will now be described. FIG. 6 is a plan view showing the configuration of remote controller 14A used in the case of carrying out remote control of this electronic program guide control apparatus (unit) 10. This remote controller 14A corresponds to the operation section 14 shown in FIG. 3.

A power button switch 30 and a television power button switch 31 respectively serve to allow power supplies of the electronic program guide control unit 10 and the monitor unit 19 to be turned ON or OFF.

When a mute button switch 32 is pushed down, sound outputted from the speaker 20 is muted. When it is operated for a second time, mute is released.

A television changeover button switch 33A and an IRD changeover button switch 33B are operated at the time of carrying out switching as to whether functions of respective button switches of this remote controller 14A are caused to be the function corresponding to the monitor unit 19 or the function corresponding to the electronic program guide control unit 19.

An input changeover button switch 34 is operated when input to the electronic program guide control unit 10 is switched. A picture display button switch 35 is operated when channel No., etc. (including station logo and title name) is caused to be displayed on the monitor unit 19. When this button switch 35 is operated for a second time, that display is erased. A double speech (sound) button switch 36 is operated in the case of switching speech (sound) to be outputted from the speaker 20 into main speech, sub speech and main+sub speech (foreign language or Japanese and foreign language) in the bilingual broadcast or multiplexed broadcast.

Numeric button switches 37 on which figures of 0 to 9 are indicated are operated when figures indicated on the respective button switches are inputted. A channel select (tuning completion) button switch 37A is adapted so that when operation of the numeric button switch 37 is completed, it is operated following completion of input operation in a sense to indicate numeric input completion and that inputted figure or figures represent channel.

Moreover, in the case where the above-described television changeover button switch 33A is operated and this remote controller 14A is caused to be remote controller for monitor unit 19, the button switch disposed at the lower side of the button switch of "7" of the numeric button switches 37 is caused to serve as button switch which inputs "10", the button switch labeled "0" is caused to serve as button switch which inputs "11", and the channel select button switch 37A is the button switch which inputs "12". On the monitor unit 19 shown in FIG. 3, program of channel selected (tuned) in correspondence with the pushed-down button switch is displayed.

A menu button switch 38 is operated when the monitor unit 19 is caused to display menu picture (not shown) for various setting (items) of EPG or the electronic program guide control unit 10, and an information button switch 39 is operated when the monitor unit 19 is caused to display information picture which will be described later.

A current program button switch 40 and a program announcement (notice) button switch 41 are used for channel selection of promotion channel, and are respectively operated when the monitor unit 19 is caused to display announcement (notice) of program being broadcasted or program scheduled to be broadcasted in future, and a program table button switch 42 is operated when the display unit 19 is caused to display EPG, e.g., program table 50 as shown in FIGS. 7A to 7D.

A select button switch 47 is adapted to have ability to undergo push-down operation (select operation) in a direction perpendicular to the upper surface of the remote controller 14A. An up button switch 43, a down button switch 44, a left button switch 45 and a right button switch 46 are operated when cursors displayed on picture, e.g., cursors $51X_1$, $51X_2$, 51Y, 51Z, etc. shown in FIGS. 7A to 7D are caused to be moved in upper and lower directions and in left and right directions.

A volume button switch 48 and a channel up/down button switch 49 are operated when sound volume and No. of channel are respectively increased or decreased.

3. Display form of the electronic program guide

Form of display of EPG in this embodiment will now be described with reference to FIGS. 7A to 9C.

Figure 7A:
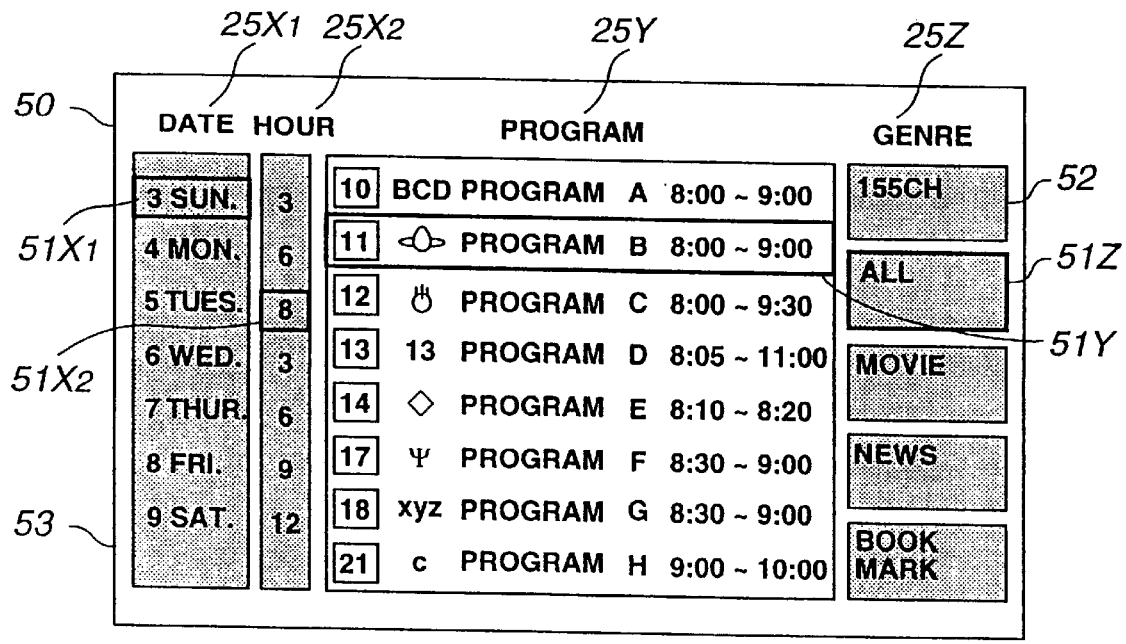

FIGS. 7A and 7D are views respectively showing examples of EPG displayed on display screen 53 of the monitor unit 19 shown in FIG. 3 as more practical display forms of the cylinder 25 shown in FIG. 5. In these FIGS. 7A to 7D, the examples where each program table 50 is displayed on a full scale within screen 53 are shown.

In these program tables 50 shown in FIGS. 7A to 7D, area 25X in which date and hour are displayed is further divided into area $25X_1$ where date and days of the week are displayed and area $25X_2$ where hours (times) are displayed.

Figure 6:
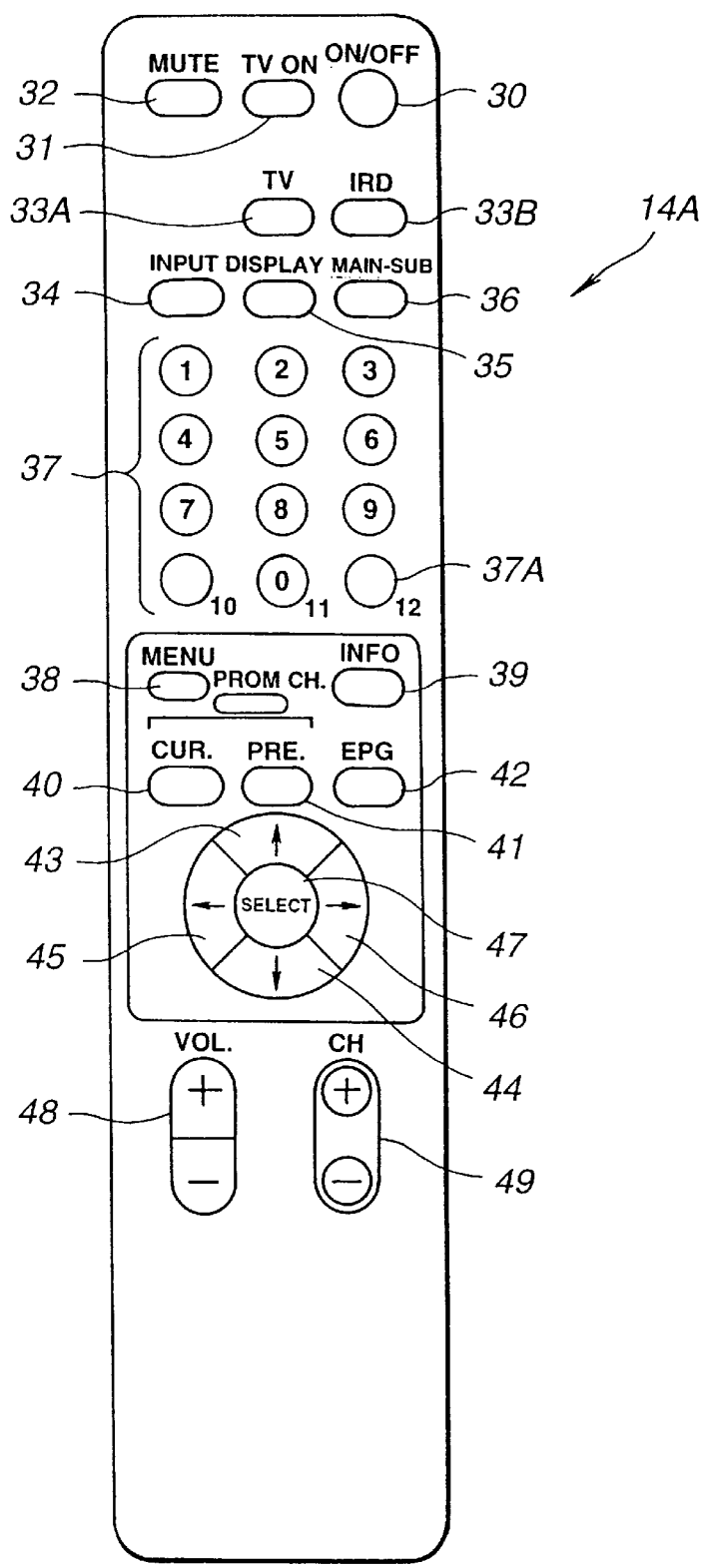
FIG. 6 is a plan view showing an example of the configuration of remote controller.

Moreover, in respective areas $25X_1$, $25X_2$, 25Y and 25Z, there are displayed cursors which can be moved (cursor $51X_1$ of area $25X_1$, cursor 512 of area $25X_2$, cursor 51Y of area 25Y and cursor 51Z of area 25Z) by allowing user to operate the operation section 14 shown in FIG. 3 (remote controller 14A shown in FIG. 6). Further, in this embodiment, item of select channel 52 is provided as information relating to broadcasting channel in the area 25Z for displaying genre.

In this example, in the display states shown in FIGS. 7A to 7D, there results the state where area 25Y is selected. Only the cursor 51Y of the area 25Y can be directly moved by operation by user, and cursors in other areas, i.e., cursors $51X_1$, $51X_2$ and 51Z are not permitted to directly undergo movement operation by user.

For example, in FIG. 7A, cursor $51X_1$ is placed (located) at the portion of the third day, Sunday in the area 25X, where date is displayed.

Further, in the area 25Z where genre is displayed, cursor 51Z is placed (located) at the portion of "All". Accordingly, in the area 25Y, titles of all programs broadcasted at times subsequent to a.m. 8 o'clock of the third day, Sunday are displayed along with channel Nos. and broadcasting times irrespective of specific genres. In this area 25Y, titles of programs as many as possible are adapted to be displayed.

In this example, in the area 25Y of FIG. 7A, broadcasting channels of programs, the so-called station logos symbolically indicating broadcasting stations and program titles are displayed from the left every program. Additionally, the titles displayed in the area 25Y are titles of programs scheduled to be broadcasted at times subsequent to current time.

In this case, the cursor 51Y of the area 25Y is assumed to be placed (located) with respect to "program B" broadcasted over the time zone from a.m. 8:00 to a.m. 9:00 at the 11-th channel. Further, cursor $51X_2$ of the area $25X_2$ is placed (located) at the position corresponding to a.m. 8:00 which is the broadcast starting time of this "program B", and figure of "8" indicating time zone of eight o'clock is displayed in an emphasized manner within the cursor $51X_2$.

Figure 7B:
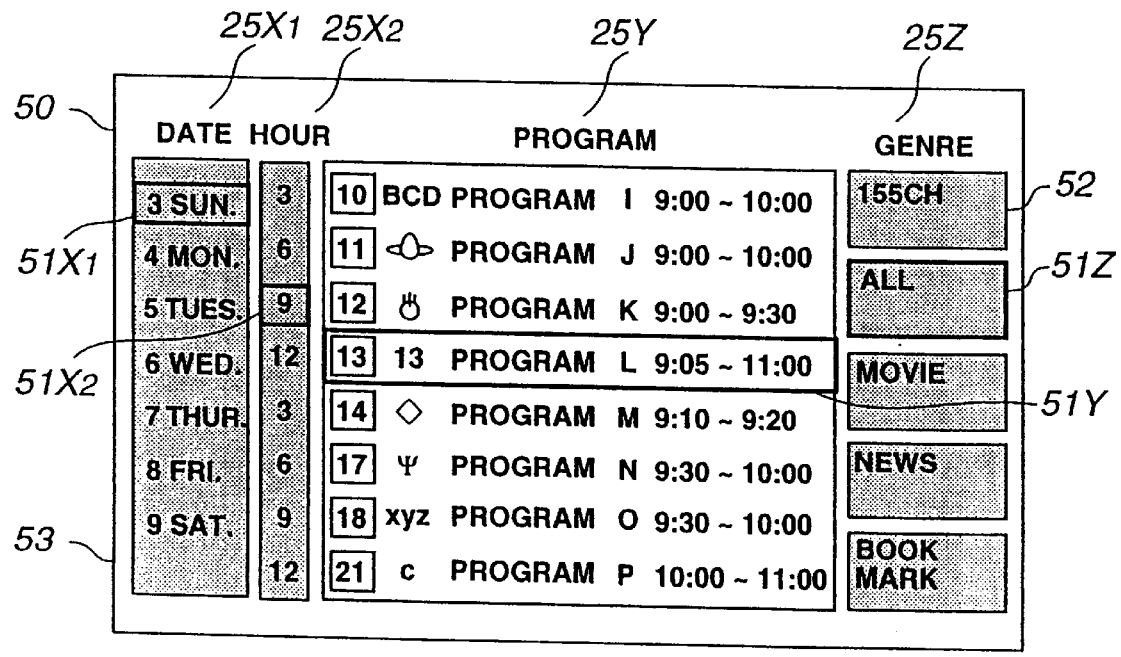

In FIG. 7B, there is shown the state where cursor 51Y has been moved to the position of the program title of "program L" of 13-th channel from the state of FIG. 7A.

Such cursor movement in the longitudinal direction within the area is carried out by operating, e.g., the up button switch 43 and the down button switch 44 of the remote controller shown in FIG. 6, and cursor 51Y corresponding to the selected area 25Y can be moved toward upper or lower line in succession.

For example, every time user once pushes down the up button switch 43, the cursor 51Y is moved in the upper direction. Moreover, when user further pushes down the up button switch 43 in the state where the cursor 51Y is placed on the uppermost line, display content is scrolled with such an image to rotate the area 25 of the cylinder 25 shown in FIG. 5A.

Moreover, when the user pushes down the down button switch 44, the cursor 51Y is moved in the lower direction. Further, when user further pushes down the down button switch 44 in the state where the cursor 51Y is placed on the lowermost line of the area 25, display content is similarly scrolled with such an image to rotate the area 25Y of the cylinder 25.

It is to be noted that scroll operation as described above can be carried out not only within the area 25Y, but also within respective areas of $25X_1$, $25X_2$, 25Z, i.e., in the state where, e.g., a certain area is selected and any one of cursors $51X_1$, $51X_2$, 51Z corresponding to the selected area is caused to be movable.

For example, in the case where the cursor 51Y is moved as shown in FIG. 7B from the position shown in FIG. 7A, "program L" is broadcasted within the time zone from a.m. 9:05 (9 o'clock, 5 min.) to a.m. 11:00. For this reason, in a manner to follow this, the cursor $51X_2$ is placed (located) with respect to the position indicating approximately a.m. 9:00 which is nearly in correspondence with the broadcast starting time of "program L", and figure of "9" indicating time zone of 9 o'clock is displayed in an emphasized manner.

In FIG. 7C, there is shown the state where the cursor 51Y has been further moved to the title of the program broadcasted within the succeeding broadcast time zone from the state shown in FIG. 7B. In this case, the cursor 51Y is placed (located) with respect to the "program U" of channel 14-th broadcasted from a.m. 12*10 of midnight to a.m. 12*20. Also in this case, the cursor $51X_2$ is placed (located) in the state moved to the position indicating approximately 12 (0) o'clock which is nearly in correspondence with the broadcast starting time of "program U", and figure of "12" indicating time zone of 12 o'clock is displayed in an emphasized manner.

Moreover, the time zone from a.m. 12:10 to a.m. 12:20 which is the broadcasting time (time period) of the "program U" is "the fourth day, Monday" of the next day as date. For this reason, the cursor $51X_1$ of the area $25X_1$ is placed (located) in the state moved to the position of "the fourth data, Monday" of the next day from the position of "the third day, Sunday" shown in FIGS. 5A, B.

Further, it is now assumed that the cursor 51Y is moved from the state shown in FIG. 7C to the title of program broadcasted within the succeeding/broadcasting time zone and the cursor 51Y is placed (located) at "program f" of 17-th channel broadcasted from a.m. 1:30 to a.m. 2:00 as shown in FIG. 7D.

In this case, the cursor $51X_2$ of the area $25X_2$ is placed (located) in the state moved to the position indicating about a.m. 1 o'clock which is approximately in correspondence with the broadcast stating time of "program f", and figure of "1" indicating the time zone of a.m. 1 o'clock is displayed in an emphasized manner. At this time, the cursor $51X_1$ of the area $25X_1$ is placed (located) in the state moved to the position of "the fourth day, Monday".

In FIGS. 7A to 7D, changes of the display forms followed by movement of the cursor 51Y in the area 25Y have been explained. Then, changes of display form followed by cursor movement in other areas except for the area 25Y will be described with reference to FIGS. 8A to 8H.

For example, when user operates, from the state where he selects the 155-th channel to carry out viewing of program, the IRD changeover button switch 33B and the program table button switch 42 of the remote controller 14A shown in FIG. 6 to provide access to EPG, program table 50 is displayed on display screen 53 of the monitor unit 19. Namely, the program table 50 is displayed in the state superimposed on image of the program of the 155-th channel selected at present.

Figure 8A:
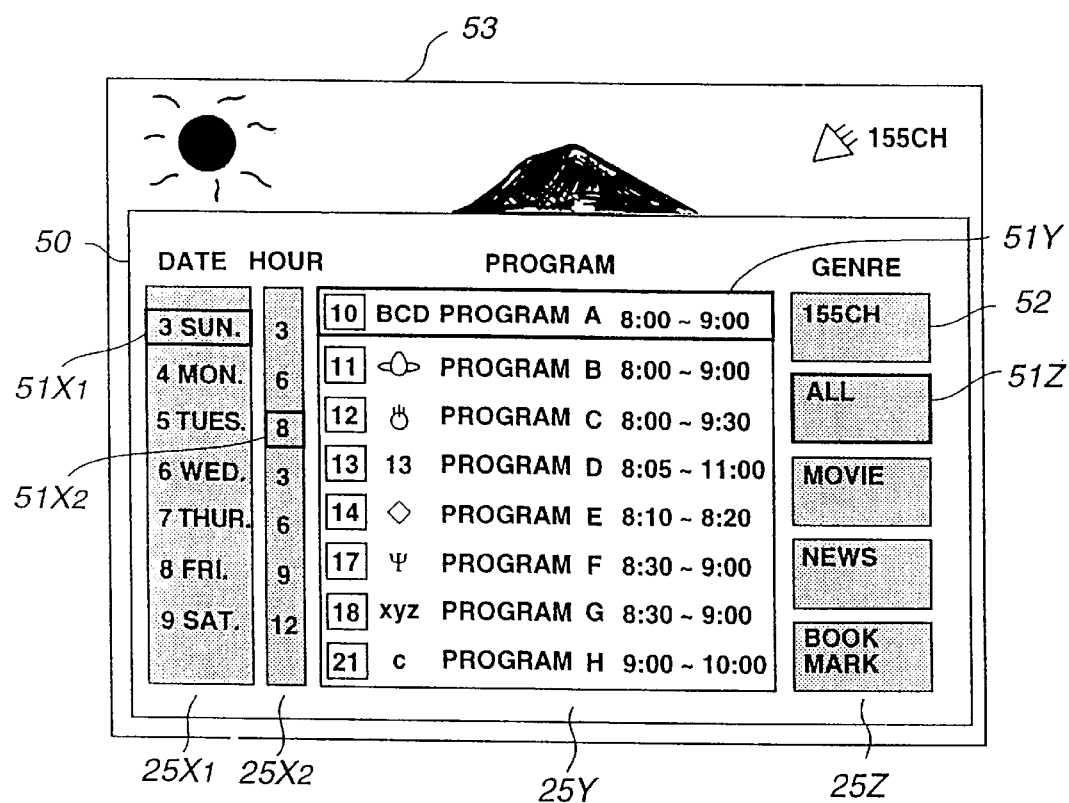
FIGS. 8A to 8H are views for explaining movement of cursor in the program table.

In this case, the state similar to FIG. 7A is indicated in the program table 50 of FIG. 8A. Namely, since the area 25Y is selected, only the cursor 51Y is permitted to undergo direct movement operation by user, and cursors $51X_1$, $51X_2$, 51Y, 51Z of other areas $25X_1$, $25X_2$, 25Y, 25Z are placed in the state where they are not permitted to undergo direct movement operation by user.

Moreover, in this example, the item of selective channel 52 is provided as one selective item of genre in the area 25Z. The select channel 52 is channel No. of the broadcasting station selected (after undergone tuning) by the tuner 11 shown in FIG. 3.

Accordingly, the channel No. displayed at the select channel 52 changes every time in dependency upon the channel selected at present. In the case of FIG. 8A, because 155-th channel is selected and displayed at present, the channel No. is "155 CH".

In FIG. 8A, a portion of the program being broadcasted at the 155-th channel is displayed on the screen 53 in a manner overlaid upon the program table 50. Further, at the right and upper corner portion of screen 53, the station logo and channel No. of the 155-th channel are displayed. Presence/absence of display of the station logo and the channel No. is switched by allowing user to operate the picture display button switch 35 of the remote controller 14A shown in FIG. 6.

Figure 8B:
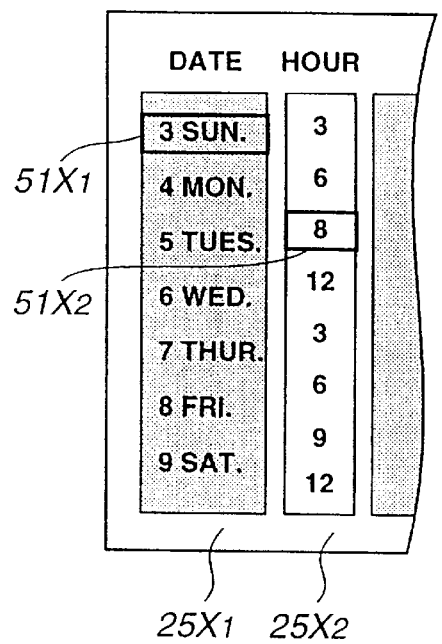

When, e.g., user is assumed to once operate the left button switch 45 of the remote controller 14A shown in FIG. 6 from the state shown in FIG. 8A, display of the grogram table 50 changes to the state shown in FIG. 8B. This state is the state where the area $25X_2$ in which time is displayed which adjoins at the left side of the area 25Y is selected. In this display state, the cursor $51X_2$ of the area $25X_2$ can be directly moved by operation of user, and cursors in other areas are placed in the state where they are not permitted to undergo direct movement operation by user.

Further, the up button switch 43 or the down button switch 44 of the remote controller 14A shown in FIG. 6 is operated from the state of FIG. 8B to thereby move the cursor $51X_2$ in an arbitrary upper or lower direction, thus making it possible to designate new time. For example, in FIG. 8C, there is shown the state where the down button switch 44 is once pushed down from the state of FIG. 8B, whereby designated time is changed from "8 o'clock" to "9 o'clock".

When the designated time is changed in this way, its display content is changed in the area 25Y so that plural programs broadcasted at times subsequent to 9 o'clock are caused to be candidate although not shown.

Figure 8C:
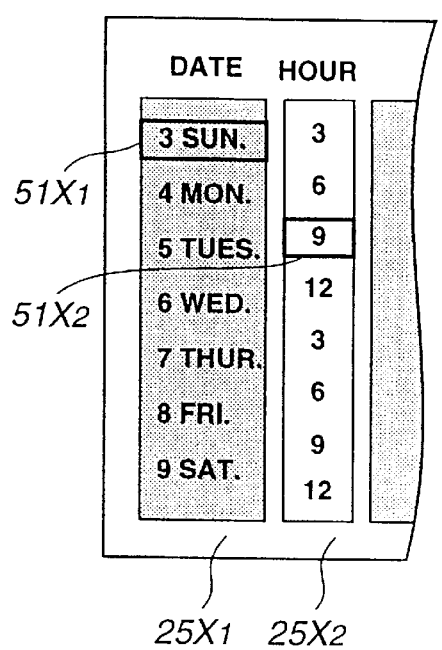
Figure 8D:
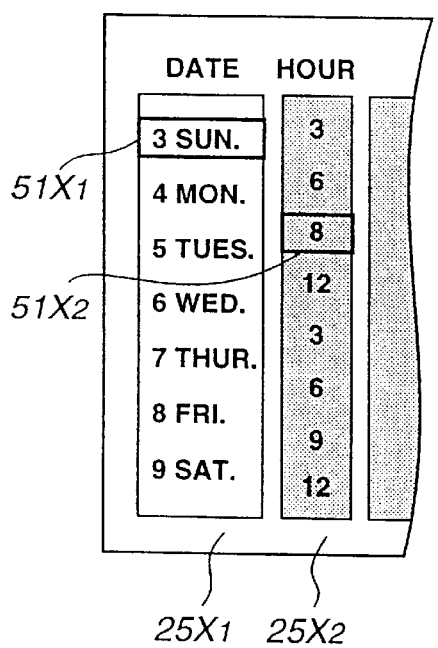

Moreover, when the left button switch 45 is further once pushed down from the state of FIG. 8D, the area $25X_1$ where date is displayed is selected as shown in FIG. 8D. Thus, the cursor $51X_1$ can be directly moved by operation of user, whereas cursors of other areas cannot be directly moved by operation of user. The state of the area $25X_2$ at this time is similar to that of FIG. 8B.

Figure 8E:
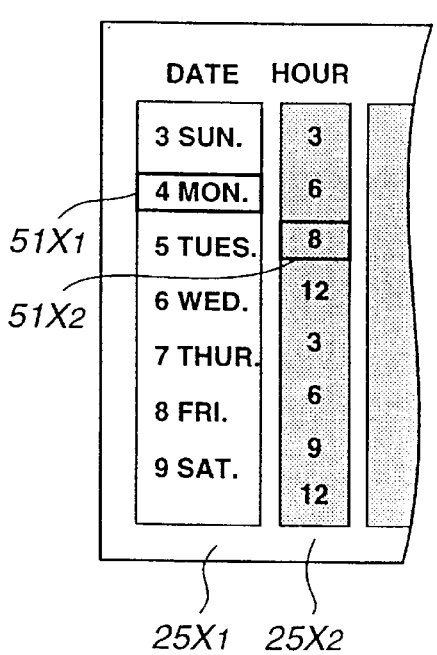

Further, the up button switch 43 or the down button switch 44 is operated after there results the state of FIG. 8B to thereby move the cursor $51X_1$ in upper and lower directions, thus making it possible to designate new date. In FIG. 8E, there is shown the state where the down button switch 44 is once pushed down, whereby Monday of the fourth day is newly designated.

Also in this case, in the area 25Y, its display content is changed so that the programs broadcasted subsequently to Monday of the fourth day are caused to be candidate.

Figure 8F:
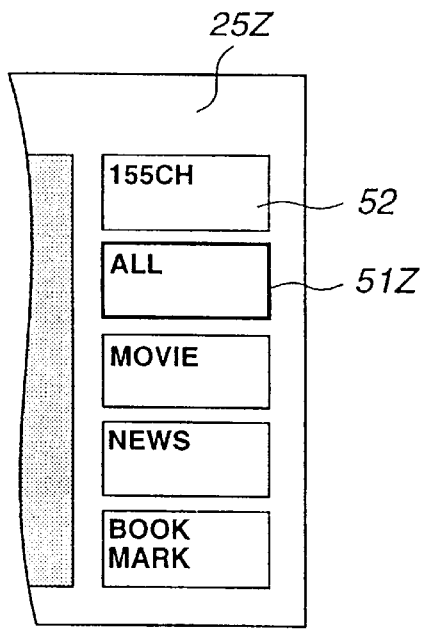

Moreover, every time the right button switch 46 is operated from the state of FIG. 8D, the selected area is moved in the right direction in succession as shown in FIG. 8A from FIG. 8B. Namely, the selected area is changed in succession. In the case where the right button switch 46 is further pushed down from the state of FIG. 8A, the display state shifts to the state where the area 25Z where genre is displayed, which is shown in FIG. 8F. Thus, the cursor 51Z can be moved. At this time, cursors $51X_1$, $51X_2$, 51Y of other areas are not permitted to undergo movement operation.

Also in this case, the cursor 51Z is moved by operation of the up button switch 43 or the down button switch 44, thereby making it possible to arbitrarily select other genre. When the up button switch 43 is once pushed down from the state where "All" is designated, which is shown in FIG. 8F, there results the state where the select channel 52 displayed as "155 CH" as shown in FIG. 8G is designated.

Figure 8G:
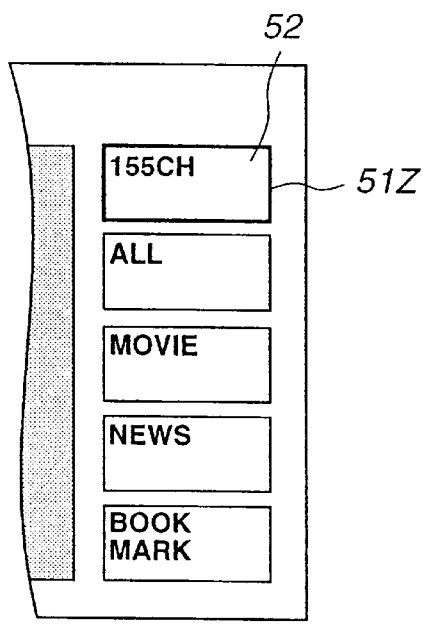
Figure 8H:
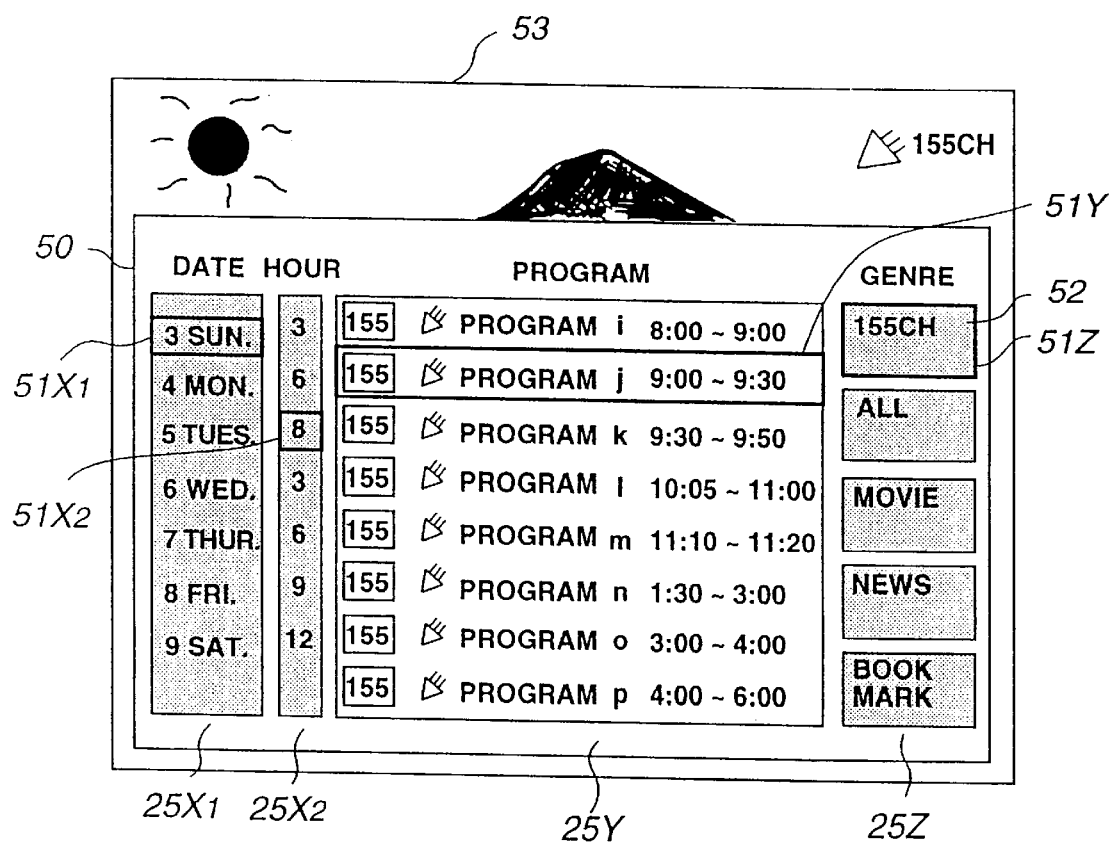

Further, in the state where the cursor 51Z is placed (located) at the selective channel 52 displayed as "155 CH" as shown in FIG. 8G, the display content is changed in the area 25Y. As a result, as shown in FIG. 8H, for example, plural program titles scheduled to be broadcasted at the 155-th channel at times subsequent to a.m. 8 o'clock are displayed in order of their broadcast starting times. Thus, user can grasp titles of programs broadcasted at times subsequent to the present time at the channel subject to viewing at via present.

Additionally, in FIG. 8H, there is shown the state where the area 25Y of the program table 50 is selected and the cursor 51Y is permitted to undergo movement operation.

As stated above, in this embodiment, the genre designation operation is carried out in the area 25Z, thereby making it possible to grasp, in broadcasting channel units, programs scheduled to be broadcasted in addition to ability to grasp program candidates every genres which are classification such as "movie" or "news", etc.

On the other hand, in the case where the item of "book mark" is selected in the area 25Z, title of the program to which book mark is attached is displayed in the area 25Y, e.g., in order of broadcast starting times as described later.

Further, every time the left button switch 45 is once pushed down from the state shown in FIG. 8F, for example, the selected area is moved in the left direction in succession. This movement corresponds to change to the display state shown in FIG. 8B from FIG. 8A and to the display state shown in FIG. 8D therefrom.

Figure 9A:
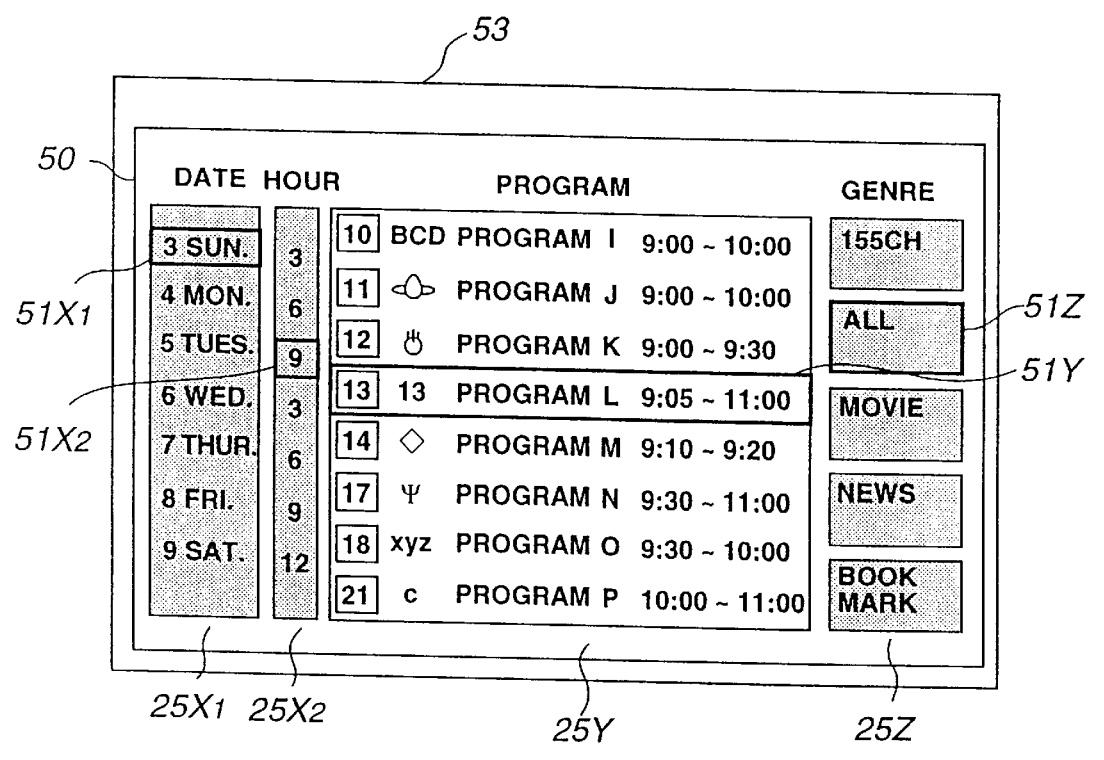
Figure 9B:
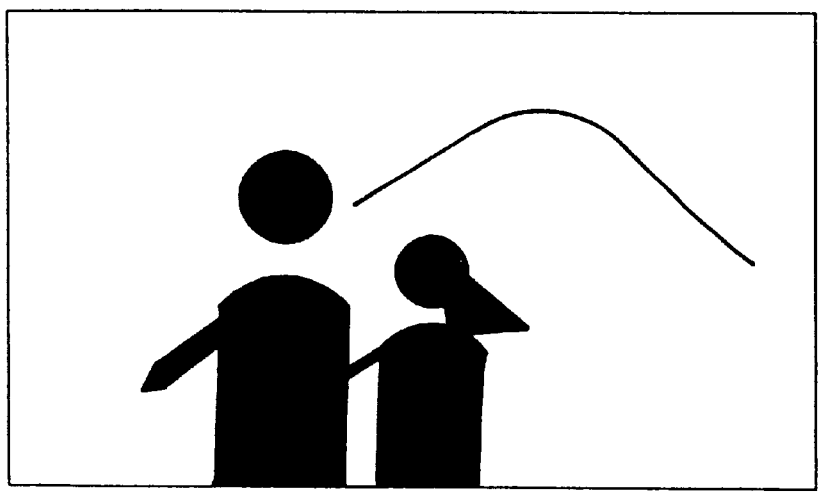

Display form in the case where user selects a desired program title from program titles displayed by the program table 50 to determine it will now be described with reference to FIGS. 9A to 9C. Such operation for carrying out selection/determination of program is carried out by allowing user to push down the select button switch 47 of the remote controller 14A shown in FIG. 6 in the state where he moves the cursor to the desired program title in the area 25Y.

It is assumed that, e.g., the present date time (hour) is about a.m. 9:10 of the third day, Sunday and the program table 50 shown in FIG. 9A is displayed. It is further assumed that user operates the above-described remote controller 14A to push down the select button switch 47 in the state where the cursor 51Y has been made to "program L" of the 13-th channel (broadcasted for time period from a.m. 9:05 to a.m. 11:00) in the area 25Y, i.e., carries out an operation of selection/determination with respect to the "program L".

Since the selected program "program L" is being broadcasted at this time point, the EPG, i.e., the program table 50 displayed on the screen 53 of the monitor unit 19 shown in FIG. 3 is erased so that there results the state switched into the broadcast picture of "program L". Thus, user can carry out viewing (viewing/listening) of the selected program.

On the other hand, it is assumed that, for example, by operation similar to the above-described operation, user has carried out operation of selection/determination with respect to "program P" of the 21-th channel (broadcasted for time period from a.m. 10:00 to a.m. 11:00). At this time, the selected program "program P" is the program which is not broadcasted at present, and is scheduled to be broadcasted in future. In such a case, in this embodiment, this electronic program guide control unit 10 displays information indicating information of the program content, etc. of the "program P" as shown in FIG. 9C on the screen 53 of the monitor unit 19.

Figure 9C:
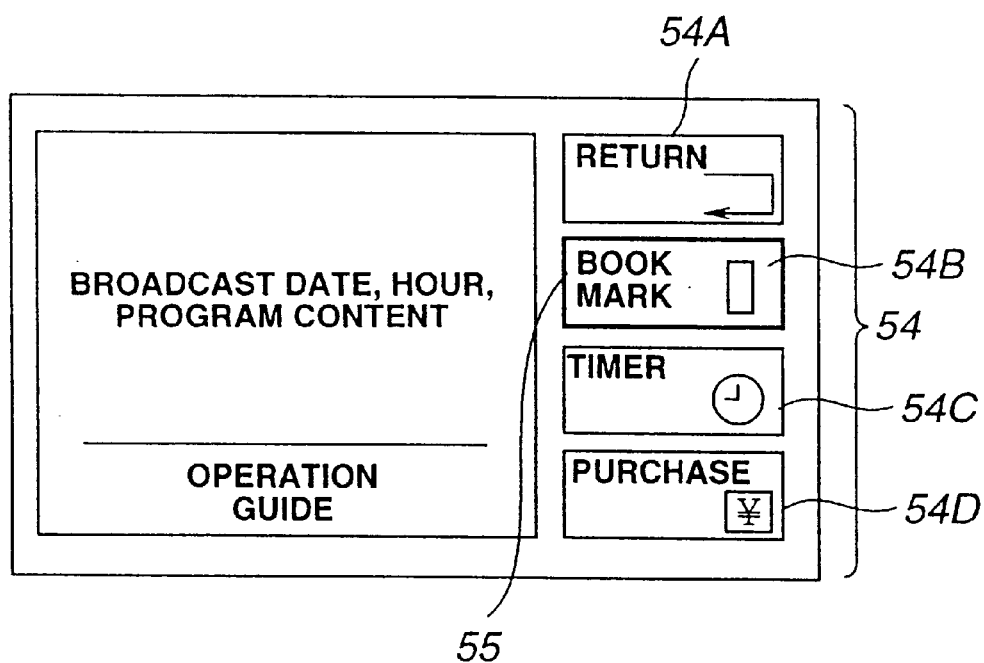

On the information picture shown in FIG. 9C, the broadcast date and hour and the program content, etc. of the program selected by user, i.e., "program P" in this example are displayed, and various command icons 54 which can be selected by user are displayed. In this case, as previously described, information of such program content is also transmitted along with broadcast signal as EPG data.

In the FIG. 9C mentioned above, as the command icon 54, there are displayed icon 54A for displaying program table 50 for a second time, icon 54B for attaching book mark to the program where the information picture is displayed at present, icon 54C for receiving this program at that broadcast starting time to display it, and icon 54 used for television shopping or purchase of program which requires viewing fee which are shown in FIG. 9A.

User operates the up button switch 43 and the down button switch 44 of the remote controller 14A shown in FIG. 6, thereby making it possible to place (locate) cursor 55 at an arbitrary command icon. Further, user pushes down the select button switch 47, thereby making it possible to carry out selection/determination of one command icon where cursor 55 is placed (located).

Further, if, e.g., icon 54A has been selected and determined, display switches from the information picture of FIG. 9C to the picture of the program table 50 shown in FIG. 9A. Moreover, if icon 54B is selected and determined, book mark is attached to the program introduced by this information picture at present. Thus, e.g., title and broadcast starting time, etc. of this program are registered into the data memory 24 as book mark list data 24C shown in FIG. 4. Moreover, if icon 54C is selected and determined, the timer reservation processing of the program introduced by this information picture, e.g., processing for registration, into the data memory 24, channel No., broadcast starting time and broadcast end time, etc. of this program as timer reservation list data 24D is carried out. Further, the CPU 21 is operative so that in the case where program is registered in the timer reservation list, it carries out time count operation to control the tuner 11 when its broadcast starting time is reached to allow it to receive that program to allow the monitor unit 19 to display that program.

As stated above, in this embodiment, such an approach is employed to partition the program table 50 into plural areas to assign date, time, title of program and genre, etc. to respective areas to display the program table 50 constituted in this way on the display screen 53 of the monitor unit 19. Further, since there is employed such an approach to operate cursors of various areas on the program table 50 to thereby obtain various information relating to, e.g., programs broadcasted in future, it is possible to obtain information relating to a desired program or programs on the same picture (on screen) without switching picture display.

Moreover, in the area 25Y where title of program is displayed, a large number programs are disposed in a line in longitudinal direction in order of broadcasting times with the program being broadcasted being as the leading portion and cursor of that area is moved, whereby displays of dates and times of other areas $25X_1$, $25X_2$ change in a manner interlocking therewith. Accordingly, even if designation of date and time is not carried out, it is possible to easily select program. Further, if date, time or genre is changed, display of title of program is also changed in a manner interlocking with that change.

In addition, in this embodiment, in the area 25Z, there is provided select channel 52 for obtaining various information title and/or broadcasting date and hour, etc. of program scheduled to be broadcasted at the channel selected at present as information related to broadcast channel. For this reason, the selection range (items) as the retrieval genre becomes abundant. Thus, use convenience is improved also for user.

4. Processing operation for realizing electronic program guide display

The processing operation of CPU 21 for realizing display of electronic program guide (EPG) of the embodiment which has been described with reference to FIGS. 7A to 9C until now will now be described with reference to FIGS. 10A to 11.

Initially, the processing operation for changing display on the basis of operation of the remote controller 14A shown in FIG. 6, i.e., the operation section 14 shown in FIG. 3 will be described with reference to FIGS. 10A and 10B.

The CPU 21 first executes operation input control program 23A to thereby carry out processing corresponding to various operation commands inputted from the remote controller 14A. Namely, the CPU 21 stand by (waits) operation of the program table button switch 42 of the remote controller 14A.

Figure 10A:
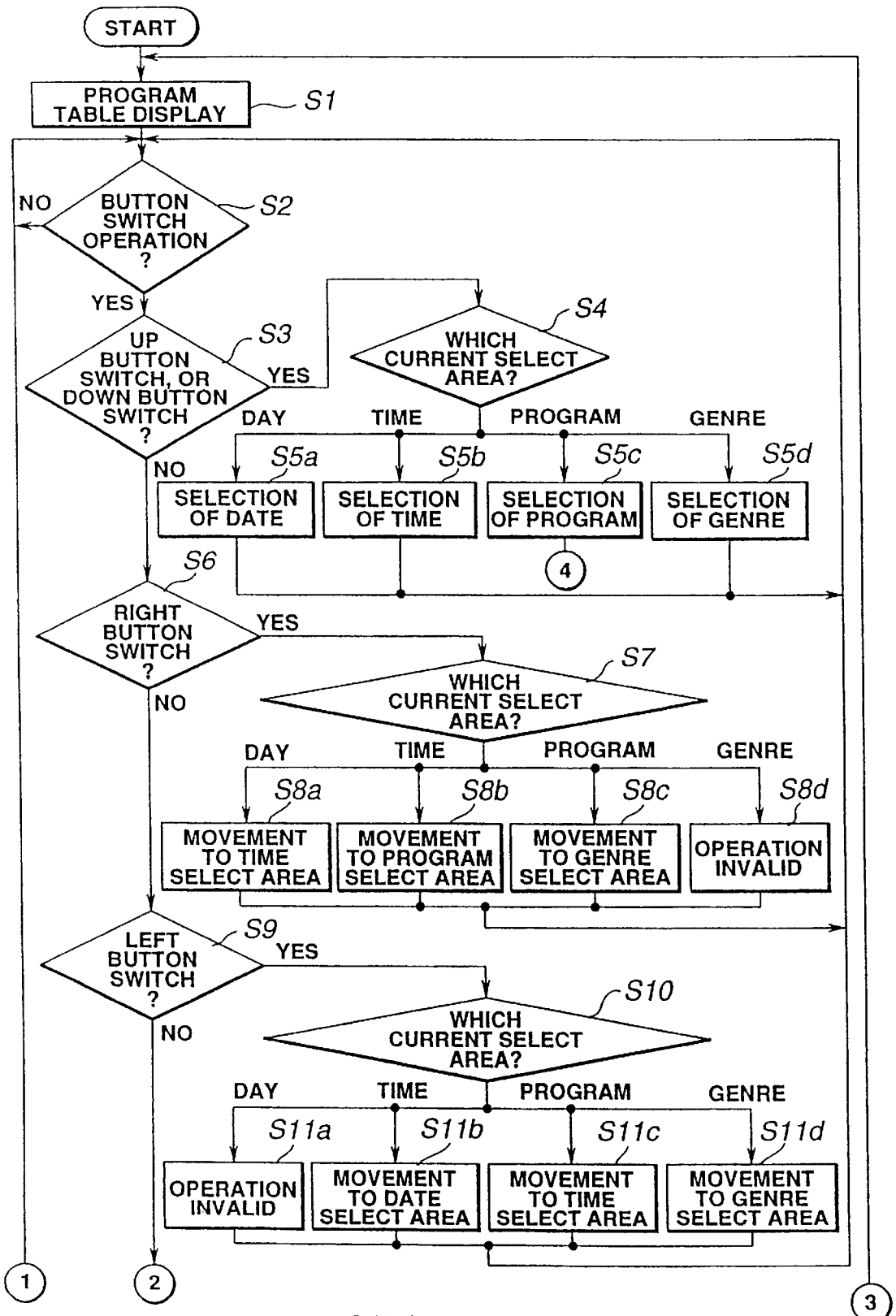
FIGS. 10A and 10B are flowcharts showing processing operation of CPU in order to display electronic program guide (program table).
Figure 10B:
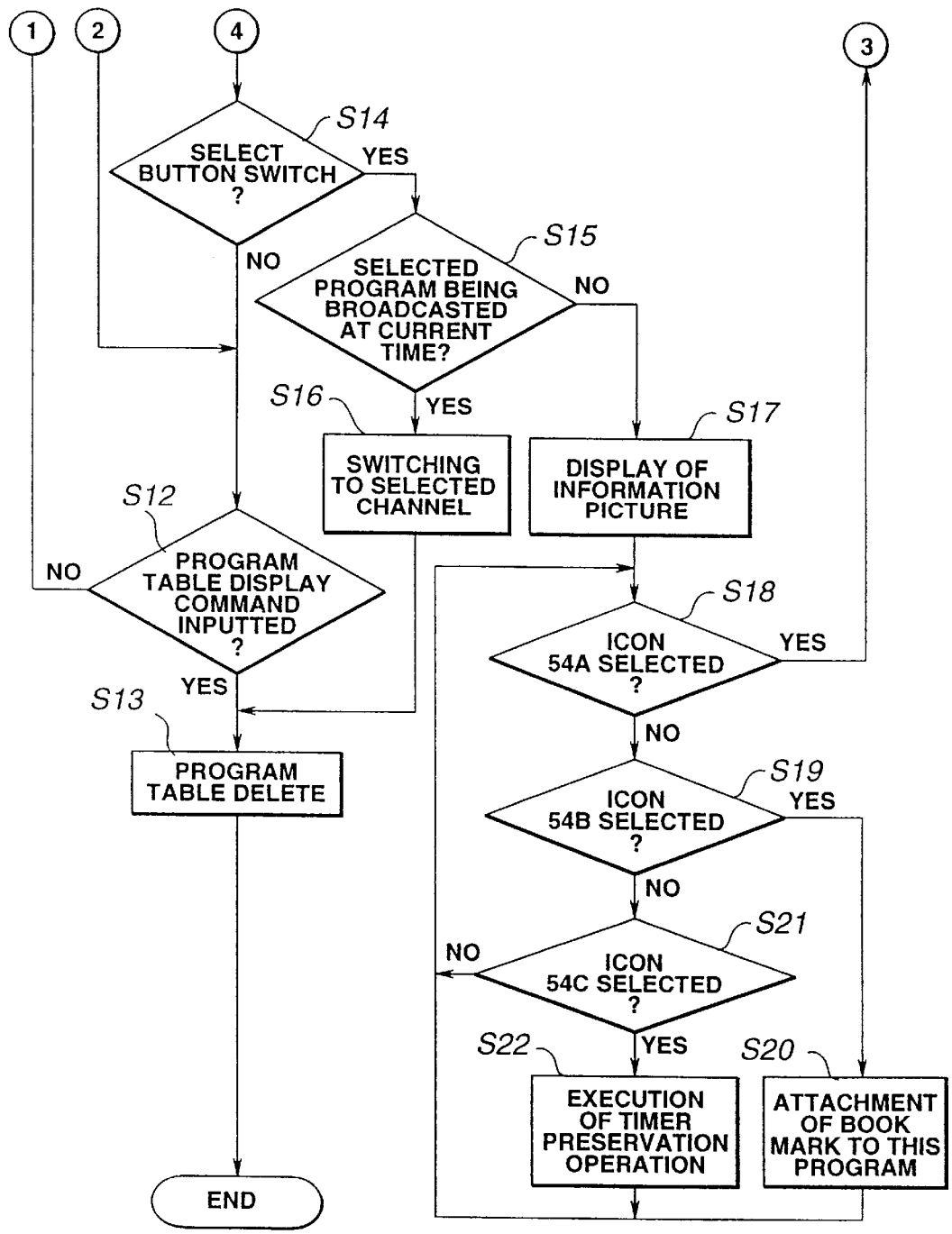
Figure 11:
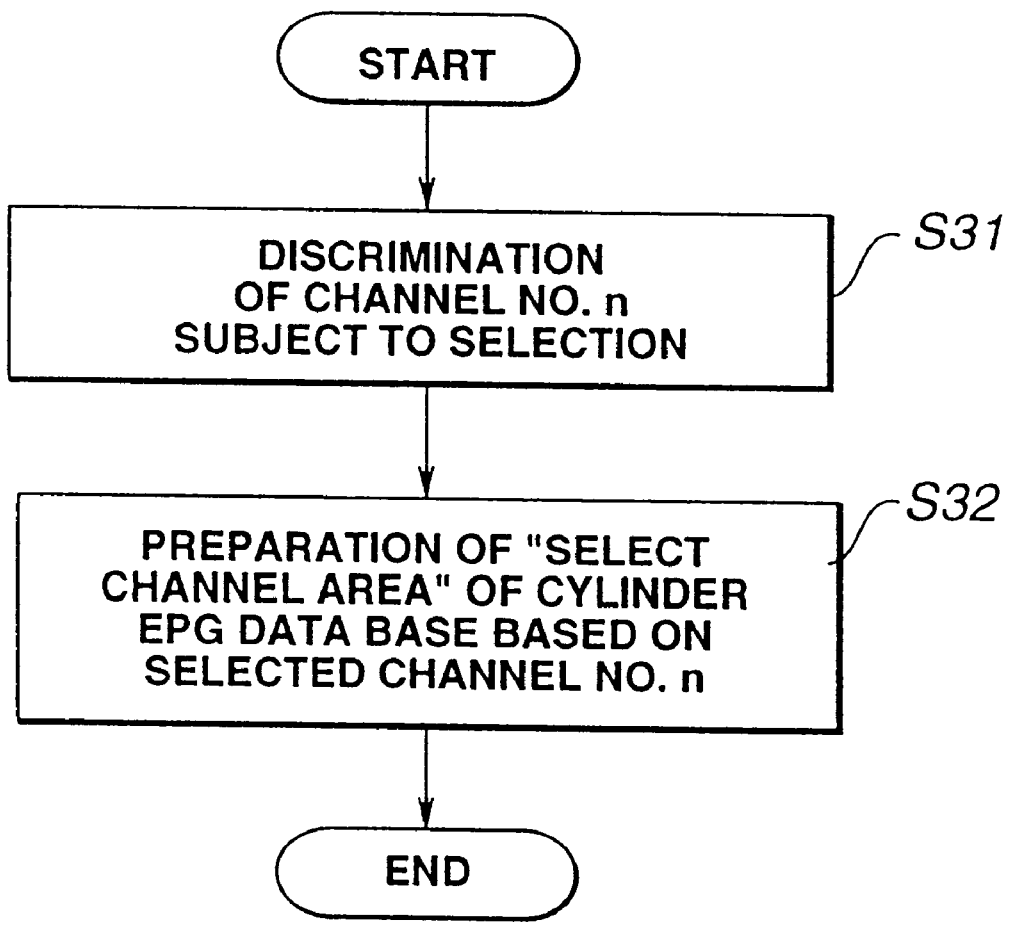
FIG. 11 is a flowchart showing processing for generation of information items of tuning channels.

When it is assumed that, e.g., command for selecting a certain channel is inputted for this time period, the CPU 21 executes the tuning control program 23B in accordance with, e.g., operation command inputted through input/output (I/O) interface as the processing of other routine which is not shown in FIGS. 10A and 10B. The tuner 11 carries out tuning with respect to receiving signal inputted thereto by this processing to deliver received output of the designated channel to the MPEG video decoder 16 and the MPEG audio decoder 17 through the EPG data extracting circuit 13.

In this example, EPG data of one week is superimposed on signal of broadcast wave delivered to the tuner 11 at a rate of one per several seconds. This EPG data is updated into latest data, e.g., at a rate of one per three hours. In output of the tuner 11 delivered to the EPG data extracting section 13, this EPG data is also included.

The CPU 21 executes EPG data extraction control program 23C stored in the control program memory 23 to thereby control the EPG data extracting circuit 13. The EPG data extracting circuit 13 extracts EPG data included in output of the tuner 11 in correspondence with this control to deliver the extracted EPG data to the CPU 21 through the input/output interface 22. The CPU 21 allow the data memory 24 to store this EPG data thereinto as cylinder EPG data base 24A. Moreover, the display signal generating circuit 15 converts picture display data 24B of program table 50 (EPG) delivered from the CPU 21 as described later into display signal by control of the CPU 21 based on the display signal generation control program 23E to deliver the display signal thus obtained to the video signal mixing circuit 18.

At this time, the video signal mixing circuit 18 is supplied with video signal outputted from the EPG data extracting circuit 13 and reproduced by the MPEG video decoder 16, i.e., video signal of the program selected after undergone tuning by the tuner 11. The video signal mixing circuit 18 outputs this video signal to the monitor unit 19. Moreover, speech signal reproduced at the MPEG audio decoder 17 is outputted to the speaker 20. In this way, image and speech (sound) of the program of the designated channel are outputted by the monitor unit 19 and the speaker 20.

Further, when user pushes down the program table button switch 42 of the remote controller 14A for a time period during which image and speech (sound) of the channel that user has designated are being outputted from this electronic program guide control unit 10, the processing shown in FIG. 10A is started. Thus, the processing operation by the CPU 21 proceeds to step S1.

At the step S1, the CPU 21 executes picture display data preparation program 23D to prepare picture display data 24B for displaying the program table 50 on the basis of the cylinder EPG data base 24A within the data memory 24. This picture display data 24B is stored into the data memory 24 and is outputted to the display signal generating circuit 15 through the input/output interface 22. In addition, the CPU 21 executes the display signal generation control program 23E to control the display signal generating circuit 15. Thus, program table 50 as previously shown in FIG. 8A is displayed on the monitor unit 19.

At the subsequent step S2, the CPU 21 stands by pressing operation of any one of the program table button switch 42, the up button switch 43, the down button switch 44, the left button switch 45, the right button switch 46 and the select button switch of the remote controller 14A (judges whether or not button switch input is provided). In the case where the CPU 21 has judged at this step that operation of any one of the button switches is carried out, the processing operation proceeds to step S3.

At the step S3, the CPU 21 judges whether the button switch which has been pushed down is the up button switch 43 or the down button switch 44. Then, when the CPU 21 has judged that the button switch which has been pushed down is either one of the up button switch 43 and the down button switch 44, the processing operation proceeds to the step S4.

At the step S4, the CPU 21 judges whether the area where cursor is permitted to directly undergo movement operation in a longitudinal direction (hereinafter simply referred to as "select area" as occasion may demand) is any one of the areas $25X_1$, $25X_2$, 25Y and 25Z. In this case, when the current select area is the area $25X_1$ (the area where date any days of the week are displayed), the processing operation by the CPU 21 proceeds to step S5a to move the cursor $51X_1$ of the area $25X_1$ in upper and lower directions in correspondence with the operation of the up button switch 43 or the down button switch 44. Thus, selection of date and days of the week is carried out as has been explained with reference to FIGS. 8D and 8E.

Moreover, when the CPU has judged at the step S4 that the current select area is the area $25X_2$ (the area where time is displayed), the processing operation proceeds to step S5b to move the cursor $51X_2$ of the area $25X_2$ in upper and lower directions in correspondence with the operation of the up button switch 43 or the down button switch 44. Thus, selection of time as has been explained with reference to FIGS. 8B and 8C is carried out. Followed by selection of time, display of the area 25Y is also changed as described above, When the CPU 21 has judged at the step S4 that the area 25Y (the area where title of program, etc. is displayed) is the select area, the processing operation proceeds to step S5c to move the cursor 51Y of the area Y in upper and lower directions in correspondence with the operation of the up button switch 43 or the down button switch 44 to move the cursor 51Y to desired program title as has been explained with reference to FIGS. 7A to 7D, for example. Thereafter, the processing operation proceeds to step S14 shown in FIG. 10B.

When the CPU 21 has judged at the step S4 that the area 25Z (the area where genre name is displayed) is the select area, the processing operation proceeds to step S5d to move the cursor 51Z of the area 25Z in upper or lower direction in correspondence with the operation of the up button switch 43 or the down button switch 44. Thus, selection of genre is carried out as shown in FIGS. 8F and 8G.

Further, when selection of items displayed in respective areas is completed by the processing of the steps S5a, S5b, S5d, the processing operation by the CPU 21 returns to the step S2. Thus, the CPU 21 is placed in new button switch input wait state.

As has been explained with reference to FIGS. 7A to 8H, when cursor within a certain designated area is moved in upper and lower directions, displays of other areas are changed in a manner interlocking therewith. At the above-described respective steps S5a to S5d, processing for such change of display of another area is also executed along with movement control of cursor.

On the other hand, when the CPU has judged at the step S3 that the button switch that user has operated is neither of the up button switch 43 and the down button switch 44, the processing operation proceeds to step S6. At the step S6, the CPU 21 judges whether the button switch that user has operated is the right button switch 46. If that button switch is the right button switch 46, the processing operation proceeds to step S7.

At the step S7, the CPU 21 judges whether the current select area is either one of the areas $25X_1$, $25X_2$, 25Y and 25Z. When it is judged that the area 25X, is the select area, the processing operation proceeds to step S8a. At the step 8a, the CPU 21 carries out processing for changing the select area from the area $25X_1$ to the area $25X_2$ placed (located) in a manner adjoining at the right side thereof.

Namely, e.g., such a display control to carry out a change from the display state shown in FIG. 8D to the display state shown in FIG. 8B is carried out. In this case, followed by such display change, cursor $51X_1$ is displaced in the most thick state as cursor movable at present.

When the CPU 21 has judged at step S7 that the current select area is the area $25X_1$, the processing operation proceeds to step S5b to move the select area from the area $25X_2$ to the area 25Y. Thus, the cursor 51Y of the area 25Y is caused to be movable. Namely, display of the program table 50 shifts from the display state of FIG. 8B to the display state of FIG. 8A.

When the CPU 21 has judged at the step 51 that the current select area is the area 25Y, the processing operation proceeds to step S8c to shift the area where movable cursor exists from the area 25Y to the area 25Z. Thus, the cursor 51Z is caused to be movable. Shift from the display state of FIG. 8A to the display state of FIG. 8F corresponds to the shift mentioned above.

Moreover, when the CPU 21 has judged at the step S7 that the area 25Z is the current select area, the processing operation proceeds to step S8d in this embodiment to allow that button switch input to be invalid. This is because any area does not exist at the portion adjoining at the right side of the area 25Z. However, as the processing of the step S8d, the area 25X$_1$ which is the leftmost area from the area Z may be caused to be select area.

When the processing at the steps S8a to S8d are completed, processing operation by the CPU 21 returns to the step S2. Thus, the CPU 21 is placed in new button switch input wait state.

On the other hand, when the CPU 21 has judged at the step S6 that the button switch that user has operated is not the right button switch 46, the processing operation proceeds to step S9 to judge whether or not the button switch that user has operated is the left button switch 45. When the CPU 21 has judged that the button switch that user has operated is the left button switch 45, the processing operation proceeds to step S10 to judge whether the current select area is any one of the areas 25X$_1$, 25X$_2$, 25Y and 25Z.

When the CPU 21 has judged at the step S10 that the area 25X$_1$ is the select area, the processing operation proceeds to step S11a. In this case, since any area does not exist at the portion adjoining at the left side of the area 25X$_1$, input of the left button switch 45 is caused to be invalid. It is to be noted that, also in this case, as the configuration for processing of the step S11a, there may be employed a configuration such that the area Z which is the rightmost area is caused to be select area.

When the CPU 21 has judged at the step S10 that the area 25X$_2$ is the select area, the processing operation proceeds to step S11b to move the select area from the area 25X$_2$ to the area 25X$_1$, thus allowing the cursor 51X$_1$ to be movable. Shift from the display form of FIG. 8B to the display form of FIG. 8D corresponds to this movement.

When the CPU 21 has judged at the step S10 that the area 25Y is the current select area, the processing operation proceeds to step S11c to move the select area from the area 25Y to the area 25X$_2$, thus allowing the cursor 51X$_2$ to be movable. Shift from the display form shown in FIG. 8A to the display form shown in FIG. 8B corresponds to this movement.

When the CPU 21 has judged at the step S11 that the select area is the area 25Z, the processing operation proceeds to step S11d to move the select area from the area 25Z to the area 25Y, thus allowing the cursor 51Y to be movable.

When processing at the steps S11a to S11d have been completed, the processing operation by the CPU 21 returns to the step S2. Thus, the CPU 21 is placed in new button switch input wait state.

On the other hand, when the CPU 21 has judged at the step S9 that the button switch that user has operated is not the left button switch 45, the processing operation proceeds to step S12 shown in FIG. 10B.

Moreover, when the CPU 21 judges at the step S14 that the button switch that user has selected is not the select button switch 47, the processing operation proceeds to step S12 to judge whether or not the button switch that user has operated is the program table button switch 42.

When the CPU 21 judges at step S12 that the button switch that user has operated is not the program table button switch 42, the processing operation returns to the step S2 shown in FIG. 10A. Thus, the CPU 21 is placed in new button switch input wait state.

Moreover, when the CPU 21 judges at the step S12 that the button switch that user has operated is the program table button switch 42, the processing operation proceeds to step S13 to delete the program table 50 from the display picture of the monitor unit 19 shown in FIG. 3 to complete display processing of the electronic program guide (EPG).

On the other hand, at step S14 shifting from the step S5c shown in FIG. 10A, the CPU 21 judges whether or not the button switch that user has operated is select button switch 47. When the CPU 21 judges at this step S14 that the button switch that user has operated is the select button switch 47, it recognizes that the program of the title where the cursor 51Y of the area 25Y is placed (located) has been selected. Thus, the processing operation proceeds to step S15.

At the step S15, the CPU 21 judges that the program selected at the step S14 is being broadcasted. When it is judged that the selected program is being broadcasted, the processing operation proceeds to step S16 to switch image of the program displayed in the state superimposed (overlaid) upon the program table 50 into image of the program which has been selected and determined. Namely, the CPU 21 controls the tuner 11 at the step S16 to allow it to receive the channel of the program which has been selected and determined to allow the monitor unit 19 to display image of that program to further delete the program table 50 which has been displayed until now. Thus, the display picture is switched, e.g., from the state shown in FIG. 9A into the state shown in FIG. 9B.

On the other hand, when the CPU 21 judges that the selected program is not broadcasted at present, but a program scheduled to be broadcasted in future, the processing operation proceeds to step S17 to allow the monitor unit 19 to display information picture of the program which has been selected and determined. In more practical sense, the CPU 21 executes a control to read out information stored as the cylinder EPG data base 24A, i.e., information relating to the content of the program which has been selected and determined, e.g., data such as outline and/or casts (performers) of that program, etc. to allow the monitor unit 19 to display it. Thus, picture image displayed on the monitor unit 19 is switched, e.g., from the display state shown in FIG. 9A into the display state shown in FIG. 9C.

When the CPU 21 serves to display, at the step S17, information picture at step S17 as has been explained with reference to FIG. 9C, the processing operation by the CPU 21 proceeds to step S18 to judge whether or not icon 54A has been selected. When the CPU 21 judges that the icon 54A has been selected, the processing operation returns to the step S1. Thus, at the step S1, the program table 50 is displayed on the screen 53 of the monitor unit 19 for a second time. On the other hand, when the CPU 21 judges that the icon 54A is not selected, the processing operation proceeds to step S19 to judge whether or not icon 54B is selected.

When the CPU 21 judges at the step S19 that the icon 54B has been selected, the program operation proceeds to step S20 to attach book mark to the program introduced by information picture as shown in FIG. 9C at present, i.e., to register this program into the data memory 24 as book mark list data 24C. Thereafter, the processing operation returns to the step S18.

It is to be noted that cursor 51Z is placed (located) at icon 54B corresponding to the book mark item of the area 25Z in the program table 50, thereby permitting the monitor unit 19 to display, within the area 25Y, list of the program title to which the book mark has been attached by the processing of the step S20.

On the other hand, when the CPU 21 judges at the step S19 that the icon 54B is not selected, the processing operation proceeds to step S21 to judge whether or not icon 54C is selected. When the CPU 21 judges at the step S21 that the icon 54C has been selected, the processing operation proceeds to step S22 to carry out timer reservation processing of the program introduced by this information picture. Thus, the processing operation returns to the step S18. On the other hand, when the CPU 21 judges at the step S21 that the icon 54C is not selected, the processing operation directly returns to the step S18.

When the CPU 21 registers the program in timer reservation list data 24D as described above, it carries out time count operation to control the tuner 11 when that broadcast starting time is reached to receive that program to allow the display unit 19 to display it.

Moreover, in this embodiment, as shown in FIGS. 7A to 8H, the item of channel selected at present is supplemented as select channel 52 in the area 25Z corresponding to the genre of the program. In view of the above, in this embodiment, the CPU 21 executes processing for setting display content of the select channel 52 in correspondence with the channel selected at present.

This processing is executed, e.g., at the time of channel switching, etc. As shown in FIG. 11, the CPU 21 first discriminates, at step S31, channel No. n selected after undergone tuning at the tuner 11. This channel No. n may be obtained by making reference to signal for controlling the tuner 11 that the CPU 21 has last outputted or may be obtained by monitoring current tuning state of the tuner 11.

Further, at step S32, the CPU 21 detects, on the basis of the channel No. n which has been discriminated at the step S31, data corresponding to the select channel 52 of EPG data stored in the cylinder EPG data base 24A (see FIG. 4), i.e., data relating to the program scheduled to be broadcasted in future at this channel to store it as select channel data 24E.

In more practical sense, in the case shown in FIGS. 7A to 7D and FIGS. 8A to 8H, the channel No. n which has been discriminated at the step S31 is caused to be 155. Thus, select channel data 24E is prepared on the basis of data of the channel No. "155". Further, processing for program table display is executed on the basis of the select channel data 24E and the cylinder EPG data base 24A at the step S1 of FIG. 10A. Thus, as shown in FIGS. 7A to 7D and FIGS. 8A to 8H, display indicating that the channel subject to selection (selected at present) is "155 CH" is carried out in the area 25Z, and program title scheduled to be broadcasted in future of channel corresponding to the area 25Y is displayed. Namely, the select channel 52 functions as one of selection items.

5. Favorite channel

While there has been employed in the above-described embodiment the configuration in which select channel 52 indicating broadcast channel No. subject to selection (selected at present) is displayed in the area 25Z as information relating to broadcast channel, there is provided, in electronic program guide (EPG) display as another embodiment which will be described below, the item of "favorite channel" for quickly obtaining information of program relating to a desired broadcast channel in the area 25Z in addition to the select channel 52. It is to be noted that the item of "favorite channel" may be provided without providing select channel 52 in the area 25Z.

Figure 12:
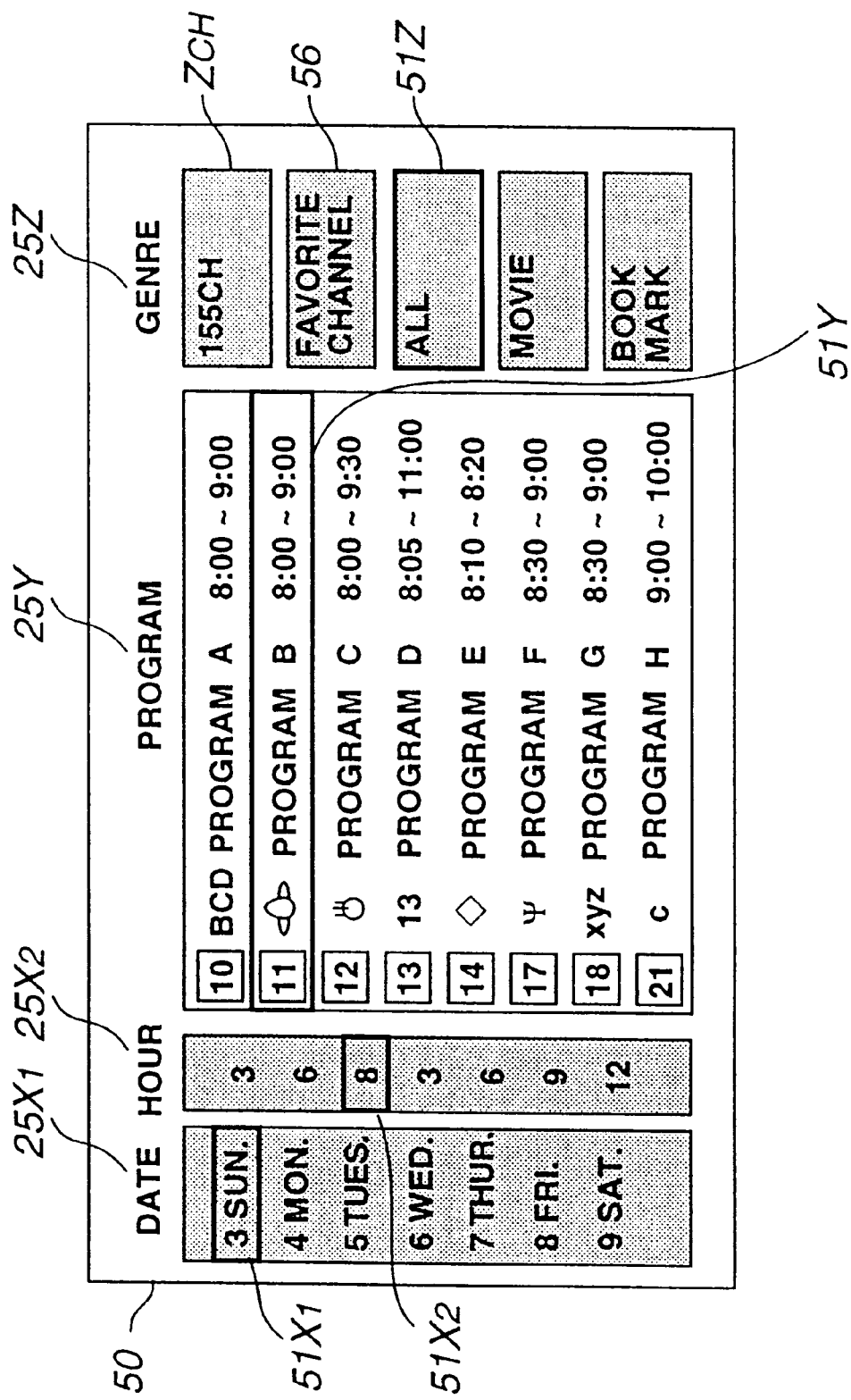
FIG. 12 is a view showing program table to which information item of favorite channel is supplemented.

FIG. 12 shows an example of display of program table 50 provided with the item of "favorite channel" as another embodiment. In FIG. 12, the same reference numerals are respectively attached to the same portions as those of FIGS. 7A to 7D and FIGS. 8A to 8H, and their explanation will be omitted.

In this embodiment, as indicated in the area 25Z of the program table 50 shown in FIG. 12, the item of favorite channel 56 is provided. The item of the favorite channel 56 corresponds to the program of desired channel that user has arbitrarily registered. In this embodiment, user can select, from broadcast channels which can be received by, e.g., the electronic program guide control apparatus (unit) 10 of this embodiment, a desired broadcast channel in a manner described below to register the selected broadcast channel as "favorite channel".

Figure 13A:
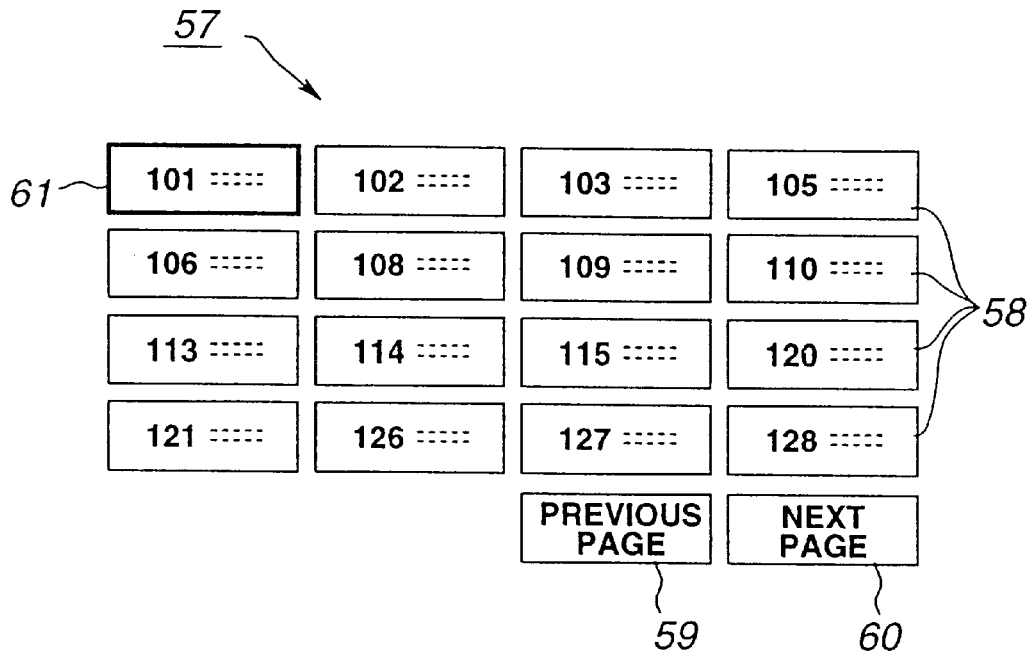
FIGS. 13A and 13B are views showing channel registration picture.
Figure 13B:
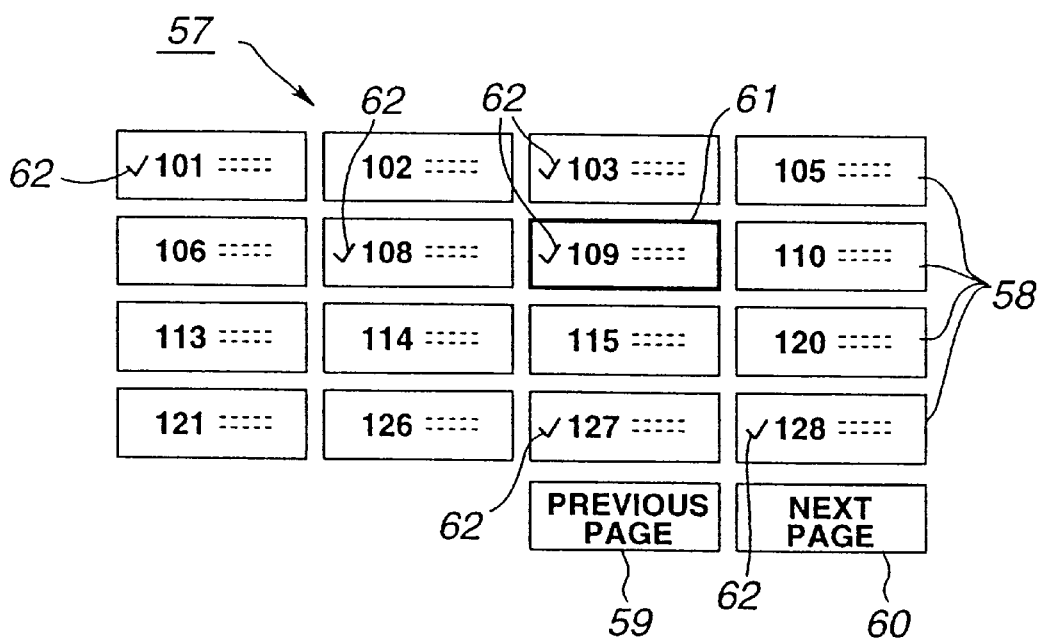

An example of a registration method for "favorite channel" is shown in FIGS. 13A and 13B. For example, user operates menu button switch 38 of the remote controller 14A shown in FIG. 6, whereby channel registration picture 57 as shown in FIG. 13A is displayed.

On this channel registration picture 57, there are displayed plural, e.g., 16 (in FIG. 13A) channel items 58 comprised of channel Nos. of broadcast channels presented by the electronic program guide (EPG).

In this example, in the respective channel items 58, symbol marks of corresponding broadcast channels which are so called station logos are actually displayed at the portions of double broken lines displayed at the right sides of channel Nos. Thus, attention is drawn such that user is easy to recognize desired channel.

Moreover, because there are a considerably large number of broadcast channels presented by EPG, it is difficult to display all broadcast channels by single channel registration picture 57. For this reason, in this embodiment, the channel registration picture 57 is constituted by plural pages. In this case, at the right and lower side in the channel registration picture 57, there are displayed previous page item 59 for shifting to previous page being displayed and next page item 60 for shifting to the next page.

Further, within this channel registration picture 57, there is displayed cursor 61 which can be moved every item.

In order to register favorite channel, user operates any one of up button switch 43, down button switch 44, left button switch 45, and right button switch 46 (hereinafter these button switches are generically referred to as cursor movement keys) of the remote controller 14A shown in FIG. 6 to move cursor 61 to channel item 58 of desired broadcast channel. The cursor 61 is adapted so that every time any one of the cursor movement keys is operated, it is moved to any item in upper or lower direction and in left or right directions to which the operated cursor movement key corresponds.

For example, FIG. 13B is a view showing the state where cursor 61 has moved to the channel item 58 of the 109-th channel.

It is now assumed that user operates the select button switch 47 in the state where cursor 61 is placed (located) at channel item 58 of the 109-th channel as shown in FIG. 13B. Thus, check mark 62 indicating that this channel has been registered as "favorite channel" is attached to the channel item 58 displayed as the 109-th channel.

It is to be noted that in the case where there is a necessity to delete the check mark 62 which has been once attached, there is employed, e.g., an approach to operate the select button switch 47 for a second time in the state where the cursor 61 is placed (located) at channel item 58 from which check mark 62 is desired to be deleted.

In FIG. 13B, it is shown that at least five broadcasting stations of the channel Nos. of the 101-th channel, the 108-th channel, the 109-th channel, the 127-th channel and the 128-th channel are registered as "favorite channel" by operation as described above.

In this example, when broadcast channel or channels that user desires do not exist at the page being displayed, e.g., user moves the cursor 61 to the previous page item 59 or the next page item 60 by operation of the cursor movement key to operate the select button switch 47. Thus, channel registration picture 57 of the previous page or the next page of the page which has been displayed until now is displayed. Accordingly, user can select desired broadcast channel from the page of the channel registration picture 57 newly displayed in this way.

Further, when user desires to carry out switching of display to picture of ordinary television picture image or picture of EPG, etc. after registration of "favorite channel" is completed, he operates, e.g., menu button switch 38 to carry out switching to desired picture.

Figure 14:
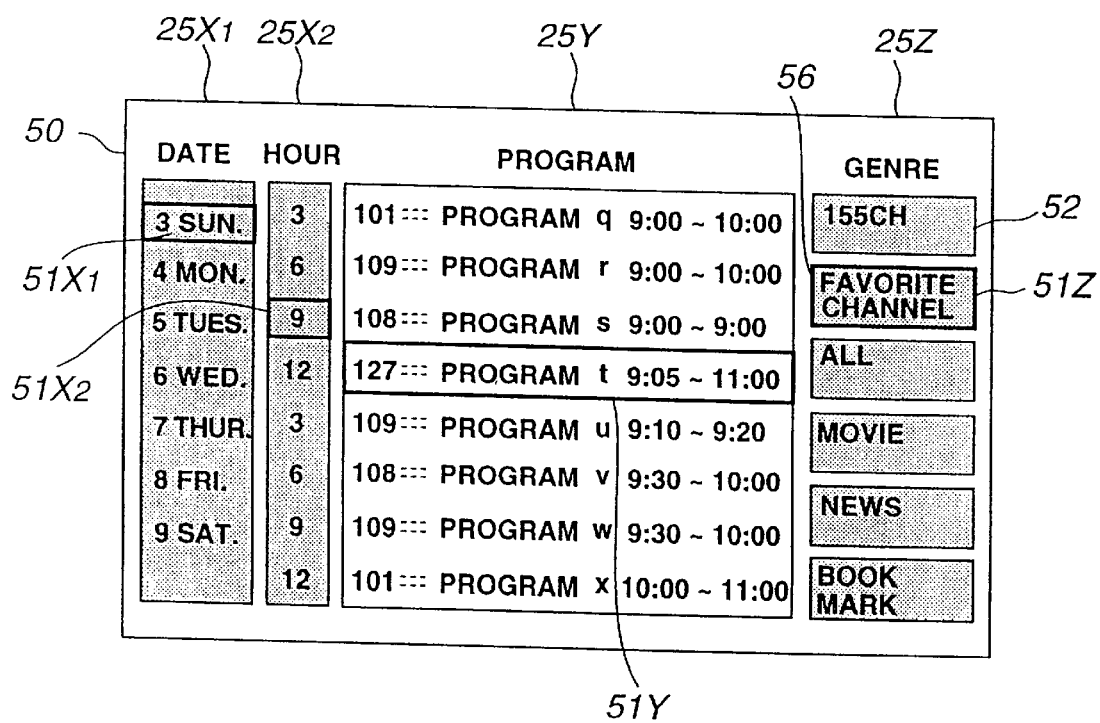
FIG. 14 is a view showing an example of display of program table in the case where favorite channel is designated.

FIG. 14 is a view showing the state where cursor 51Z is caused to be placed (located) at the favorite channel 56 in the area 25Z in the state where program table 50 is displayed, thus to designate favorite channel 56. In this case, in FIG. 14, there is shown the state where the area 25Y of the program table 50 is selected and the cursor 51Y is permitted to undergo movement operation.

In the state where the favorite channel 56 is designated in this way, e.g., only programs broadcasted by the broadcast channels registered as "favorite channel" are displayed in order of broadcast starting times. In this example, in the area 25Y of FIG. 14, station logos are actually indicated similarly to the case of FIG. 12 at double broken portions indicated every items of respective program titles.

In more practical sense, in the case where five broadcast channels to which the check mark 62 is attached are registered as "favorite channel" as has been explained with reference to FIG. 13B, titles of all programs broadcasted by broadcast channels of the 101-th channel, the 108-th channel, the 109-th channel, the 127-th channel and the 128-th channel are displayed in order of broadcast starting times in the area 25Y. This display state is shown in FIG. 14.

Thus, user can select desired one program or more from programs permitted to undergo viewing by the favorite broadcast channel or channels that user himself has registered while viewing program titles displayed in the area 25Y of the program table 50.

In general, the broadcast channels that one user mainly carries out viewing (viewing/listening) are limited to several ones. As described above, in this embodiment, the item of "favorite channel" is provided in the area 25Z as information relating to the broadcast channel, thereby making it possible to register as "favorite channel" broadcast channels that user frequently carry out viewing. Thus, convenience of use of EPG can be further improved.

Figure 15:
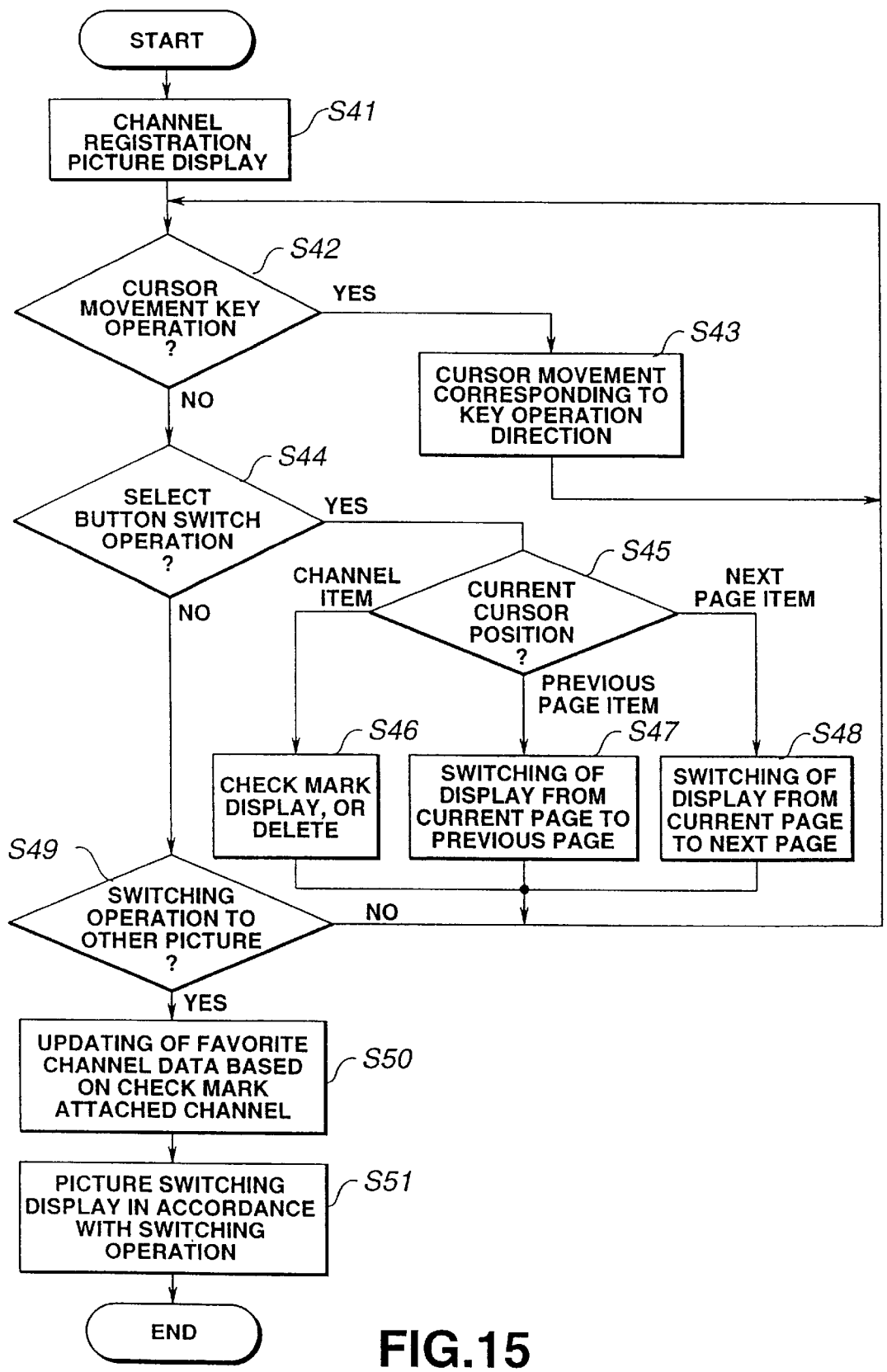
FIG. 15 is a flowchart showing processing operation for favorite channel registration.

FIG. 15 is a flowchart showing the processing operation of CPU 21 (see FIG. 4) for registration of "favorite channel" which has been described with reference to FIGS. 13A and 13B.

When operation for providing access to the channel registration picture 57 shown in FIGS. 13A and 13B, in more practical sense, pressing operation, etc. of the menu button switch 38 of the remote controller 14A shown in FIG. 6 by user is carried out, the processing shown in FIG. 15 is started. Thus, the CPU 21 executes the control operation for displaying channel registration picture 57 at step S41.

In this embodiment, the controller 12 and the display signal generating circuit 15 are constituted so as to have ability to cope with display of the channel registration picture 57. Namely, the CPU 21 executes, e.g., picture display data preparation program 23D corresponding to channel registration picture 57, i.e., prepares, on the basis of EPG data delivered from the EPG data extracting circuit 13, picture display data 24B for channel registration picture 57. In this case, information of broadcast channels which can be received are utilized.

Then, the CPU 21 delivers display data 24B for this channel registration picture 57 to the display signal generating circuit 15, and the display signal generating circuit 15 generates picture signal corresponding to channel registration picture 57 shown in FIGS. 13A and 13B, for example. Thus, the channel registration picture 57 is displayed on the screen 53.

At step S41, the CPU 21 executes control for displaying channel registration picture 57 as described above. Then, the processing operation proceeds to step S42 to judge whether or not any one of cursor movement keys has been operated. Namely, the CPU 21 judges whether or not operation for moving the cursor 61 has been carried out.

When the CPU 21 judges that operation has been carried out with respect to any one of cursor movement keys, the processing operation proceeds to step S43.

At the step S43, the CPU 21 serves to move the cursor 61 in a direction corresponding to the operated button switch of the cursor movement keys. Thereafter, the processing operation returns to the step S42.

On the other hand, when the CPU 21 judges at the step S42 that any one of cursor movement keys has not yet been operated, the processing operation proceeds to step S44 to judge whether or not the select button switch 47 of the remote controller 14A shown in FIG. 6 is operated. Namely, as has been explained with reference to FIG. 13B, the CPU 21 judges whether operation for attaching check mark 62 with respect to the channel item 58, or deleting it therefrom is carried out.

When the CPU 21 judges at the step S44 that the select button switch 47 is operated, the processing operation proceeds to step S45. At the step S45, the CPU 21 judges item at which the cursor 61 is placed (located) at present on the channel registration picture 57 shown in FIGS. 13A and 13B. In the case where the cursor 61 is placed (located) at the channel item 58, the processing operation proceeds to step S46. In the case of the previous page item 59, the processing operation proceeds to step S47. In the case of the next page item 60, the processing operation proceeds to step S48.

At the step S46, the CPU 21 is operative so that when the check mark 62 is not displayed at the channel item 58 where the cursor 61 is placed (located) at present, it conducts a control so as to newly add check mark 62. Further, when the check mark 62 has been already attached to the channel item 58 where the cursor 61 is placed (located) at present, it carries out a control so as to delete this check mark 62. After the CPU 21 executes the processing of the step S46, its processing operation returns to the step S42.

On the other hand, at the step S47, the CPU 21 conducts a control for carrying out switching of display to the channel registration picture 57 of page preceding (previous) by one with respect to the page of the channel registration picture 57 being displayed. Thereafter, the processing operation returns to the step S42. In this case, when the select button switch 47 is operated in the state where the cursor 61 is placed (located) at the previous page item 59 although the page of the channel registration picture 57 being displayed is the first page, the processing operation returns to the step S42 without allowing the CPU 21 to carry out processing of this step S47.

Further, at step S48, the CPU 21 carries out a control for switching of display to channel registration picture 57 of the next page of the page of the channel registration picture 57 being displayed. Thus, the processing operation returns to the step S42. Also in this case, when the select button switch 47 is operated in the state where the cursor 61 is placed (located) at the next page item 60 although the page of the channel registration picture 57 being displayed is the last page, the processing operation by the CPU 21 returns to the step S42 without allowing it to carry out the processing of the step S48.

On the other hand, when the CPU 21 judges at the step S44 that the select button switch 47 is not operated, the processing operation proceeds to step S49 to judge whether or not switching operation to other display picture is carried out. Namely, the CPU 21 judges whether or not operation for providing access to picture of ordinary television broadcast or picture of program table 50, or menu picture of other kind from the channel registration picture 57 being displayed is carried out as operation of the menu button switch 38.

When the CPU 21 judges at this step S49 that the menu button switch 38 is not operated, the processing operation returns to the step S42 to execute processing operation corresponding to presence or absence of operation of the cursor movement key which has been described above. In this case, when the CPU 21 judges that the menu button switch 38 is operated, the processing operation proceeds to step S50.

Figure 4:
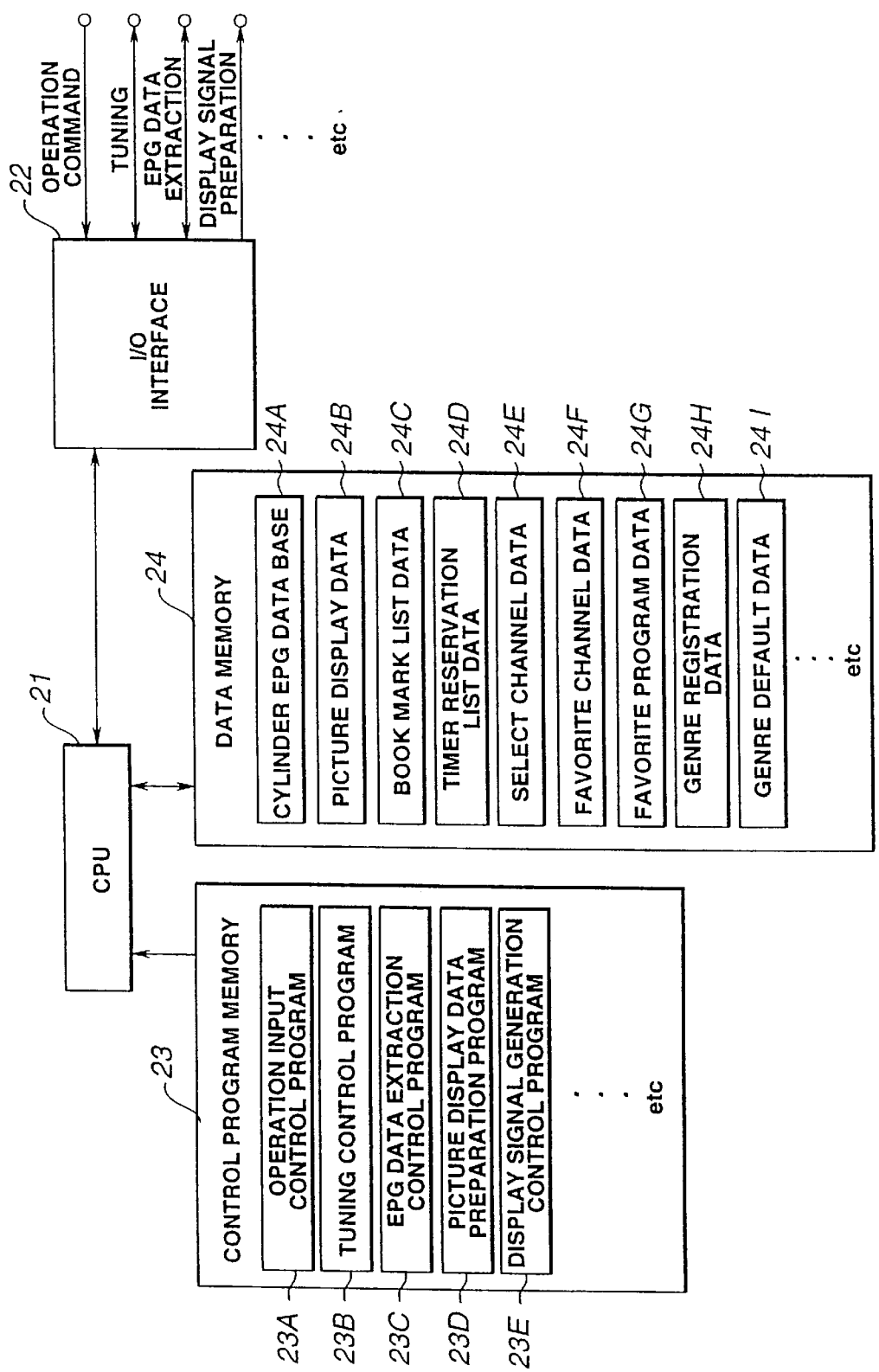
FIG. 4 is a block diagram showing the internal of controller.

At the step S50, the CPU 21 allows the data memory to store, as favorite channel data 24F shown in FIG. 4, the broadcast channel to which the check mark 62 is attached at present on the channel registration picture 57, i.e., the broadcast channel that user registers as "favorite channel". In more practical sense, the CPU 21 prepares favorite channel data 24F so that titles and broadcast times, etc. of all programs of broadcast channels registered as "favorite channel" are arranged in order of broadcast starting times. By displaying electronic program guide (EPG) based on the favorite channel data 24F prepared in this way, display as indicated in the area 25Y of FIG. 14 is carried out.

When the processing of the step S50 is completed, the processing operation by the CPU 21 proceeds to step S51. At the step S51, the CPU 21 executes a control for carrying out switching of display to picture to which access is newly provided (television picture, program table 50 or other menu picture, etc.) by operation of the menu button switch 38 which has been judged at the previously mentioned step S49 thus to complete the processing in this case.

It is to be noted while items of the select channel 52 and the favorite channel 56 are provided in the area 25Z in the above-described embodiment, items of the select channel 52 and the favorite channel 56 may be provided independent of the area 25Z. In this case, items of the select channel 52 may be displayed along with items of other genres, etc. in the area 25Z as in this embodiment. Thus, area sections in the longitudinal direction cannot be unnecessarily increased. As a result, the picture configuration of EPG can be as simple as possible so that it is easy to see. Even if information related to broadcast channels is supplemented as "genre", there is no possibility that operation of user becomes troublesome.

6. Favorite program

In another embodiment which will be described below, in the area 25Z of the program table 50, as information item related to the genre of the program, there is provided information item of "favorite program" for obtaining information relating to the program that user is favorite and carries out viewing at a high frequency of the broadcast programs. In this case, this "favorite program" may be provided in the area 25Z along with the "select channel" and the "favorite channel" which have been described as the afore-mentioned embodiment, and only the "favorite program" may be provided without providing the "select channel" and the "favorite channel".

Meanwhile, with respect to the registration of the "favorite program" in this embodiment, i.e., the program that user is fond of viewing, e.g., it is conceivable to apply, e.g., registration operation of the favorite channel already shown in FIGS. 13A and 13B thus to allow user itself to make setting. However, in this case, because such setting is not registration of channel unit, but registration of program unit and the number of programs permitted to undergo viewing comes to a vast quantity, there is the possibility that such registration operation may rather cause troublesomeness or confusion of the registration procedure.

Figure 16:
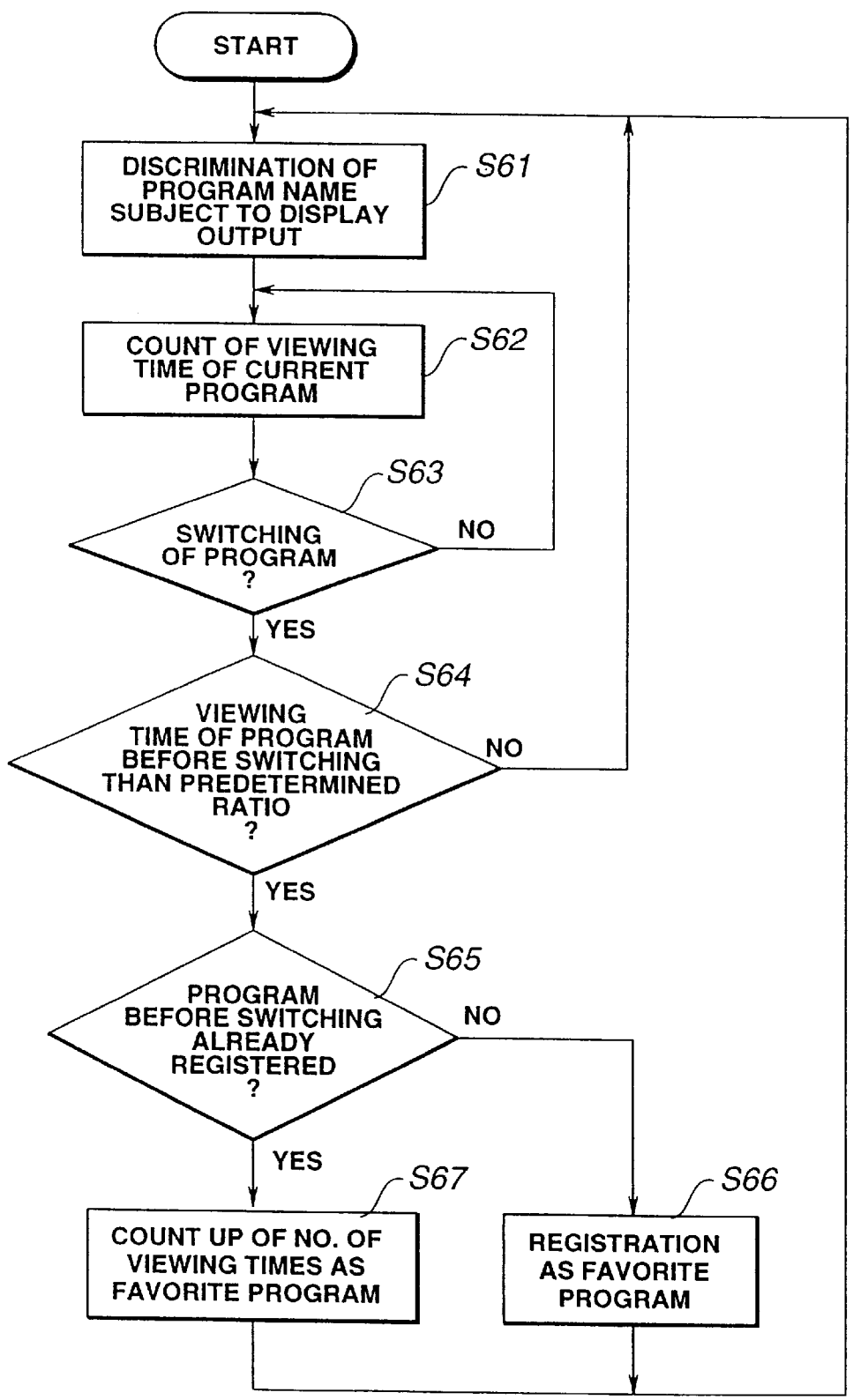
FIG. 16 is a flowchart showing processing operation for favorite program registration.

In view of the above, in this embodiment, there is employed a configuration such that for a time period during which the power supply of this electronic program guide control apparatus (unit) 10 is turned ON, the CPU 21 executes processing as shown in FIG. 16 at all times, whereby programs considered to be favorite for user (hereinafter referred to as "favorite program") are automatically registered.

At step S61 shown in FIG. 16, the CPU 21 recognizes the title of the program being displayed on the monitor unit 19. At the subsequent step S62, the CPU 21 counts viewing time of the program being displayed.

In this case, the program being displayed on the monitor unit 19 is the program broadcasted at the channel subject to selection (after undergone tuning) at the tuner 11. The title of this program can be recognized by making reference to the cylinder EPG data base 24A stored in the data memory 24.

Moreover, the viewing time of the program referred to here is the time (period) during which corresponding program is continuously displayed. The count operation of this viewing time is executed by allowing, e.g., timer (not shown) provided within the CPU 21 to be operative.

At step S63, the CPU 21 judges by, e.g., switching operation of the channel or end of the program, etc. whether the program which has been displayed until now is switched into other program, whereby it judges that there is no switching of the program, the processing operation returns to the step S62 to continue count operation of the viewing time of the current program. On the contrary, when the CPU 21 judges that any switching of the program has been carried out, the processing operation proceeds to step S64.

At the step S64, the CPU 21 makes reference to the viewing time of the program before switching to judge, e.g., what ratio this viewing time occupies with respect to the entire broadcast time length of this program. In this embodiment, the CPU 21 estimates (determines) the entire broadcast time length of this program from data relating to program start/end time included in the EPG data.

Here, when the CPU 21 judges that the ratio of the viewing time with respect to the entire broadcast time length of the program is less than a predetermined value or less, it recognizes that there is high possibility that the program that user selects this program to carry out viewing thereof may be the program selected in the course where user merely switches the channel for searching favorite program, or the program that user does not so become interested in and therefore that program is not the program that user intends to particularly positively carry out viewing. Thus, the processing operation returns to the processing of the step S61 without carrying out the registration processing as "favorite program".

On the contrary, when the CPU 21 judges that the ratio of the viewing time with respect to the entire broadcast time length of the program is the predetermined value or more, it recognizes that user has carried out viewing of the program in such a manner that attention is drawn thereto. Thus, the processing operation proceeds to step S65.

At the step S65, the CPU 21 judges whether or not the program where this viewing time is the predetermined ratio or more is the registered program, whereby when that program is the non-registered program, the processing operation proceeds to step S66 to register program title, etc. before switching as the favorite program. Data registered as the favorite program consists of at least program title and viewing past record information indicating the number of viewing times, and is stored into the data memory 24 as favorite program data 24G. Accordingly, the judgment processing at the step S65 is also executed by making reference to the favorite program data 24G. The CPU 21 executes the processing of the step S66. Thereafter, the processing operation returns to the step S61.

On the other hand, when the CPU 21 judges at step S65 that the program where the viewing time is the predetermined ratio or more is the registered program, the processing operation proceeds to the step S67 to count up the number of viewing times in the viewing past record information of this program already registered as the favorite program data 24G. Thereafter, the processing operation returns to the step S61. In this case, judgment as to whether or rot the registered program and the program to be registered this time are the same is carried out on the basis of, e.g., data relating to the title of the program included in EPG data, or data relating to the broadcast time zone.

As is clear from the above-described description, in this embodiment, the viewing past record information of the program which is the favorite program data 24G consists of at least titles of programs already registered until now and the numbers of viewing times every respective program titles. These information are stored as favorite program data 24G shown in FIG. 4. In other words, in this embodiment, programs registered as the favorite program data 24G are considered to be the programs that user is favorite, and the number of viewing times (frequency) every corresponding program indicates to what degree user is favorite with respect to the program.

Further, in this embodiment, the item of "favorite program" is provided in the area 25Z as described below to display, in the area 25Y, the program title registered in the favorite program data 24G on the basis of the favorite program data 24G.

Figures 17A, 17B:
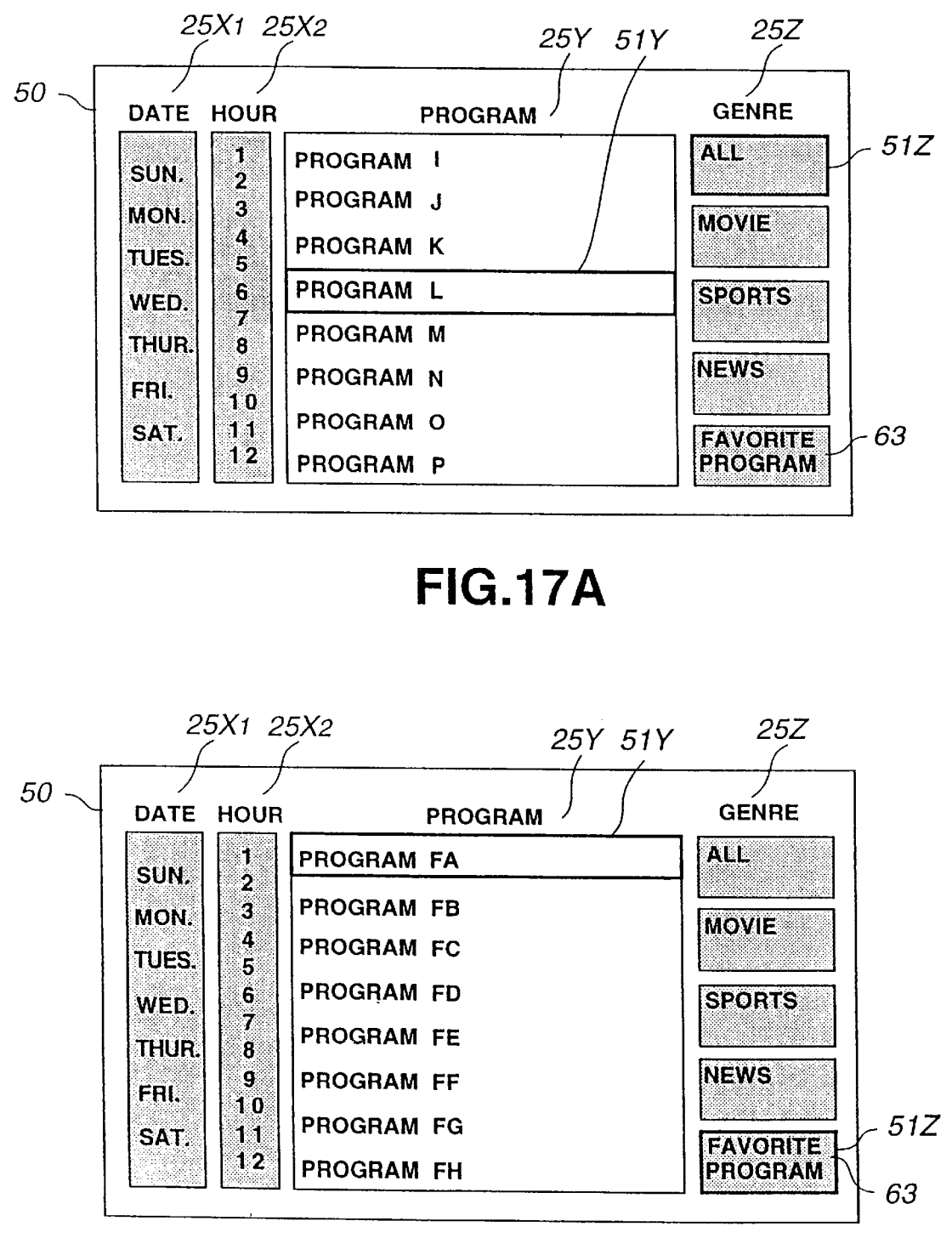

FIG. 17A shows an example of display of the program table 50 displayed on the screen 53 of the monitor unit 19 shown in FIG. 3 by operation, etc. of the program table button switch 42 of the remote controller 14A shown in FIG. 6. In FIG. 17A, for convenience of explanation, display of cursors in the areas 25X$_1$, 25X$_2$ is omitted, and display of channels and station logos, etc. every program in the area 25Y is also omitted.

In this embodiment, as shown in FIG. 17A, the item of the favorite program 63 displayed as "favorite" by character is displayed at the lowermost row of the area 25Z corresponding to the genre. In this example, the cursor 51Z of the area 25Z is placed (located) at the item of "all".

It is now assumed that the cursor 51Z is moved to the item of the favorite program 63, with the area 25Z in the program table 50 being as the selected area, by the operation method which has been previously described with reference to FIGS. 8A to 8H to place (locate) it as shown in FIG. 17B.

When the cursor 51Z is placed (located) at the item of the favorite program 63, i.e., the favorite program 63 is selected as described above, program title, etc. is displayed in the area 25Y on the basis of the favorite program data 24G shown in the FIG. 4 mentioned above. For example, in the area 25Y, program titles registered as favorite program are displayed along the longitudinal direction (circumferential direction) in order of the number of viewing times (frequency). In more practical sense, as shown in FIG. 17B, titles of "program FA", "program FB" . . . "program FH" are displayed in order from upper direction to lower direction in the area 25Y. These programs are programs registered as the favorite program as the result of the fact that user has carried out viewing at more than predetermined ratio with respect to the entire broadcast time length of each corresponding program, and program titles are arranged from upper direction to lower direction in (descending) order of the number of viewing times.

Further, when the select button switch 47 of the remote controller 14A shown in FIG. 6 is operated in the state where the cursor 51Y of the area 25Y is placed (located) at "program FA" as shown in FIG. 17B to select this program, display forms as described below are similar to those which have been explained with reference to FIGS. 9A to 9C.

Figure 17C:
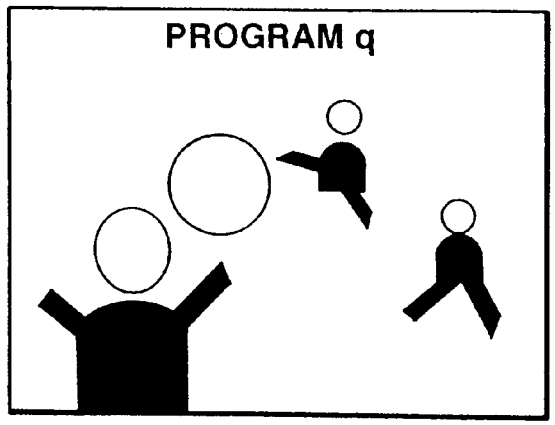

Namely, in the case where the selected program "program FA" is being broadcasted channel on which this program is broadcasted is selected after undergone tuning by the tuner 11. Thus, image of "program FA" being broadcasted is displayed on the display screen as shown in FIG. 17C.

Figure 17D:
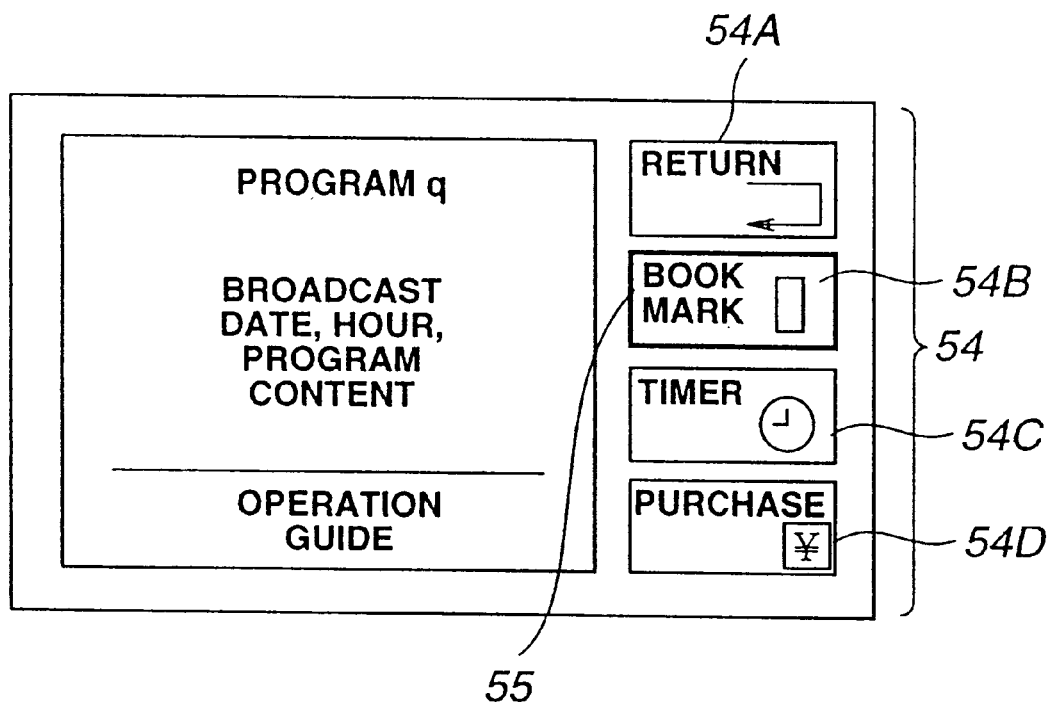

On the contrary, in the case where "program FA" is not broadcasted even at any channel at present, switching to information picture of "program FA" is carried out as shown in FIG. 17D.

Moreover, in this embodiment, when display of the program table 50 is completed in the state where the favorite program 63 is selected, and switching to other picture (e.g., display state shown in FIG. 17C or FIG. 17D from FIG. 17B) is carried out and program table 50 is accessed for a second time, there may result the state where, in consideration of, e.g., use convenience of user, the favorite program 63 is automatically selected and program titles registered as the favorite program in the area 25Y are displayed.

Figure 18:
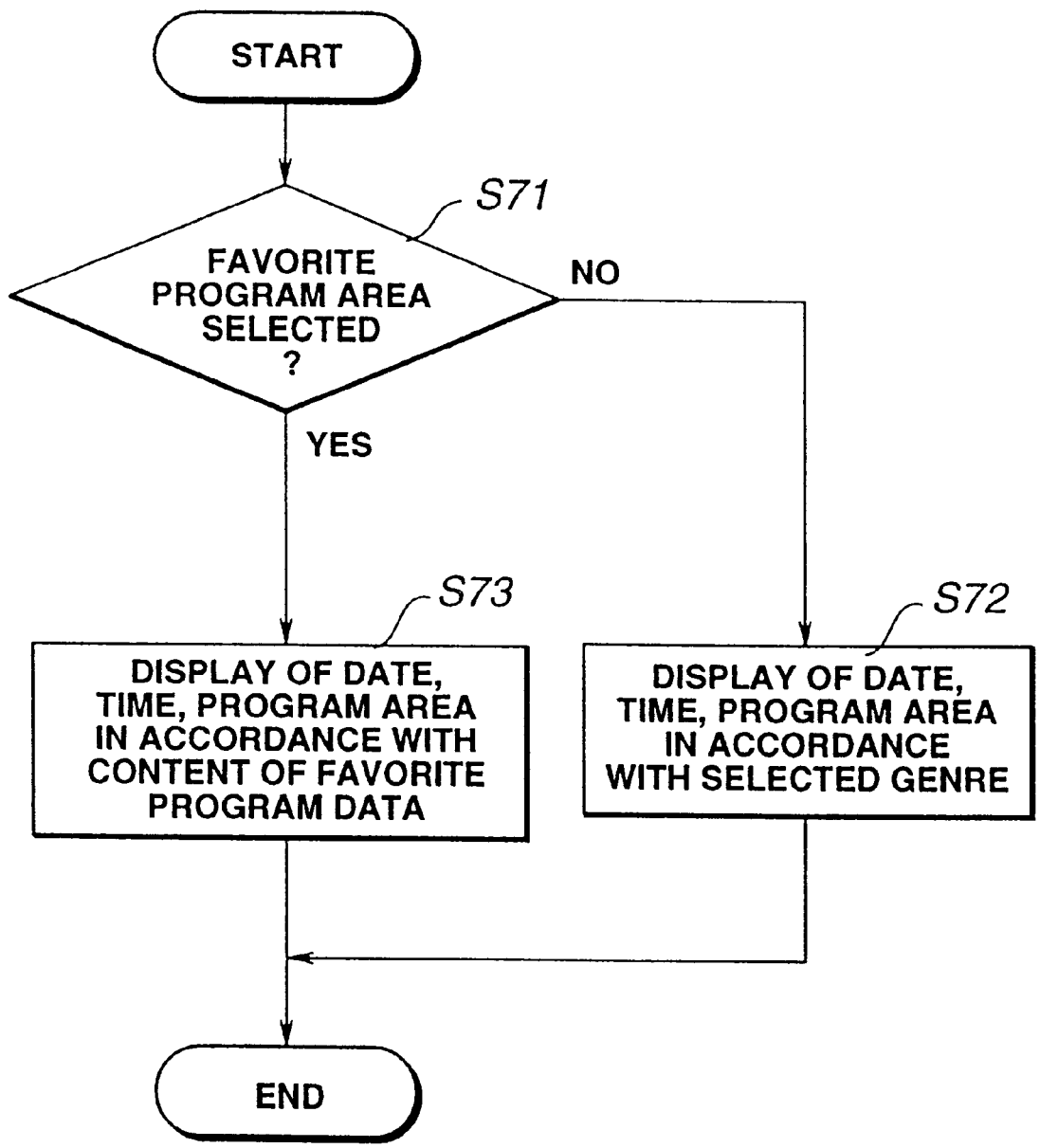
FIG. 18 is a flowchart showing processing of CPU in the case where item of favorite program provided in genre area is selected.

FIG. 18 is a flowchart showing processing operation of the CPU 21 when the item of the favorite program 63 in the area 25Z of the program table 50 is selected, and is a view showing subroutine of step S5d of the flowchart previously shown in the FIGS. 10A and 10B.

At step S71 shown in this FIG. 18, the CPU 21 judges whether or not the cursor 51Z is placed (located) at the favorite program 63 in the area 25Z.

When the CPU 21 judges at this step S71 that the favorite program 63 is not selected, the program operation proceeds to step S72 to display program table in correspondence with genre (e.g., "All", "Movie" "Spots" . . . , etc.) corresponding to the currently selected. For example, if the item of "Movie" is selected, titles of movie programs scheduled to be broadcasted from now on is displayed in the area 25Y in order of broadcast starting times, and dates and times corresponding to display of the area 25Y are displayed in other areas 25X, and 25X$_2$.

On the other hand, when the CPU 21 judges at step S71 that the favorite program 63 is selected, the processing operation proceeds to step S73 to execute display processing based on the viewing past record information stored as the favorite program data 24G shown in FIG. 4. In more practical sense, as described above, program titles registered in the favorite program data 24G are displayed from upper direction to lower direction in the area 25Y in descending order of the number of viewing times.

7. Genre registration

The embodiment of the electronic program guide control apparatus (unit), to which this invention is applied, that user can register desired genres into the area 25Z will now be described. In this electronic program guide control unit, genres that user has registered for his fondness or choice are displayed as item in the area 25Z of the program table 50, i.e., electronic program guide (EPG) of the content corresponding to fondness or choice can be provided.

A method for allowing user to register desired genre as item of the area 25Z will now be described with reference to FIGS. 19 to 21F.

Figure 19:
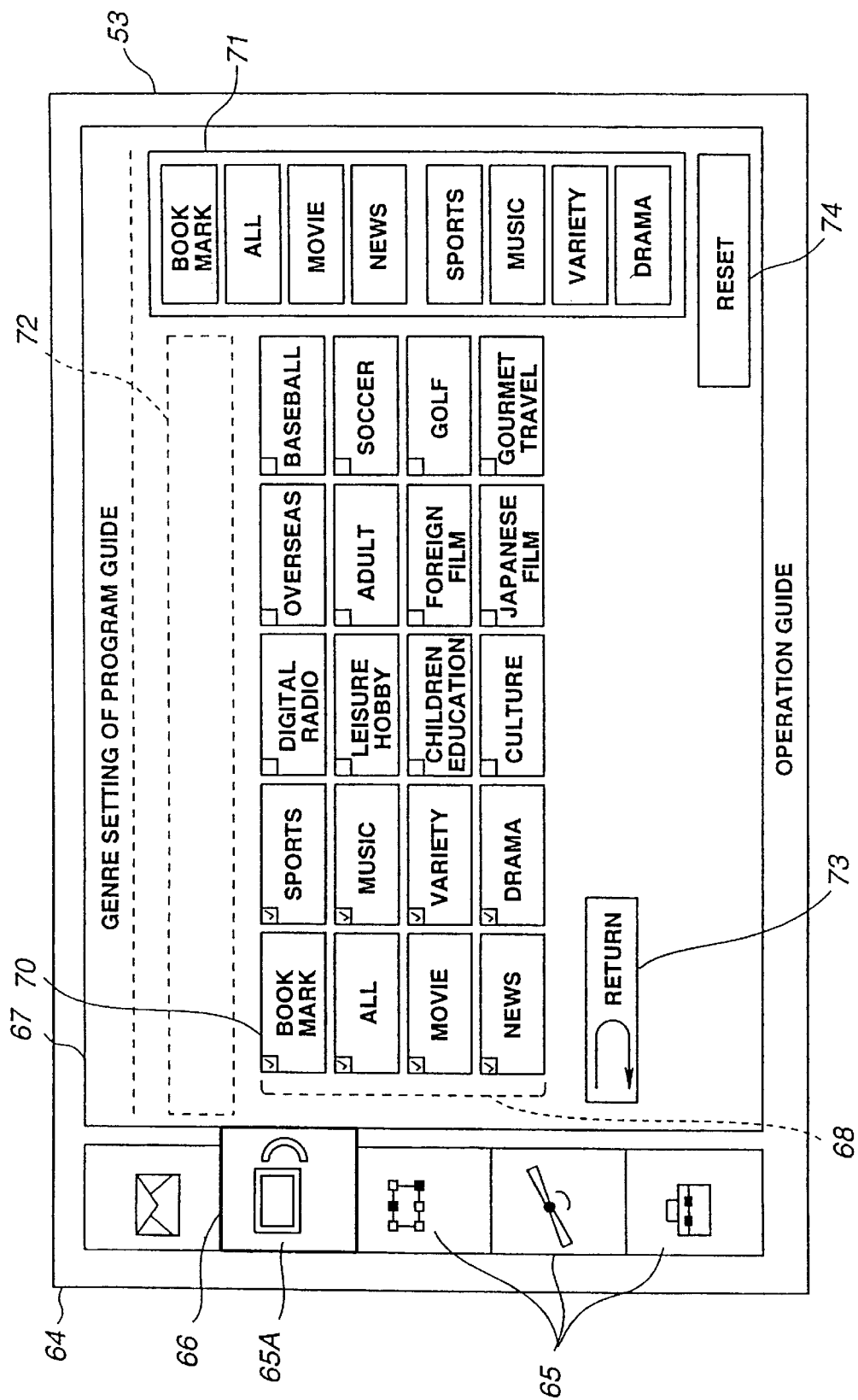
FIG. 19 is a view showing genre registration picture.

FIG. 19 shows an example of registration picture for allowing user to register genre displayed in the area 25Z. For example, user operates the menu button switch 38 of the remote controller 14A shown in FIG. 6, whereby operation guide picture 64 as shown in FIG. 19 is displayed on the screen 53 of the monitor unit 19. This operation guide picture 64 serves to indicate, to user, various kinds of operation procedures related to the electronic program guide (EPG).

In the area at the left side on this operation guide picture 64, icons 65 for selecting various operation guides are displayed. User operates the up button switch 43 or the down button switch 44 of the remote controller 14A shown in FIG. 6 to place cursor 66 at one of these icons 65 to select it, thus making it possible to carry out selection of kind of the operation guide.

Further, the icon 65A of these operation guide icons 65 serves to register new genre into the area 25Z of the above-described program table 50. By placing the cursor 66 at this icon 65A to select it, genre registration picture 67 as shown in FIG. 19 is displayed at the right side of the icon 65.

In this genre registration picture 67, there is provided genre candidate item area 68 for displaying candidate of genre displayed in the area 25Z of the program table 50. In this genre candidate item area 68, 20 genre candidate items are displayed. In addition, at respective genre candidate items, there are provided small areas where check mark 69 indicating that registration is made by user is displayed.

In this example, item names and the number of items of genre candidate items displayed in the genre candidate item area 68 are determined by the content of EPG data transmitted in the state superimposed on signal of broadcast wave. Namely, in this embodiment, how genre with respect to the program is defined is determined in advance by the transmitting side, and determination as to correspondence relationship between respective broadcast programs and genres is also carried out by the transmitting side. Accordingly, at the transmitting side, any one of these genres to which the program scheduled to be broadcasted corresponds is determined on the basis of plural genres defined in advance to transmit EPG data including that information.

Moreover, in the genre candidate item area 68, cursor 70 which can be moved every genre candidate item is displayed. In this example, this cursor 70 can be moved also onto icon 73 for return and icon 74 for reset which will be described later.

Movement of this cursor 70 can be carried out by operating any one of up button switch 43, down button switch 44, left button switch 45, right button switch 46 of the remote controller 14A shown in FIG. 6, i.e., cursor movement keys. Namely, every time any one of cursor movement keys is operated, cursor 70 is moved to genre candidate item, icon 73 for return and icon 74 for reset in any one of upper and lower directions and left and right directions corresponding to the cursor movement key which has been operated.

In this example, when the left button switch 45 is further operated in the state where cursor 70 is placed (located), e.g., at any one of the leftmost item column of the genre candidate item area 68, cursor 66 with respect to the icon 65 can be moved.

Moreover, at the right side of the genre candidate item area 68, there is provided registration display area 71 indicating registration state of current genre. In the registration display area 71 shown in FIG. 19, e.g., eight registered genre items in total are displayed. Namely, in this case, the number of genre items caused to be displayed in the area 25Z of the program table 50 is set to 8.

In this example, when genre registered in the area 25Z of the program table 50 is actually displayed, genre item displayed in this registration display area 71 is displayed in the form of the above-described cylinder EPG.

Meanwhile, in FIG. 19, check marks 69 are attached to eight genre candidate items of "book mark", "all", "movie", "news", "sports", "music", "variety" and "drama" of the genre candidate item area 68. In addition, in the registration display area 71, these eight genre candidate items are displayed as the registered genre item.

Moreover, at the upper side of the genre candidate item area 68, there is provided message display area 72 indicated by broken lines. In this message display area 72, various operation guidance messages are displayed in correspondence with current registration states (situations) and/or operation states (citation) of user, etc.

Further, within the genre registration picture 67, icon 73 for return designated as "return (restore)" and icon 74 for reset are displayed as described above. The icon 73 serves to carry out switching to return (be restored) to, e.g., image of broadcast program of channel subject to selection at present or program table 50, etc. which has been displayed immediately before the current operation guide picture 64. The icon 74 serves to allow the registered genre item to be in default state as described later.

An example of an operation method in the case where user actually carries out genre registration by using the genre registration picture 67 shown in FIG. 19 will now be described with reference to FIGS. 20A to 21F. In this embodiment, genre registration operation on the genre registration picture 67 is carried out by using the cursor movement key and the select button switch 47 of the remote controller 14A shown in FIG. 6.

Figure 20A:
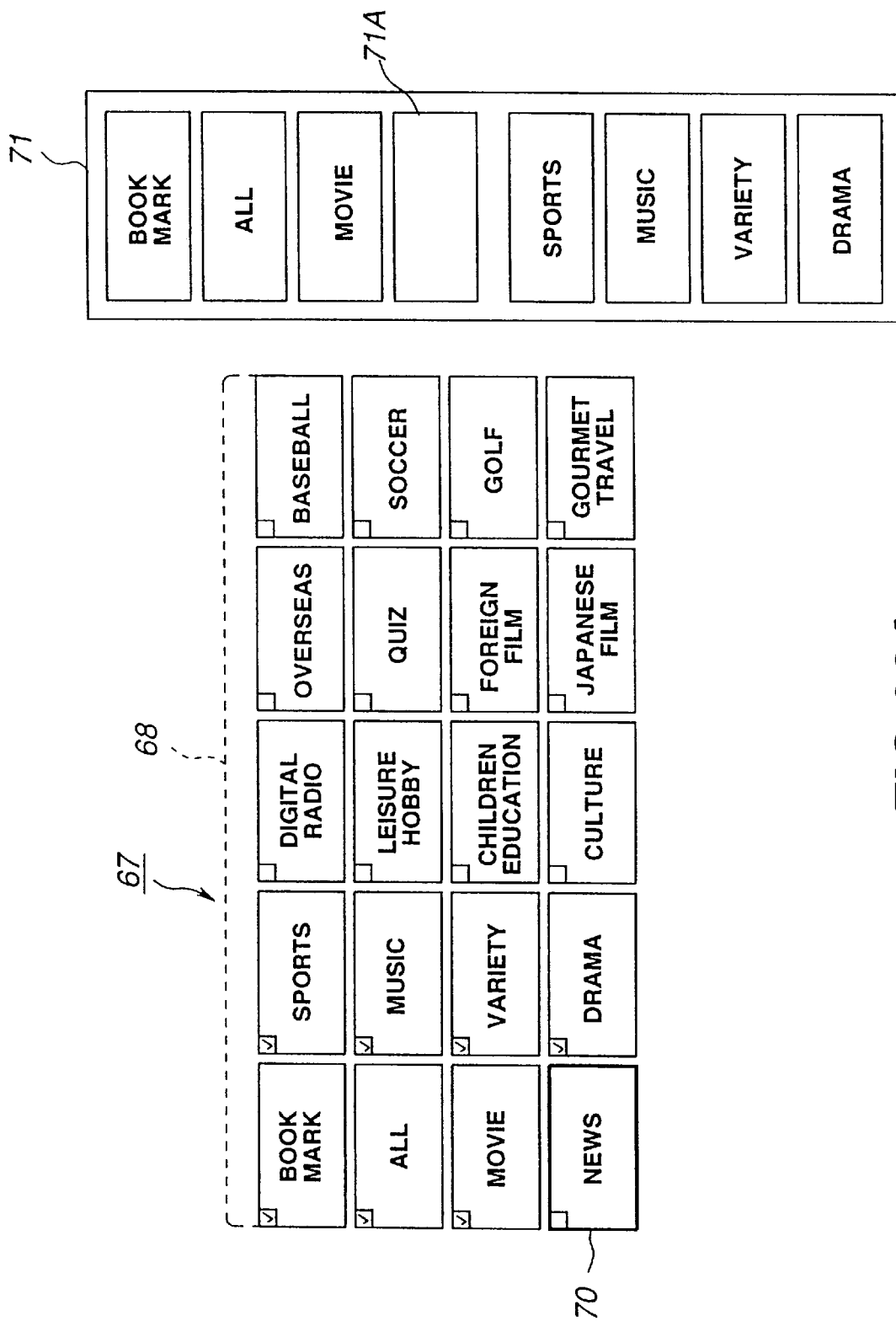
FIGS. 20A and 20B are views showing an operation for exchanging one of registered genres.
Figure 20B:
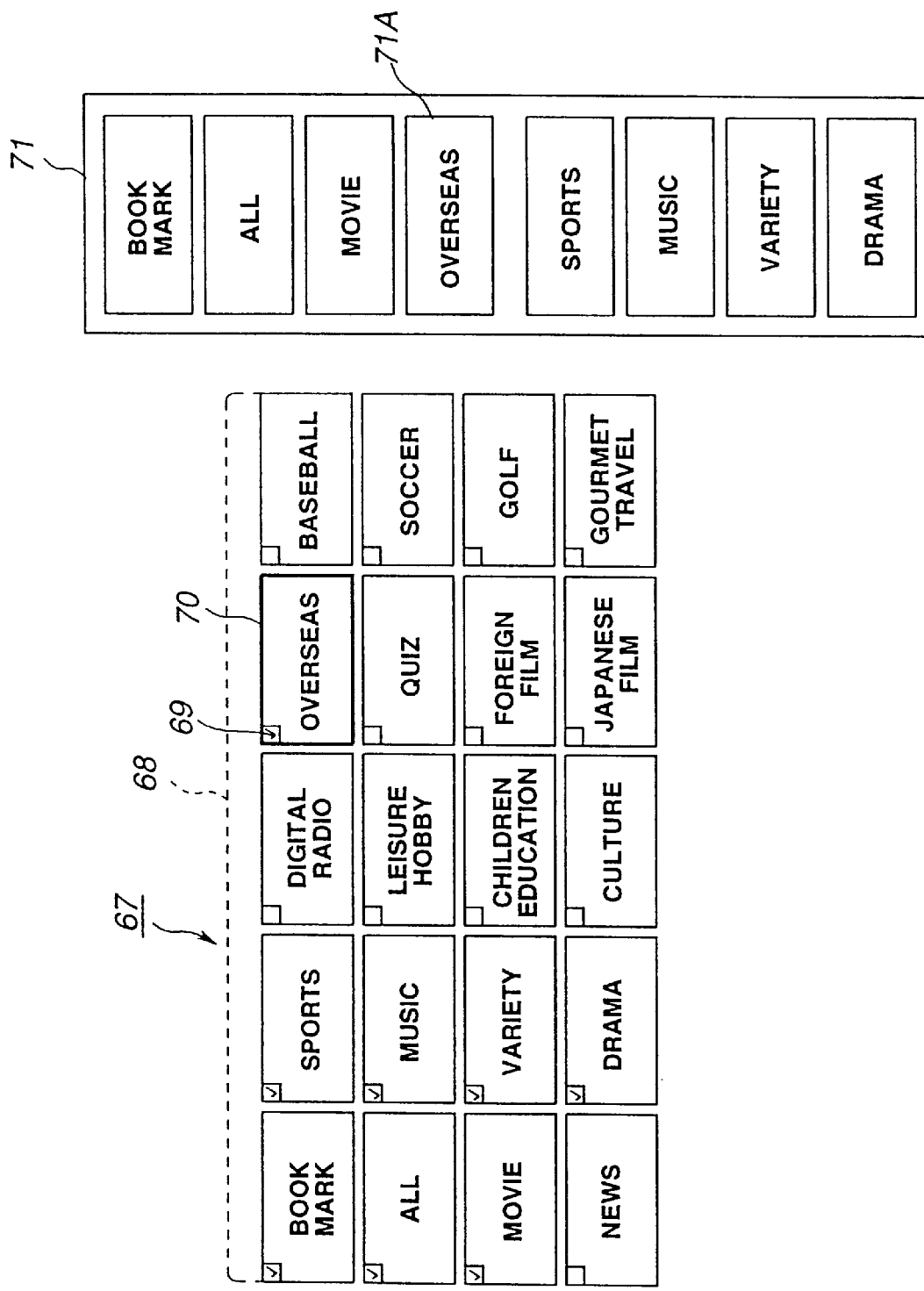

FIGS. 20A and 20B show an example of operation in the case where one of eight registered genres is exchanged.

For example, it is assumed that the cursor movement key is operated from the state of the registration content shown in FIG. 19 to move the cursor 70 to the genre candidate item of "news" to operate the select button switch 47 in this state. Thus, as shown in FIG. 20A, check mark attached to the genre candidate item of "news" is deleted. Simultaneously therewith, the item column 71A where "news" has been displayed until now in the registration display area 71 becomes blank. This indicates that genre of "news" is excluded from registration.

It is further assumed that, e.g., user operates the cursor movement key to move cursor 70 to the genre candidate item of "overseas" to operate the select button switch 47 thereat. Thus, as shown in FIG. 20B, check mark 69 is attached to the genre candidate item of "overseas". Thus, "overseas" is displayed in the item column 71A which has been blank until now in the registration display area 71. Namely, genre of "overseas" has been registered in place of "news".

FIGS. 21A to 21F show an example of operation in the case of collectively carrying out exchange registration of three genres of the registered eight genres.

Also in this case, cursor 70 is placed (located) at the genre candidate item of "book mark", e.g., from the state of registration content shown in FIG. 19 to operate the select button switch 47 in this state. Thus, as shown in FIG. 21A, check mark attached to the genre candidate item of "book mark" is deleted, and the item column where "book mark" has been displayed in the registration display area 71 becomes blank.

Figure 21A:
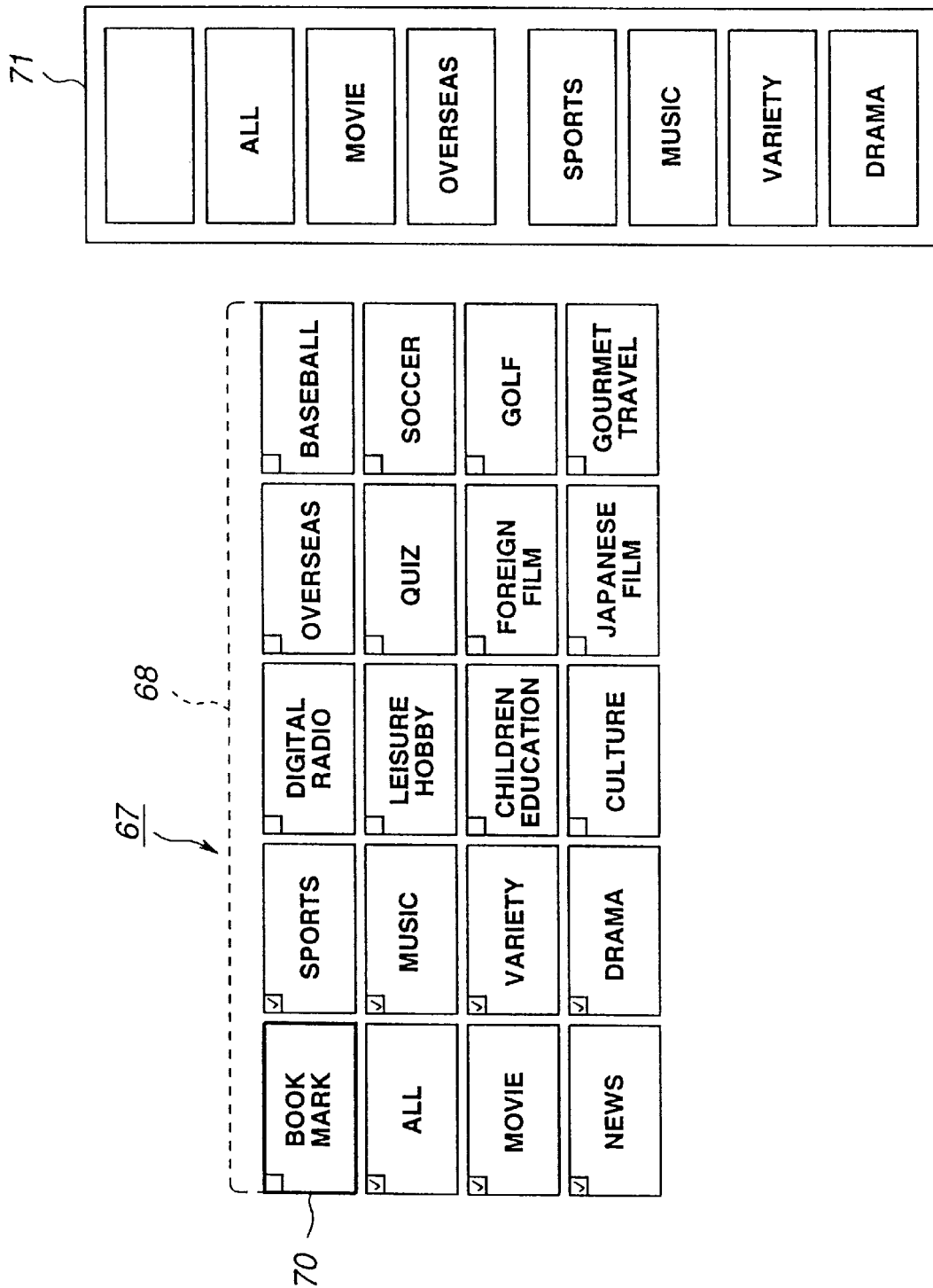
FIGS. 21A to 21F are views showing an operation for collectively exchanging registered genres.
Figure 21B:
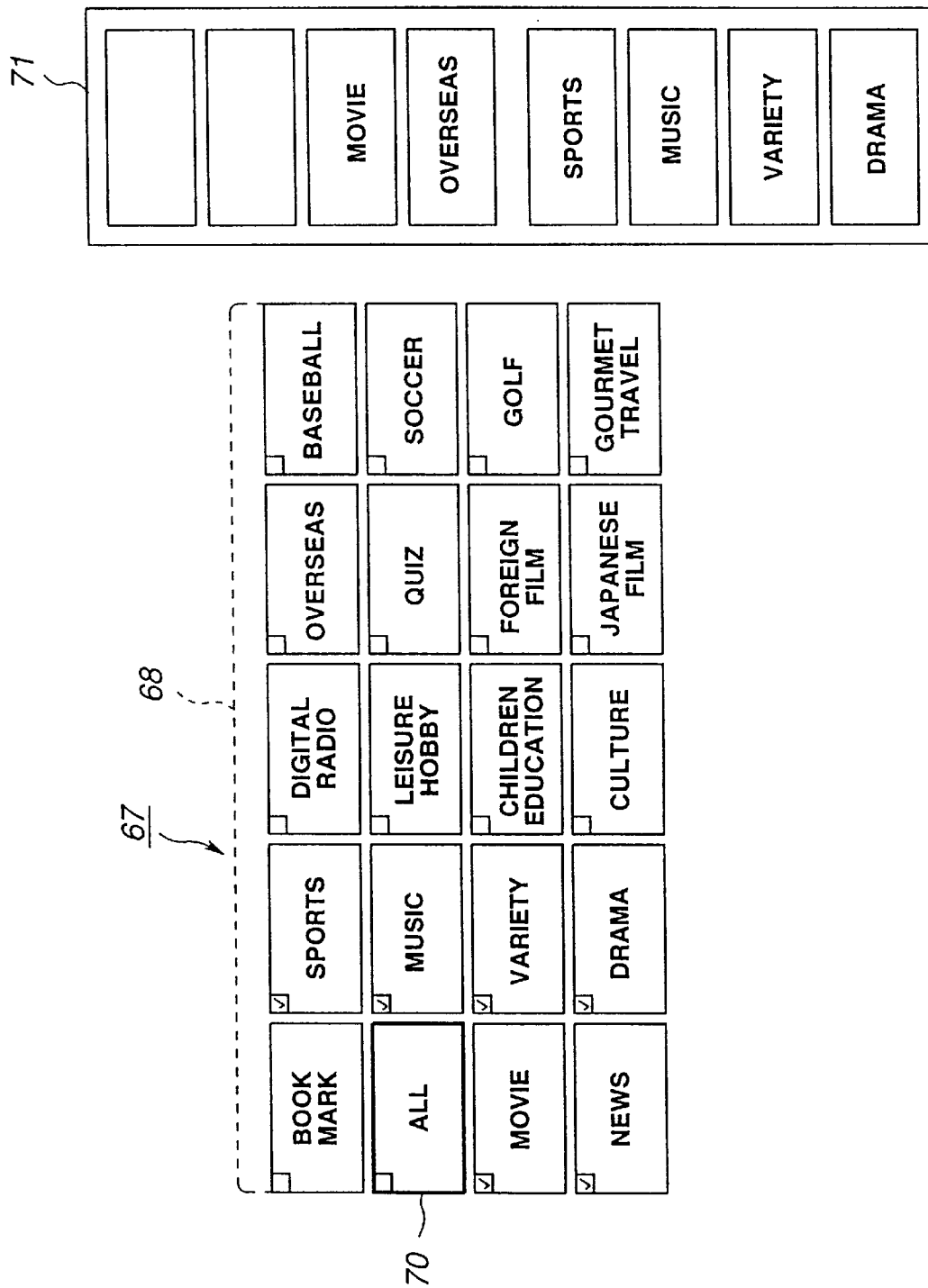

Then, when, as shown in FIG. 21B, cursor 70 is moved to the genre candidate item of "all" to operate the select button switch 47, check mark attached to the genre candidate item of "all" is deleted in addition to the item of "book mark", and the item column where "all" has been displayed in the registration display area 71 becomes blank.

Figure 21C:
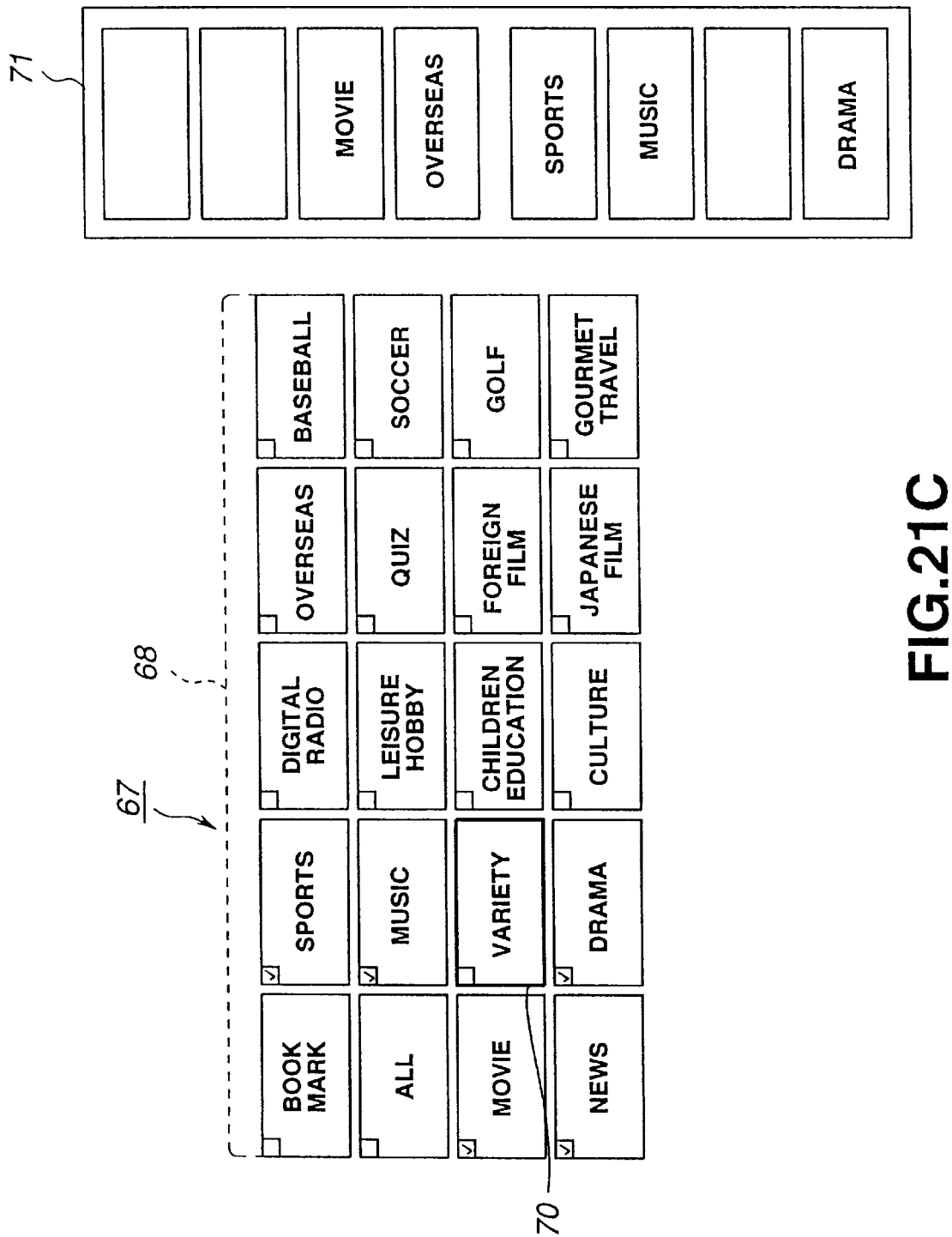

When, as shown in FIG. 21C, cursor 70 is further moved to the genre candidate item of "variety" from the state of FIG. 21B to operate the select button switch 47, check mark attached to genre candidate item of "variety" is deleted in addition to the items of "book mark", "all", and the item column where "variety" is displayed in the registration display area 71 becomes blank.

As seen from the foregoing description, FIGS. 21A to 21C show result of operation for excluding, from registration, items of three genres that user initially has considered to be unnecessary.

Figure 21D:
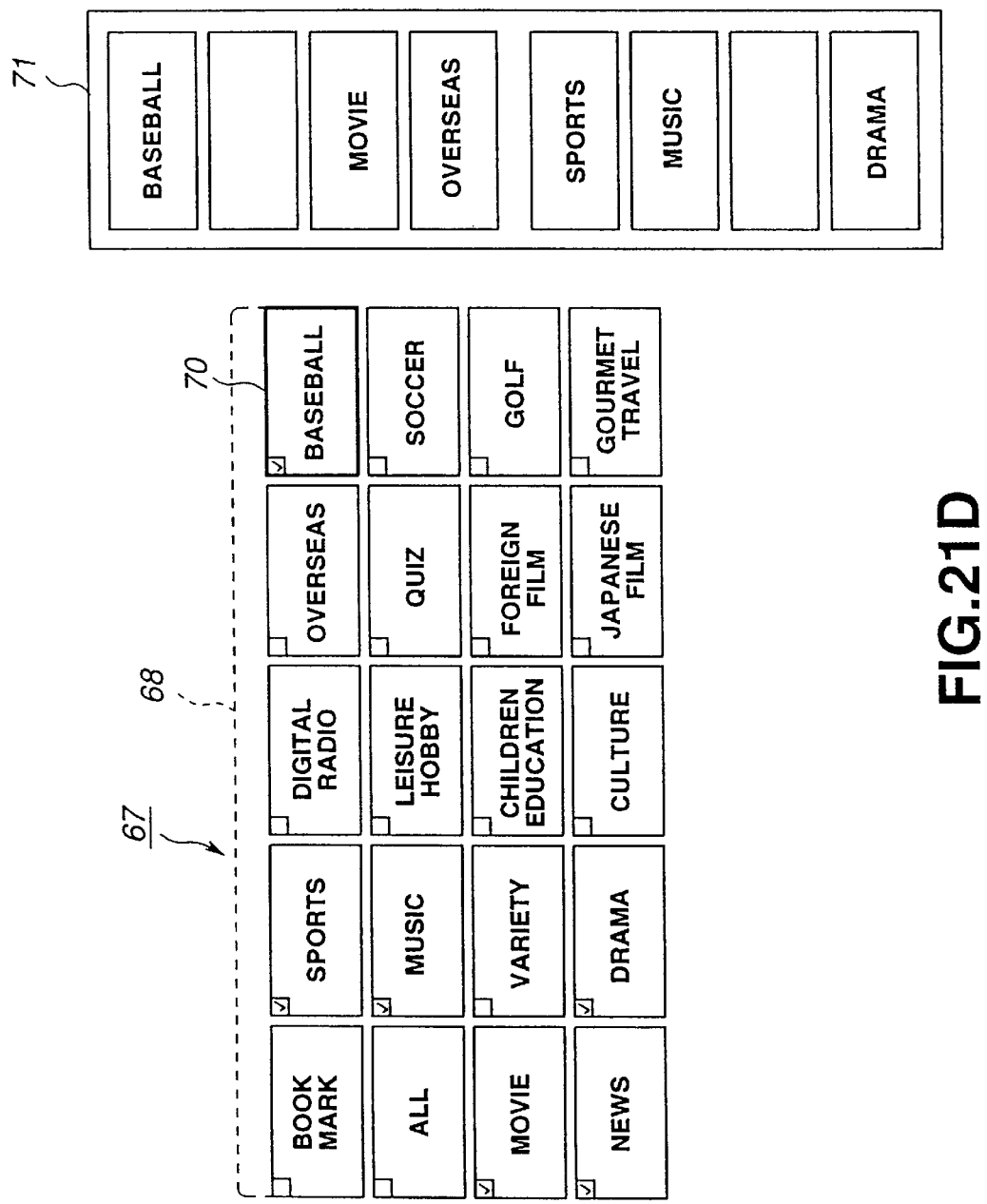
Figure 21E:
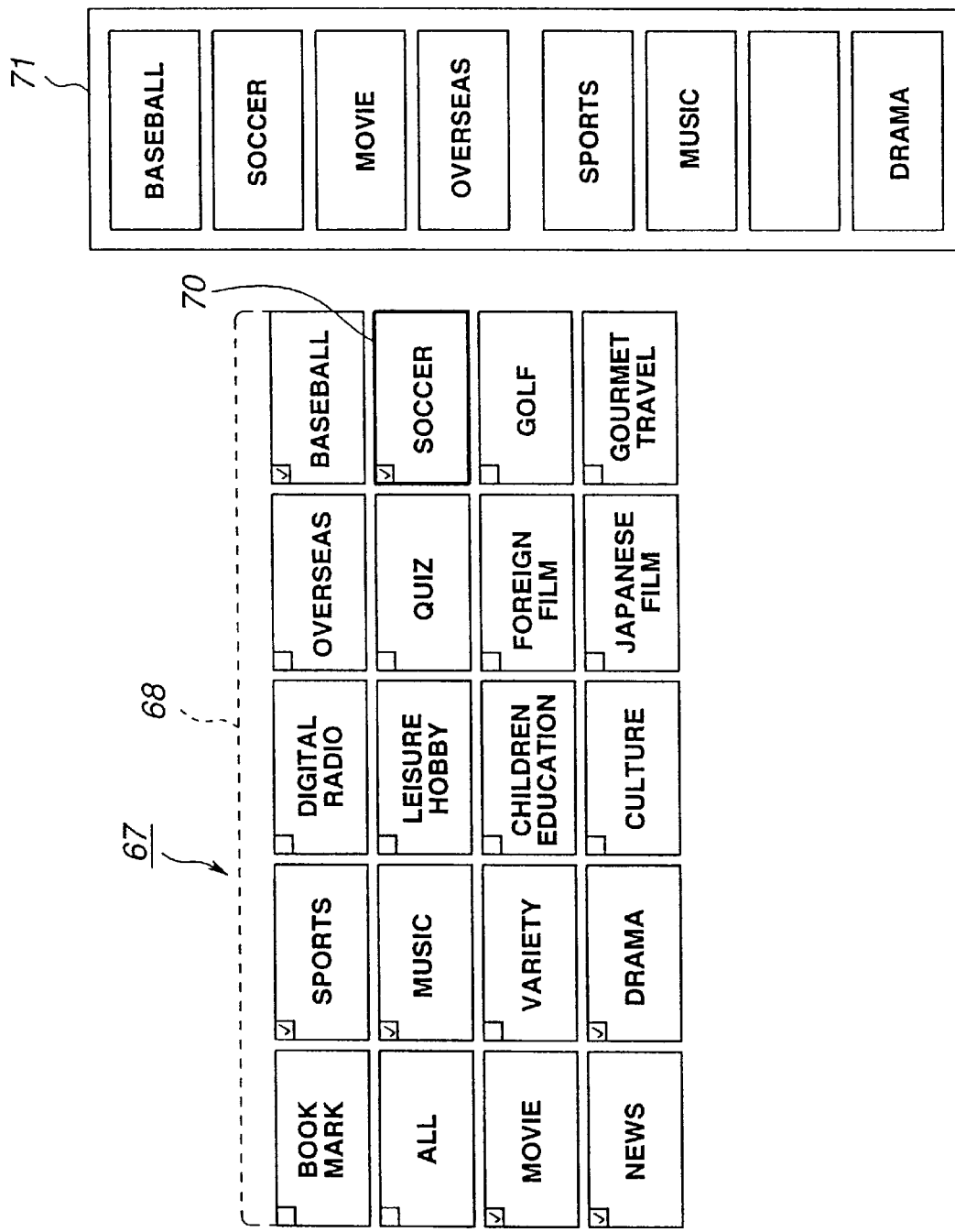
Figure 21F:
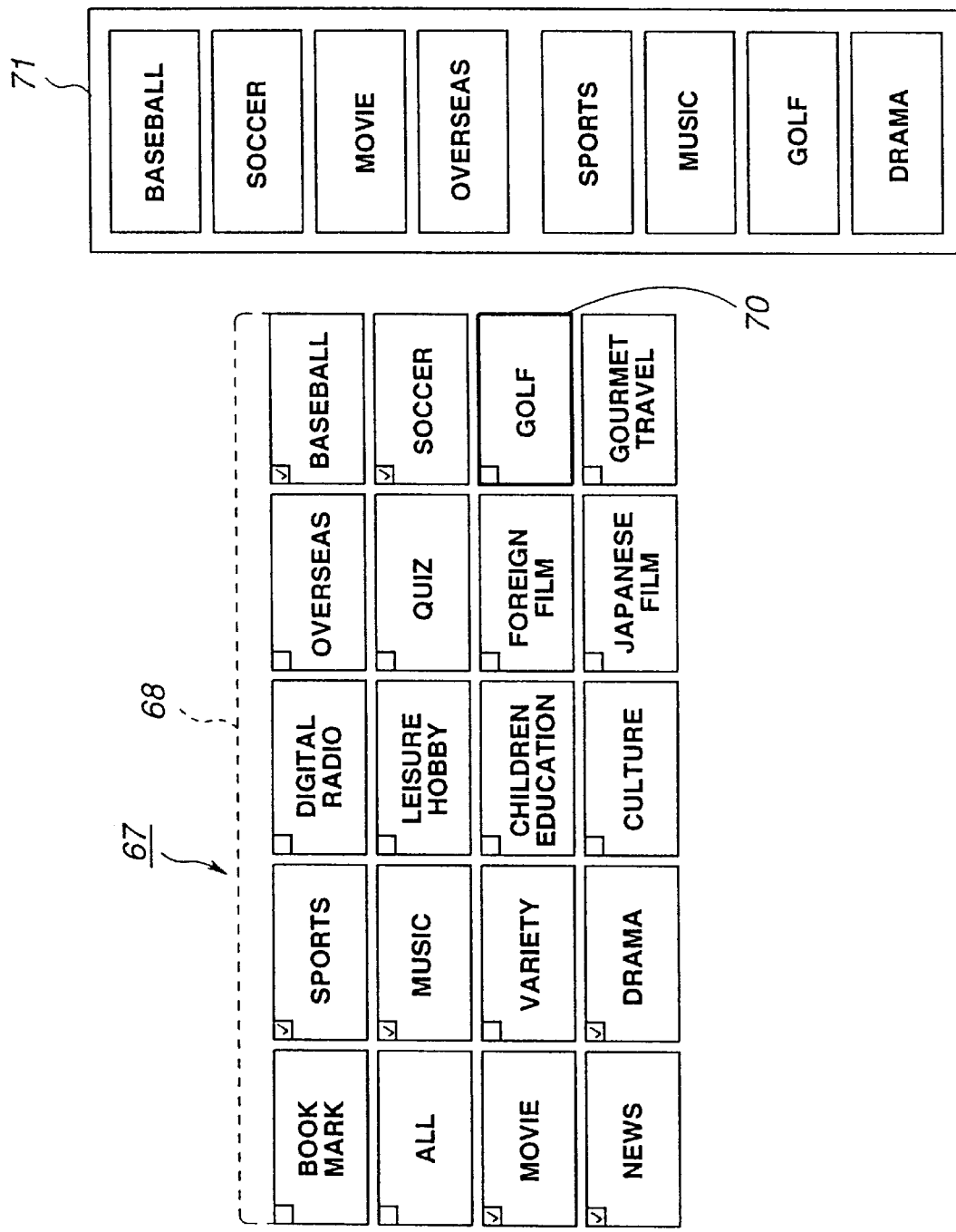

Further, FIGS. 21D to 21F show the state corresponding to the operation for newly registering three genres in place of three items extruded from registration.

FIG. 21D shows the state where cursor 70 is moved to the genre candidate item of "baseball" from the state shown in FIG. 21C thereafter to operate select button switch 47. Namely, as shown in FIG. 21D, check mark 69 is newly attached to the genre candidate item of "baseball", and "baseball" is newly displayed (registered) at the item column which has been blank of the registration display area 71.

In this case, "baseball" is registered and displayed at the item column of blank positioned at the uppermost portion of plural blanks in the registration display area 71. In a manner succeeding thereto, genre names are filled in order from the item column positioned at the upper side of plural blank item columns. For this reason, user carries out registration while taking into consideration order of deletion or order of registration of genres, thereby permitting display order in the longitudinal direction of genres displayed in the area 25Z of the program table 50 to be in correspondence with his fondness.

FIGS. 21E and 21F show the state where the cursor movement key and the select button switch 47 are operated in a manner similar to the above from the state of FIG. 21D to further supplement two genres. The state where genre of "soccer" is registered is shown in FIG. 21E, and the state where genre of "golf" is further registered is shown in FIG. 21F.

As is clear from the foregoing description, FIGS. 21A to 21F show the state where, in place of excluding, from registration, three genres of "book mark", "all" and "variety" from the registered eight genres, "baseball", "soccer" and "golf" are registered.

Further, exchange of not only three genres, but also genres more than three can be also conducted by carrying out operation of button switch which is in conformity with the explanation using FIGS. 21A to 21F. For example, in the case of exchanging all of eight registration genres, it is sufficient to once delete check marks attached to all genres which have been already registered to clear the registration display area 71 thereafter to carry out operation for newly registering eight genres.

The genres registered as stated above are stored into the data memory 24 shown in FIG. 4 as genre registration data 24H.

Moreover, in the case where there is a necessity or desire to allow the registration content of genre to be initial value, i.e., to be in default state, it is sufficient to move cursor 70 to the icon 74 for reset to operate the select button switch 47. Thus, the registration content of the registration display area 71 is reset into default state. In this example, data of default of such genre registration is stored in the data memory 24 as genre default data 24I.

It is to be noted that when power supply is turned OFF, e.g., during change of genre registration, current registration content may be registration content immediately before registration is changed.

When eight genres are registered at all item columns of the registration display area 71 by operation as described above thereafter to move cursor 70 to, e.g., the icon 73 for return shown in FIG. 19 to operate the select button switch 47, the operation guide picture 64 which has been displayed until now is deleted, so the display state returns (is restored) to the display state before display of the operation guide picture 64. For example, if the program table 50 is displayed before display of the operation guide picture 64, the program table 50 is displayed. If image of the program of the selected channel is displayed, this image is displayed.

Moreover, as the message content in the message display area 72 for a time period during which operation of the genre registration is carried out in a manner explained with reference to FIGS. 19 to 21F, there are, e.g., message contents as described below.

In the state where the genre registration picture 67 shown in FIG. 19 is accessed, there is displayed message for hastening change of registration, e.g., "Setting of the genre registration is changed. Please select genre to be changed from genres to which check mark is attached, etc.

Moreover, in such cases that, as shown in FIGS. 20A and FIGS. 21A to 21E, the item column of blank still exists in the registration display area 71 and any genre to be registered is left, there is displayed message for hastening new registration, e.g., "Please select genre to be newly set from genres except for genres to which check mark is attached", etc.

Further, in the case where although item column of blank exists in the registration display area 71 and any genre to be registered is left, operation for attempting to shift to other operation guide picture or menu picture, or for returning (restoration) to original picture by the icon 73 for return, etc. is carried out, there is displayed message to alarm erroneous operation, e.g., "Eight genre registrations in total are required, Please select genre to be newly set from genres except for the genres to which check mark is attached", etc.

Figure 22:
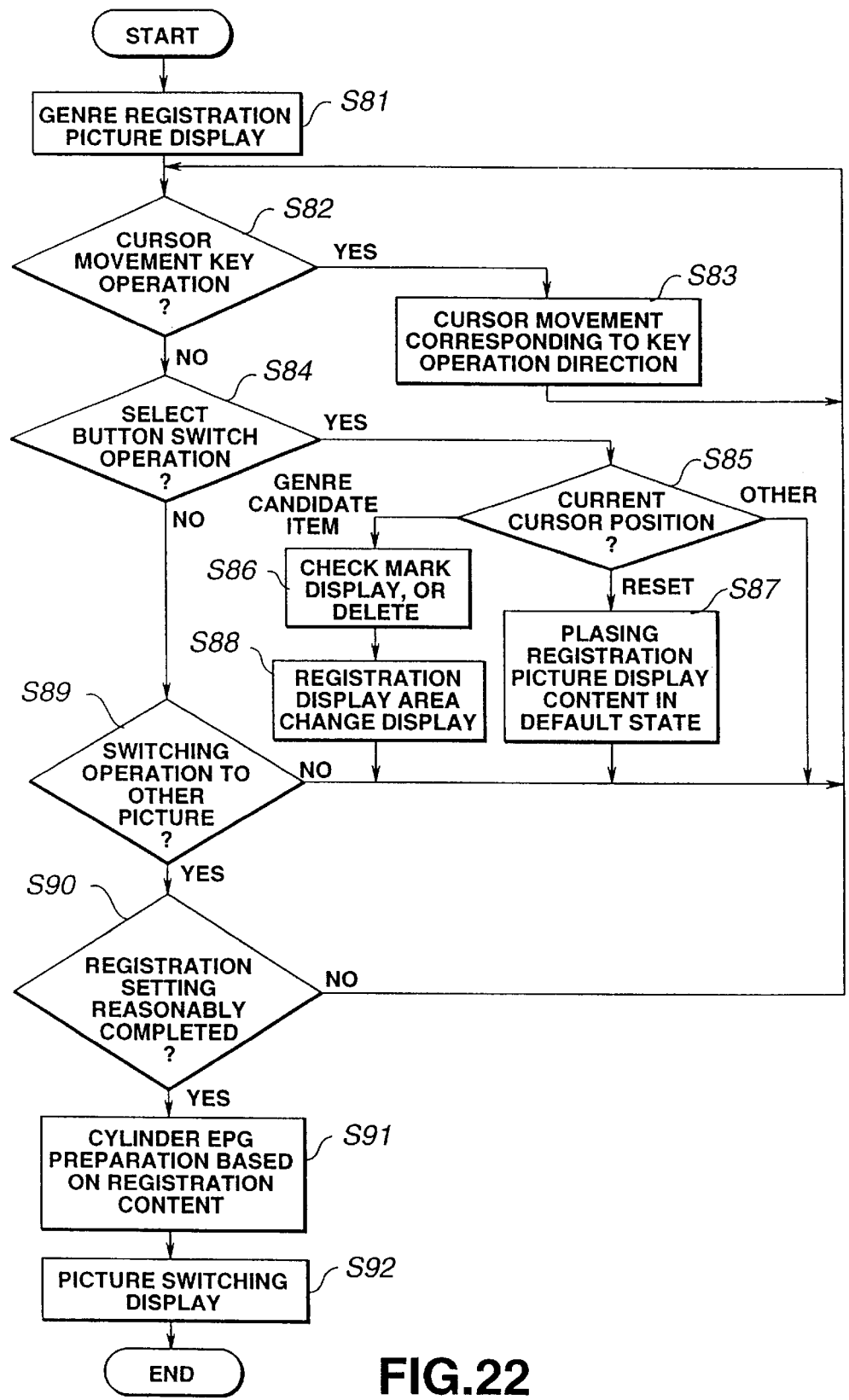
FIG. 22 is a view showing processing of CPU at the time of genre registration.

FIG. 22 is a flowchart showing the processing operation of the CPU 21 (see FIG. 4) for genre registration which has been already explained with reference to FIGS. 19 to 21F.

By the operation indicating instruction to display genre registration picture 67, the CPU 21 carries out the operation in accordance with this flowchart. Namely, when cursor 66 is moved onto icon 65 for operation guide shown in FIG. 19 by operation of menu button switch 38 and cursor movement key, etc. of the remote controller 14A shown in FIG. 6 to provide access to genre registration picture 67, the processing shown in FIG. 22 is started.

In this case, when the operation for providing access to the genre registration picture 67 is carried out, the CPU 21 executes the control operation for displaying the genre registration picture 67 at step S81.

In this embodiment, the controller 12 and the display signal generating circuit 15 carry out display of the genre registration picture 67. Namely, at step S81, the CPU 21 executes picture display data preparation program 23D corresponding to the genre registration picture 67 to prepare picture display data 24B for genre registration picture 67. In this case, the display content of the genre registration picture 67 is determined on the basis of the genre registration data 24H.

Then, the CPU 21 executes display signal generation control program 23E corresponding to the genre registration picture 67 to control the display signal generating circuit 15, and the display signal generating circuit 15 generates a picture signal corresponding to genre registration picture 67 as shown in FIG. 19, for example, on the basis of picture display data 24B for genre registration picture 67.

The CPU 21 executes control for displaying the genre registration picture 67 at step S8 1. Thereafter, the processing operation proceeds to step S82 to judge whether or not any one of cursor movement keys is operated. Namely, the CPU 21 judges whether or not the operation for moving the cursor 70 of the genre registration picture 67 is carried out.

When the CPU 21 judges at this step S82 that any one of cursor movement keys is operated, the processing operation proceeds to step S83. At the step S83, the CPU 21 serves to move the cursor 70 in a direction corresponding to the operated button switch of four cursor movement keys. Thereafter, the processing operation returns to the step S82.

On the other hand, when the CPU 21 judges at the step S82 that any one of cursor movement keys is not operated, the processing operation proceeds to step S84 to judge whether or not the select button switch 47 is operated.

When the CPU 21 judges at the step S84 that the select button switch 47 is operated, the processing operation proceeds to step S85. At the step S85, the CPU 21 judges genre candidate item or icon 73 or 74 at which cursor 70 is placed (located) at present within the genre registration picture 67 shown in FIG. 19. When cursor 70 is placed (located) at any one of genre candidate items, the processing operation by the CPU 21 proceeds to step S86. When the cursor 70 is placed (located) at the icon 74 for reset, the processing operation proceeds to step S87. When the cursor 70 is placed (located) at any other position, the processing operation returns to the step S82. In this case, as the case returning to the step S82, there are the case where the cursor 70 is positioned at the icon 73 for return and the case where the cursor 66 on the operation guide icon 65 is active, etc.

At step S86, if check mark 69 is not attached to the genre candidate item at which the cursor 70 is placed (located) at present, the CPU 21 serves to newly attach check mark 69 to that genre candidate item. On the other hand, if the check mark 69 has been already attached to the genre candidate item at which the cursor 70 is placed (located) at present, the CPU 21 serves to delete this check mark 69.

At step S88, the CPU 21 changes display of the registration display area 71 in correspondence with addition/ deletion of the check mark 69 at the step S86. Namely, when the CPU 21 serves to delete the check mark 69 of a certain genre candidate item at the step S86, it allows the item column where genre name of this genre candidate item is displayed to be blank, while when the CPU 21 serves to attach check mark 69 to a certain genre candidate item, it serves to newly display genre name of this genre candidate item in the registration display area 71. The CPU 21 executes the processing of the step S88. Thereafter, the processing operation returns to the step S82.

Moreover, at step S87, the CPU 21 provides access to genre default data 24I stored in advance in the data memory 24 to place the display content of the genre registration picture 67 in default state on the basis of this data. Thereafter, the processing operation returns to the step S82.

On the other hand, when the CPU 21 judges at the step S84 that the select button switch 47 is not operated, the processing operation proceeds to step S89 to judge whether or not switching operation to other display picture is carried out. Namely, the CPU 21 judges whether or not there is carried out button switch operation for providing access to other operation guide picture, picture of the ordinary television broadcast, picture of the program table 50 or menu picture of other kind from the genre registration picture 67 being displayed.

When the CPU 21 judges at step S89 that the button switch operation for switching to other picture is not carried out, the processing operation returns to the step S82 to carry out processing corresponding presence or absence of the above-described button switch operation. On the other hand, when the CPU 21 judges that switching operation to other picture is carried out, the processing operation proceeds to step S90.

At the step S90, the CPU 21 judges that the registrations until now are reasonably completed. Namely, when the CPU 21 judges that the genre registration operation has not been reasonably completed (e.g., the state as shown in FIGS. 21A to 21E) in such states where registrations of eight all genres are not yet carried out, the processing operation returns to the step S82. In this case, an approach may be employed to conduct a control so that display for hastening reasonable registration operation is carried out in the message display area 72 as described above thereafter to return to the step S82. Thus, use convenience of user can be improved.

On the other hand, at the step S90, when the CPU 21 judges that the genre registration is reasonably completed, the processing operation proceeds to step S91.

At the step S91, the CPU 21 prepares genre registration data 24H shown in FIG. 4 on the basis of the genre set in the genre registration picture 67 to further prepare picture display data 24B displayed in the area 25Z of the program table 50 on the basis of the genre registration data 24H. By this picture display data 24B, the order of genre names displayed in the area 25Z of the program table 50 is in correspondence with "book mark", "all" . . . "variety". "drama" displayed in order from upper direction to lower direction of the item column of the registration display area 71 shown in FIG. 19, for example.

When the processing of the step S91 is completed, the processing operation by the CPU 21 proceeds to step S92. At this step S92, the CPU 21 executes a control for carrying out switching of display to picture to be newly accessed (other operation guide picture, television picture, program table 50, or other menu picture, etc.) in accordance with switching operation to other picture which has been judged at the previously described step S89, thus to complete this genre registration processing.

It is to be noted that the item of select channel, the item of favorite channel and the item of favorite program which have been described above may be provided in the genre candidate item area 68. In this case, the items of registered plural genres, and items of the select channel, the favorite channel and the favorite program are displayed in a mixed state in the area 25Z of the program table 50. In addition, e.g., in the area 25Z, two items of the select channel and the favorite channel are always displayed, and information items of eight genres that user has registered may be displayed in addition to the above.

It is to be noted that the display form in this invention is not limited to more practical display form such as the program table 50, the operation guide picture 64 and the genre registration picture 67, etc. which have described above, but the display form may be suitably changed by taking into consideration actual use condition and/or use convenience of user, etc.

8. Other display form of Electronic Program Guide

The display form of EPG in the electronic program guide control apparatus (unit) to which this invention is applied except for the display forms shown in FIGS. 7A to 8A, and FIGS. 12 and 14 mentioned above, etc. will now be described with reference to FIGS. 23A to 23C. It is to be noted that the same reference numerals are respectively attached to substantially the same portions as those of FIGS. 7A to 8A and FIGS. 12 and 14 and their explanation will be omitted.

Figure 23A:
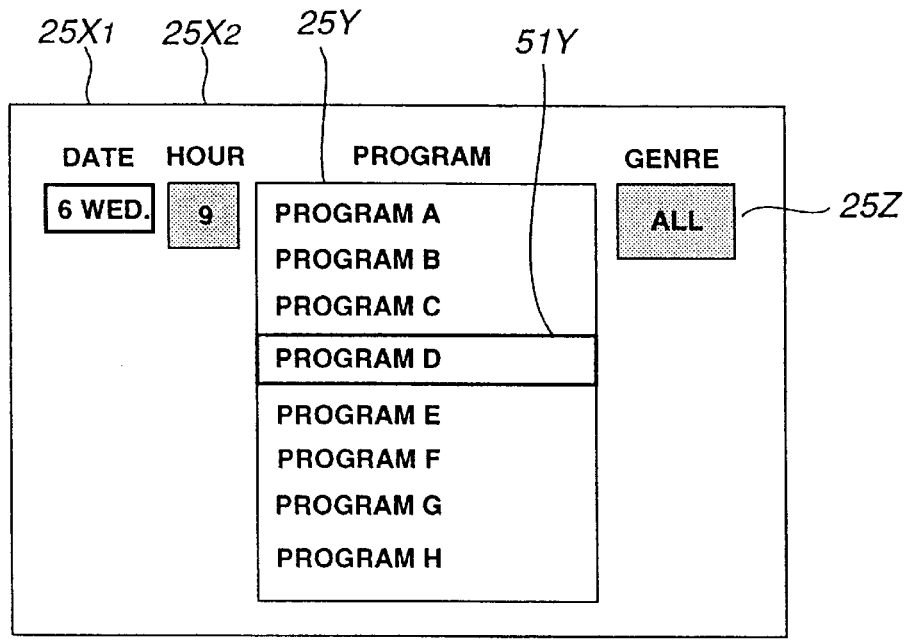
FIG. 23 is a view showing another display example of electronic program guide.

The Electronic Program Guide (EPG) shown in FIG. 23A is the same in the display form of the area 25Y as those of FIGS. 7A to 7D and FIGS. 8A to 8G, but is different from the latter in the display forms of the areas $25X_1$, $25X_2$, 25Z. Namely, only respective one items are displayed in the areas $25X_1$, $25X_2$, 25Z.

In this display form, operation similar to the operation which has been described with reference to FIGS. 7A to 7D and FIGS. 8A to 8G is implemented to the remote controller 14 shown in FIG. 6, thus making it possible to move the cursor 51Y of the area 25Y, and displays of the areas $25X_1$, $25X_2$ and 25Z are switched in order by operating the up button switch 43 or the down button switch 44 of the remote controller 14A. Namely, items of dates, times and genres displayed in respective areas are switched into larger value or next genre every time, e.g., the down button switch 44 is pushed down once.

Figure 23B:
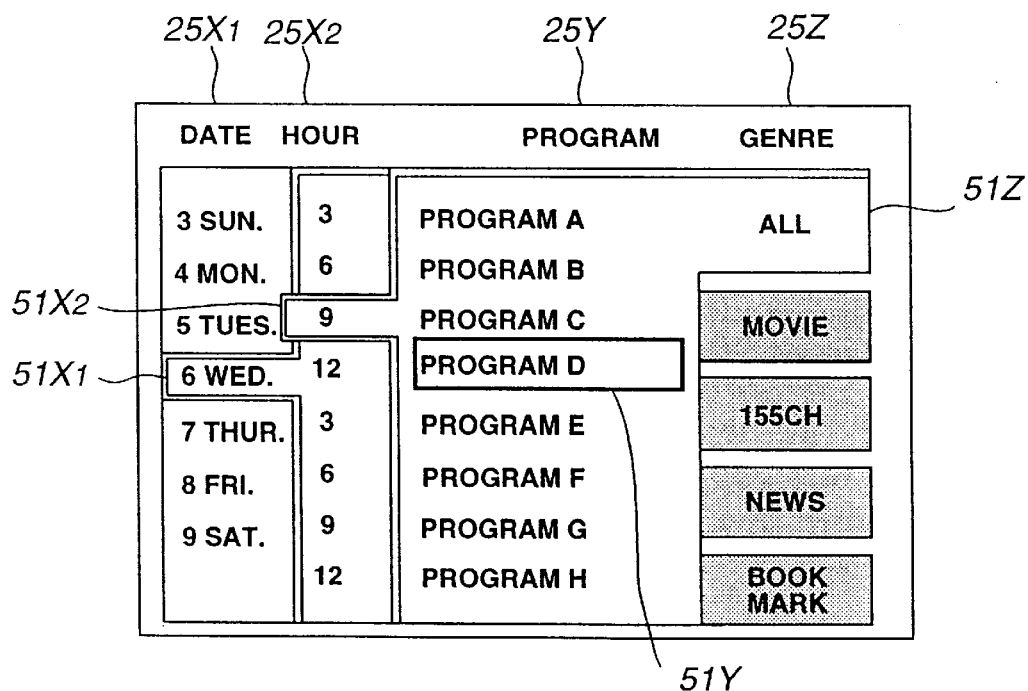

In the EPG shown in FIG. 23B, items of other areas included in items at cursor position of a certain area are displayed in folder form. Namely, item (time) of the area $25X_2$ is displayed in correspondence with arrangement position (the sixth day, Wednesday) of the cursor $51X_1$ of the area $25X_1$ in such a form that the folder is opened. Moreover, program title, etc. is displayed in the area 25Y in correspondence with arrangement position (a.m. 9:00) of the cursor $51X_2$ of the area $25X_2$ and arrangement position (all) of the cursor 51Z of the area 25Z in such a form that the folder is opened.

Figure 23C:
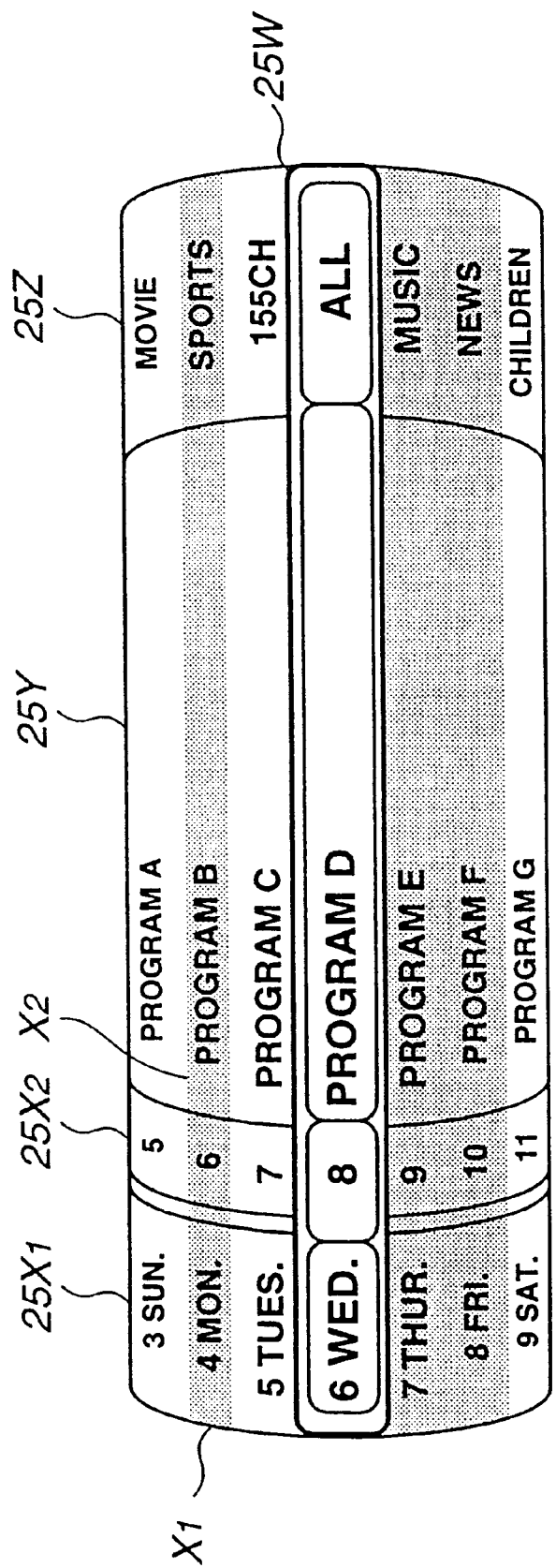

In addition, there may be employed, as shown in FIG. 23C, an approach such that the cylinder 25 shown in FIG. 5 is displayed on display screen 53 of the monitor unit 19 as it is, and cursor 25W is displayed.

It is to be noted that while items of the select channel, the favorite channel and the favorite program are not displayed in the area 25Z in FIGS. 23A to 23C, these items may be displayed in the area 25Z.

Industrial Applicability

As has been explained, this invention adopts such a scheme to display, e.g., date, time, program title and genre of program in respective areas obtained by dividing the program table in a longitudinal direction, and to provide, as items of genres, in addition to the above, information of channel selected at present and information of favorite channel that user has arbitrarily registered as, e.g., information related to the broadcast channel, thereby making it possible to offer, to user, Electronic Program Guide (EPG) extremely easy to use.

Moreover, in this invention, the item of "favorite program" registered as the user's favorite program is provided as item of genre, thereby making it possible to provide EPG still more easy to use. Further, since "favorite program" is automatically set on the basis of viewing past record information of the program, user is not required to carry out such a troublesome operation to select favorite program to register it.

In addition, since user registers genre corresponding to his fondness to display this registered genre in the program table as selective item, program table in conformity with fondness of user can be generated. Namely, EPG which is further easy for user to use can be provided.

What is claimed is:

1. A program guide control apparatus for controlling the display of a program table picture which indicates the scheduling of respective programs of available broadcasting channels on a display unit, the apparatus comprising:

means for generating a program table picture including date information indicating a plurality of entries of broadcasting dates, hour information indicating a plurality of entries of broadcasting hours of respective programs, title information indicating titles of the respective programs and genre information classifying the respective programs of the available broadcasting channels by genre, with separate areas of said program table picture being respectively allocated for each of said hour information, date information, title information and genre information;

output means for outputting the program table picture to the display unit;

command receiving means for receiving a cursor control signal for moving the display position of at least an active one of multiple cursors superimposed on the program table picture for selectively designating any one of all of the date information, the hour information, the title information and the genre information, and for receiving a determination control signal; and control means for controlling the program table picture on the basis of the cursor control signal and the determination control signal, wherein the program table picture generating means generates information relating to the broadcasting channel as part of the genre information, and wherein the control means controls the program table picture generating means so that when the command receiving means receives the determination control signal in a state where a genre information cursor designates an item relating to the broadcasting channel information, the titles of only the programs relating to the broadcasting channel are displayed in connection with the title information.

2. The apparatus of claim 1, further comprising broadcasting channel receiving means for receiving a broadcast channel corresponding to the channel selected by operation of a user from the available broadcasting channels, wherein the program table picture generating means generates information relating to the broadcasting channel being received by the broadcasting channel receiving means as the broadcasting channel information.

3. The apparatus of claim 1, which further comprises broadcasting channel setting means for setting at least one channel of the available broadcasting channels as a favorite broadcasting channel, wherein the program table picture generating means generates information relating to the broadcasting channel set by the broadcasting channel setting means as the broadcasting channel information.

4. A program guide control apparatus for controlling the display of a program table picture which indicates the scheduling of respective programs of available broadcasting channels on a display unit, the apparatus comprising:

means for generating a program table picture including date information indicating a plurality of entries of broadcasting dates of the respective programs, hour information indicating a plurality of entries of broadcasting hours of the respective programs, title information indicating titles of the respective programs and genre information classifying the respective programs by genre, with separate areas of said program, table picture being respectively allocated for each of said hour information, date information, title information and genre information;

command receiving means for receiving a cursor control signal and a determination control signal, said cursor signal for moving the display position of at least an active one of multiple cursors superimposed on the program table picture for selectively designating any one of all of the date information, the hour information, the title information and the genre information;

means for setting the genre information; and control means for controlling the program table picture on the basis of the cursor control signal and the determination control signal, wherein the control means controls the program table picture generating means so that when the receiving means receives the determination control signal in the state where a genre information cursor designates one of pictures relating to the plural genre information, the titles of only the programs relating to the genre where the genre information cursor is positioned are displayed in connection with the title information.

5. The apparatus of claim 4, which further comprises detecting means for receiving past records of respective programs, and memory means for storing past records information detected by the detecting means, wherein the control means controls the program table picture generating means so as to generate genre information including a program selected on the basis of the past record information as one of the available genres.

6. The apparatus of claim 5, wherein the control means allows the means for generating a program table picture to generate a program table picture such that the titles are displayed in descending order of the number of received titles on the basis of the past record information when the command receiving means receives the determination control signal in the state where cursor is positioned at the genre based on the past record information.

* * * * *